(12) United States Patent
Shi et al.

(10) Patent No.: US 12,457,017 B2
(45) Date of Patent: Oct. 28, 2025

(54) COMMUNICATION METHOD AND APPARATUS

(71) Applicant: HUAWEI TECHNOLOGIES CO., LTD., Shenzhen (CN)

(72) Inventors: Hongzhe Shi, Shenzhen (CN); Min Cheng, Hong Kong (CN); Wenkai Zhang, Shenzhen (CN); Jing Liang, Shanghai (CN); Zhitang Chen, Hong Kong (CN); Yiqun Wu, Shanghai (CN); Huangping Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/526,282

(22) Filed: Dec. 1, 2023

(65) Prior Publication Data

US 2024/0137082 A1 Apr. 25, 2024

Related U.S. Application Data

(63) Continuation of application No. PCT/CN2022/094416, filed on May 23, 2022.

(30) Foreign Application Priority Data

Jun. 1, 2021 (CN) .......................... 202110610811.3

(51) Int. Cl.
*H04L 1/02* (2006.01)
*H04B 7/0452* (2017.01)
*H04B 7/0456* (2017.01)

(52) U.S. Cl.
CPC ......... *H04B 7/0456* (2013.01); *H04B 7/0452* (2013.01)

(58) Field of Classification Search
CPC .. H04B 7/0452; H04B 7/0456; H04B 7/0626; H04B 7/0663; H04B 7/617;
(Continued)

(56) References Cited

U.S. PATENT DOCUMENTS

2011/0044400 A1* 2/2011 Collings .............. H04B 7/0482
375/295
2012/0014424 A1* 1/2012 Heath, Jr. ............ H04B 7/0639
375/224
(Continued)

FOREIGN PATENT DOCUMENTS

CN 109075851 A 12/2018
CN 111262611 A 6/2020
(Continued)

OTHER PUBLICATIONS

3GPP TSG RAN Meeting #91-e RP-210256,"Motivation of study on radio enhancement based on AI",Electronic Meeting,Mar. 22-26, 2021,total 15 pages.
(Continued)

*Primary Examiner* — Khai Tran
(74) *Attorney, Agent, or Firm* — HAUPTMAN HAM, LLP

(57) ABSTRACT

A communication method and apparatus. A terminal device determines channel state information based on S indexes of S vectors. Each of the S vectors is included in a first vector quantization dictionary. The first vector quantization dictionary includes $N_1$ vectors, where $N_1$ and S are both positive integers. The terminal device sends the channel state information to a network device. Because a vector included in the vector quantization dictionary usually has a relatively large dimension, quantizing channel information by using the first vector quantization dictionary is equivalent to performing dimension expansion on the channel information or maintaining a relatively high dimension. High-precision feedback is implemented by using relatively low signaling overheads.

26 Claims, 13 Drawing Sheets

(58) Field of Classification Search
CPC . H04B 7/0482; H04L 1/0026; H04L 25/0224; H04L 5/0044; H04L 27/261; H04W 16/28; H04W 92/20
USPC .......................................... 375/267, 260, 262
See application file for complete search history.

(56) References Cited

U.S. PATENT DOCUMENTS

| | | | | |
|---|---|---|---|---|
| 2012/0307649 | A1* | 12/2012 | Park | H04B 7/0663 370/241 |
| 2012/0320774 | A1* | 12/2012 | Dai | H04B 7/0621 370/252 |
| 2017/0214447 | A1* | 7/2017 | Li | H04B 17/327 |
| 2019/0173552 | A1* | 6/2019 | Decurninge | H04L 5/0048 |
| 2020/0366326 | A1 | 11/2020 | Jassal et al. | |
| 2021/0044340 | A1 | 2/2021 | Rahman et al. | |
| 2024/0049023 | A1* | 2/2024 | Pezeshki | H04L 25/0204 |

FOREIGN PATENT DOCUMENTS

| | | |
|---|---|---|
| WO | 2020225642 A1 | 11/2020 |
| WO | 2020231450 A1 | 11/2020 |
| WO | 2021025538 A1 | 2/2021 |

OTHER PUBLICATIONS

Japanese Office Action issued in corresponding Japanese Application No. 2023-574540, dated Dec. 2, 2024, pp. 1-11.
Junil Choi et al:"Trellis-Extended Codebooks and Successive Phase Adjustment: A Path From LTE-Advanced to FDD Massive MIMO Systems",IEEE Transactions on Wireless Communications, vol. 14, No. 4, Apr. 2015,XP011577939, total 10 pages.
3GPP TS 38.214 V16.5.0 (Mar. 2021),3rd Generation Partnership Project;Technical Specification Group Radio Access Network; NR;Physical layer procedures for data(Release 16),total 170 pages.
Alcatel-Lucent et al:"Comparison of CSI Feedback Schemes",3GPP TSG-RAN WG1 #57 San Francisco, USA, May 4-8, 2009, R1-092149, XP050339592,total 10 pages.
3GPP TS 38.331 V16.4.1 (Mar. 2021),3rd Generation Partnership Project;Technical Specification Group Radio Access Network;NR-;Radio Resource Control (RRC) protocol specification(Release 16),total 946 pages.
Jiajia Guo et al:"Deep Learning-based CSI Feedback and Cooperative Recovery in Massive MIMO", arXiv:2003.03303v2 [cs.IT] Dec. 14, 2020,XP081836242, total 30 pages.
International Search Report issued in corresponding International Application No. PCT/CN2022/094416, dated Jul. 27, 2022, pp. 1-8.
Extended European Search Report issued in corresponding European Application No. 22815070.2, dated Oct. 10, 2024, pp. 1-9.

* cited by examiner

COMMUNICATION METHOD AND APPARATUS

CROSS-REFERENCE TO RELATED APPLICATIONS

This application is a continuation of International Patent Application PCT/CN2022/094416, filed on May 23, 2022, which claims priority to Chinese Patent Application No. 202110610811.3, filed on Jun. 1, 2021. The disclosures of the aforementioned applications are hereby incorporated by reference in their entireties.

BACKGROUND

A 5th generation (5th generation, 5G) mobile communication system uses higher system capacity, spectral efficiency, and the like. In the 5G communication system, application of a massive multiple-input multiple-output (massive multiple-input multiple-output, massive-MIMO) technology plays an important role in improving spectral efficiency of the system. By using the massive-MIMO technology, a base station provides high-quality services for more user equipments (user equipment, UE) at the same time. A key step is that the base station precodes downlink data of a plurality of UEs. Through precoding, spatial multiplexing (spatial multiplexing) is implemented, interference is reduced between UEs, and a signal to interference plus noise ratio (signal to interference plus noise ratio, SINR) at a receiving end is increased, thereby improving a system throughput rate. To more accurately precode the downlink data of the UEs, the base station obtains channel state information (channel state information, CSI) of a downlink channel, to perform precoding based on the CSI. How to enable the base station to effectively obtain the CSI of the downlink channel is a technical problem worth studying.

SUMMARY

Embodiments described herein provide a communication method and apparatus, to improve CSI feedback efficiency.

According to a first aspect, a communication method is provided. The method is performed on a terminal device side. The method is performed by using software, hardware, or a combination of software and hardware. For example, the method is performed by a terminal device, or performed by a circuit system, or performed by a larger device including a terminal device. The circuit system implements functions of the terminal device. The method includes: determining channel state information, where the channel state information is determined based on S indexes of S vectors, each of the S vectors is included in a first vector quantization dictionary, the first vector quantization dictionary includes $N_1$ vectors, and $N_1$ and S are both positive integers; and sending the channel state information to a network device.

In the method, on the terminal device side, the channel state information is determined based on the first vector quantization dictionary. For example, the channel information obtained by the terminal device through measurement is represented by using indexes of one or more vectors included in the first vector quantization dictionary, to obtain the channel state information. Because a dimension of a vector is usually relatively large, quantizing channel information by using the first vector quantization dictionary is equivalent to performing dimension expansion on channel information or maintenance at a relatively high dimension, thereby improving quantization precision. Therefore, in this method, high-precision feedback is implemented by using relatively low signaling overheads.

In an optional implementation, each of the $N_1$ vectors represents one channel feature. Because each of the $N_1$ vectors represent one channel feature, corresponding channel information is quantized based on the first vector quantization dictionary to obtain channel state information, thereby reducing feedback overheads and relatively ensuring quantization precision.

In an optional implementation, the S vectors are determined based on S pieces of first channel information and the first vector quantization dictionary, and the S pieces of first channel information are information output by an encoder network. It is understood that the S pieces of first channel information output by the encoder network indicate a status of a downlink channel, and the S pieces of first channel information is quantized based on the first vector quantization dictionary. Feedback overheads is reduced through such quantization. In addition, in a VQ-AE network, a quantization network and a compression network are jointly designed (for example, an encoder network and a vector quantization dictionary is obtained through jointly training), so that joint optimization is implemented between compression and quantization, to reduce a performance loss and improve overall accuracy of fed-back channel state information.

Optionally, the encoder network and a decoder network cooperate, so that an original channel matrix is compressed. To be specific, instead of extracting some coefficients from the original channel matrix for feedback, the original channel matrix is compressed as a whole by using the network. In this case, discarded information is reduced, thereby reducing a compression loss. In addition, in the VQ-AE network, the quantization network and the compression network are jointly designed, so that joint optimization is implemented between compression and quantization, to reduce a performance loss and improve overall accuracy of fed-back channel state information.

In an optional implementation, the $N_1$ vectors have a same length.

In an optional implementation, the length is equal to at least one dimension in an output dimension of the encoder network. The lengths of the $N_1$ vectors are equal to at least one dimension in the output dimension of the encoder network, so that the $N_1$ vectors is easily used to quantize the channel information output by the encoder network.

In an optional implementation, an input dimension of the encoder network is determined based on an input dimension of a first reference encoder network, and the output dimension of the encoder network is determined based on an output dimension of the first reference encoder network. For example, in at least one embodiment, one or more reference network groups is defined in a protocol, or information about one or more reference network groups is received from the network device. Each reference network group includes a reference encoder network and a corresponding reference decoder network. The reference encoder network and the corresponding reference decoder network is obtained through joint training. Two communication parties separately perform, based on a reference network, offline training on an encoder network and a decoder network that is used in actual application. For example, the encoder network currently used by the terminal device is obtained through training based on the first reference encoder network included in a first reference network (or based on the first reference encoder network and a first reference decoder network included in a first reference network). Therefore, the input dimension of the encoder network is determined based on the input dimension of the first reference encoder network, and the output dimension of the encoder network is determined based on the output dimension of the first reference encoder network. For example, the input dimension of the encoder network is equal to the input dimension of the first reference encoder network, and the output dimension of the encoder network is equal to the output dimension of the first reference encoder network. In this method, the encoder network used by the terminal device meets a performance goal, and the encoder network used by the terminal device also meets a current network condition, to improve adaptability of the encoder network to an actual network environment.

In an optional implementation, the first reference encoder network corresponds to the first reference decoder network. For example, in response to the first reference encoder network belonging to the first reference network, and the first reference network including the first reference encoder network and the first reference decoder network, the first reference encoder network corresponds to the first reference decoder network. For example, the first reference encoder network and the first reference decoder network is obtained through joint training.

In an optional implementation, the first reference network includes the first reference encoder network and the first reference decoder network. A reference network includes a reference encoder network and a corresponding reference decoder network. For example, the reference encoder network and the reference decoder network included in the reference network is obtained through joint training.

In an optional implementation, the first reference network further includes a vector quantization dictionary (which is also referred to as a reference vector quantization dictionary). In at least one embodiment, the reference encoder network, the reference decoder network, and the vector quantization dictionary is jointly trained and optimized. Therefore, in addition to the first reference encoder network and the first reference decoder network, the first reference network further includes the reference vector quantization dictionary. In this manner, joint optimization between compression and quantization is better implemented. For example, the first vector quantization dictionary is the reference vector quantization dictionary, or the first vector quantization dictionary is different from the reference vector quantization dictionary. For example, in an initial network access communication stage, the first vector quantization dictionary used by the UE is the reference vector quantization dictionary. In a process of communication between the UE and the network device, the vector quantization dictionary used by the UE is updated, and the first vector quantization dictionary is, for example, an updated vector quantization dictionary.

In an optional implementation, the input dimension of the encoder network is M or M×2, the output dimension of the encoder network is D×S, and M and D are both positive integers; and $M \leq N_{tx} \times N_{sb} \times z$, $S \leq M$, z is a positive integer greater than or equal to 1, $N_{tx}$ represents a quantity of transmit antenna ports of the network device, and $N_{sb}$ represents a quantity of frequency domain sub-bands. $N_{tx}$ and $N_{sb}$ are both positive integers.

After obtaining a downlink channel matrix through measurement, the terminal device preprocesses the downlink channel matrix and then input a preprocessed downlink channel matrix to the encoder network. For example, in a process of preprocessing the downlink channel matrix, the terminal device obtains an eigen subspace matrix based on the downlink channel matrix, and then perform space-frequency joint projection on the eigen subspace matrix to obtain a complex matrix. After obtaining the complex matrix, the terminal device further performs dimension reduction processing on the complex matrix, and input a processed complex matrix to the encoder network; or convert a processed complex matrix into a real matrix and then input the real matrix to the encoder network. In this case, the input dimension of the encoder network is M or M×2. For example, a dimension of the downlink channel matrix is $N_{tx} \times N_{rx} \times N_{RB}$, and $M \leq N_{tx} \times N_{sb} \times z$. Information compression is completed in this manner. To be specific, in this step, main feature elements is selected to approximately express original information. In this processing manner, a matrix dimension is further reduced, to reduce complexity of subsequent processing (such as processing of the encoder network). The matrix dimension obtained in this preprocessing manner is used as an input dimension of a subsequent neural network (for example, the input dimension of the encoder network), and further affects a dimension for reconstructing the downlink channel matrix on the network device side.

In an optional implementation, the input dimension of the encoder network is M×N×2 or M×N, the output dimension of the encoder network is D×P×Q, S=P×Q, and M, N, D, P, and Q are all positive integers; and $M \leq N_{tx}$, $N \leq N_{sb}$, and $S \leq M \times N$; or $M = N_{tx} \times x$, $N = N_{sb} \times y$, and $S \leq (N_{tx} \times x) \times (N_{sb} \times y)$; or $M = N_{tx} \times N_{rx}$, $N = N_{sb}$, and $S \leq (N_{tx} \times N_{rx}) \times N_{sb}$. Herein, $N_{tx}$ represents a quantity of transmit antenna ports of the network device, $N_{sb}$ represents a quantity of frequency domain sub-bands, $N_{rx}$ represents a quantity of receive antenna ports of the terminal device, and x and y are both greater than 1; or x is equal to 1 and y is greater than 1; or x is greater than 1 and y is equal to 1. $N_{rx}$, $N_{tx}$, and $N_{sb}$ are both positive integers. For example, in a process of preprocessing the downlink channel matrix, the terminal device obtains an eigen subspace matrix based on the downlink channel matrix, and then perform space-frequency joint projection on the eigen subspace matrix to obtain a complex matrix. After obtaining the complex matrix, the terminal device further performs dimension reduction processing on the complex matrix, and input a processed complex matrix to the encoder network; or convert a processed complex matrix into a real matrix and then input the real matrix to the encoder network. In this case, the input dimension of the encoder network is M×N×2 or M×N. In this case, for technical effect, refer to the description of the foregoing optional implementation. Alternatively, after obtaining the complex matrix, the terminal device does not further perform dimension reduction processing; but inputs the complex matrix to the encoder network, or convert the complex matrix into a real matrix and then input the real matrix to the encoder network. In this case, the input dimension of the encoder network is also M×N×2 or M×N. In this case, there are fewer processing processes of the terminal device, to simplify a process of determining the channel state information by the terminal device. Alternatively, in a process of preprocessing the downlink channel matrix, the terminal device first performs dimension reduction processing on the downlink channel matrix, and then perform space-frequency joint projection on a matrix obtained through dimension reduction to obtain a complex matrix. For a processing manner after the complex matrix is obtained, refer to the foregoing description. In this case, the input dimension of the encoder network is also M×N×2 or M×N. In this case, the terminal device reduces a process of performing an SVD operation on the downlink channel matrix, to simplify the implementation.

In an optional implementation, the input dimension of the encoder network is M×N×T×2 or M×N×T, the output dimension of the encoder network is D×P×Q×R, S=P×Q×R, and M, N, D, P, Q, R, and T are all positive integers; and M=$N_{tx}$, N=$N_{sb}$, T=$N_{rx}$, and S≤$N_{rx}$×$N_{tx}$×$N_{sb}$. $N_{tx}$ represents a quantity of transmit antenna ports of the network device, $N_{sb}$ represents a quantity of frequency domain sub-bands, and $N_{rx}$ represents a quantity of receive antenna ports of the terminal device. $N_{rx}$, $N_{tx}$, and $N_{sb}$ are both positive integers. In a process of preprocessing the downlink channel matrix, the terminal device first converts the downlink channel matrix, to obtain a two-dimensional matrix included in a matrix obtained through conversion. Subsequently, space-frequency joint projection is performed on the two-dimensional matrix to obtain a complex matrix. For a processing manner after the complex matrix is obtained, refer to the description of the foregoing implementation. In this case, the input dimension of the encoder network is M×N×T×2 or M×N×T. In this case, the terminal device reduces a process of performing an SVD operation on the downlink channel matrix, to simplify the implementation.

In an optional implementation, the method further includes: sending information about the first vector quantization dictionary to the network device. For example, the terminal device sends the first vector quantization dictionary to the network device before sending the channel state information to the network device or in response to sending the channel state information (for example, in a same time unit), so that the network device obtains the downlink channel matrix through reconstruction based on the first vector quantization dictionary and the channel state information from the terminal device. For another example, the vector quantization dictionary is updated online. For example, the terminal device updates the vector quantization dictionary, so that the used vector quantization dictionary better matches a constantly changing channel environment, to more accurately feed back CSI.

In an optional implementation, the sending information about the first vector quantization dictionary to the network device includes: periodically sending the information about the first vector quantization dictionary to the network device; periodically sending the information about the first vector quantization dictionary to the network device after first configuration information is received from the network device; sending the information about the first vector quantization dictionary to the network device after first configuration information is received from the network device; sending the information about the first vector quantization dictionary to the network device in an arrival time unit of a first delay after first configuration information is received from the network device; sending the information about the first vector quantization dictionary to the network device after first parameter information is received from the network device, where the first parameter information indicates parameter information of the decoder network; sending the information about the first vector quantization dictionary to the network device in an arrival time unit of a first delay after first parameter information is received from the network device, where the first parameter information indicates parameter information of the decoder network; sending the information about the first vector quantization dictionary to the network device after first indication information is received from the network device, where the first indication information is used to indicate (or trigger) sending of a vector quantization dictionary; or sending the information about the first vector quantization dictionary to the network device in an arrival time unit of a first delay after first indication information is received from the network device, where the first indication information is used to indicate (or trigger) sending of a vector quantization dictionary. For example, a report parameter of the vector quantization dictionary is configured in the first configuration information. In response to the terminal device sending the information about the first vector quantization dictionary to the network device, there is a plurality of sending manners. Some of the manners are listed herein. A specific manner in which the terminal device sends the first vector quantization dictionary is negotiated by the terminal device and the network device, or is configured by the network device, or is specified in a protocol, or the like. This is relatively flexible.

Optionally, the first configuration information includes information about the first delay, or information about the first delay is indicated by using other signaling from the network device, or the first delay is agreed on in a protocol.

In an optional implementation, the method further includes: determining that a current networking manner is a first networking manner, and determining the first vector quantization dictionary corresponding to the first networking manner; determining that a current moving speed belongs to a first interval, and determining the first vector quantization dictionary corresponding to the first interval; determining a handover from a second cell to a first cell, and determining the first vector quantization dictionary corresponding to the first cell; determining switching from a second reference encoder network to the first reference encoder network, and determining the first vector quantization dictionary corresponding to the first reference encoder network; or receiving second indication information from the network device, where the second indication information indicates the first vector quantization dictionary.

In an optional implementation, the current networking manner is the first networking manner, and the first vector quantization dictionary is a vector quantization dictionary corresponding to the first networking manner; the moving speed of the terminal device belongs to the first interval, and the first vector quantization dictionary is a vector quantization dictionary corresponding to the first interval; the terminal device is handed over from the second cell to the first cell, and the first vector quantization dictionary is a vector quantization dictionary corresponding to the first cell; a used reference encoder network is switched from the second reference encoder network to the first reference encoder network, and the first vector quantization dictionary is a vector quantization dictionary corresponding to the first reference encoder network; or the first vector quantization dictionary is a vector quantization dictionary indicated by the second indication information, and the second indication information comes from the network device.

To use the first vector quantization dictionary, the terminal device first determines the first vector quantization dictionary. A manner of determining the first vector quantization dictionary by the terminal device includes, for example, an explicit manner and/or an implicit manner. In response to the explicit manner being used, for example, the network device sends signaling to indicate the first vector quantization dictionary. In response to the implicit manner being used, the foregoing several manners is included. In other words, a correspondence is established between the vector quantization dictionary and corresponding information (for example, a networking manner and a moving speed of the terminal device), so that the terminal device determines the first vector quantization dictionary based on the information. A signaling indication of the network device is not used in the implicit manner, to reduce signaling overheads. Alternatively, the terminal device determines the first vector quantization dictionary in a manner of combining the explicit manner and the implicit manner. This is not limited in at least one embodiment.

In an optional implementation, the method further includes: sending second parameter information to the network device, where the second parameter information indicates a parameter of the encoder network. In other words, the terminal device sends information about the parameter of the encoder network to the network device. For example, the vector quantization dictionary is alternatively updated by the network device. The network device has a decision-making right. In this case, optionally, the terminal device sends the parameter information of the encoder network to the network device, so that the network device updates the vector quantization dictionary with reference to the parameter information of the encoder network.

In an optional implementation, the sending second parameter information to the network device includes: periodically sending the second parameter information to the network device; periodically sending the second parameter information to the network device after second configuration information is received from the network device; sending the second parameter information to the network device after second configuration information is received from the network device; sending the second parameter information to the network device in an arrival time unit of a second delay after second configuration information is received from the network device; sending the second parameter information to the network device after third indication information is received from the network device, where the third indication information is used to indicate (for example, trigger) sending of the parameter information of the encoder network; or sending the second parameter information to the network device in an arrival time unit of a second delay after third indication information is received from the network device, where the third indication information indicates sending of the parameter information of the encoder network. For example, a report parameter of the second parameter information is configured in the second configuration information. In response to the terminal device sending the second parameter information to the network device, there is a plurality of sending manners. Some of the manners are listed herein. A specific manner in which the terminal device sends the second parameter information is negotiated by the terminal device and the network device, or is configured by the network device, is specified in a protocol, or the like. This is relatively flexible.

Optionally, the second configuration information includes information about the second delay, or information about the second delay is indicated by using other signaling from the network device, or the second delay is agreed on in a protocol.

According to a second aspect, another communication method is provided. The method is performed on a network device side. The method is performed by using software, hardware, or a combination of software and hardware. For example, the method is performed by a network device, or performed by a larger device including a network device, or performed by a circuit system, or performed by an AI module for assisting a network device or a network element for assisting a network device. Herein, the circuit system implements functions of the network device, and the AI module and the network element are independent of the network device. This is not limited. For example, the network device is an access network device such as a base station. The method includes: receiving channel state information, where the channel state information includes S indexes of S vectors; and obtaining information about a reconstructed downlink channel matrix based on the S indexes and a first vector quantization dictionary, where each of the S vectors is included in the first vector quantization dictionary, the first vector quantization dictionary includes $N_1$ vectors, and $N_1$ and S are both positive integers.

In an optional implementation, each of the $N_1$ vectors represents one channel feature.

In an optional implementation, the obtaining information about a reconstructed downlink channel matrix based on the S indexes and a first vector quantization dictionary includes: obtaining the information about the reconstructed downlink channel matrix based on the first vector quantization dictionary, the S indexes, and a decoder network.

In an optional implementation, the obtaining information about a reconstructed downlink channel matrix based on the S indexes and a first vector quantization dictionary (or obtaining the information about the reconstructed downlink channel matrix based on the first vector quantization dictionary, the S indexes, and a decoder network) includes: performing inverse mapping on the S indexes based on the first vector quantization dictionary to obtain a first matrix; and obtaining the information about the reconstructed downlink channel matrix based on the first matrix and the decoder network.

In an optional implementation, the obtaining the information about the reconstructed downlink channel matrix based on the first matrix and the decoder network includes: inputting the first matrix to the decoder network to obtain a second matrix; and obtaining the information about the reconstructed downlink channel matrix based on the second matrix.

In an optional implementation, the reconstructed downlink channel matrix meets the following relationship:

$$H=\Sigma_{k=1}^{M}\Sigma_{l=1}^{N}C(f_{dec}(q(ind_i)))\times U_{1,k}\times U^{*}_{2,l}, \text{ where}$$

$\{ind_i\}_{i=1\ldots S}$ represents the S indexes of the S vectors in the first vector quantization dictionary, a function $q(x)$ indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×N×2, the first matrix and the second matrix are both real matrices, a function $C(x)$ indicates to convert the second matrix into a complex matrix whose dimension is M×N, $\{U_{1,k}\}_{k=1\ldots M}$ represents a space domain basis vector set, $U_{1,k}$ represents a $k^{th}$ vector in the space domain basis vector set, a length of a vector included in the space domain basis vector set is $N_{tx}$, $\{U_{2,l}\}_{l=1\ldots N}$ represents a frequency domain basis vector set, $U_{2,l}$ represents an $l^{th}$ vector in the frequency domain basis vector set, a length of a vector included in the frequency domain basis vector set is $N_{sb}$, $N_{tx}$ represents a quantity of transmit antenna ports of the network device, $N_{sb}$ represents a quantity of frequency domain sub-bands, $U^{*}_{2,l}$ represents a conjugate transpose matrix (or vector) of $U_{2,l}$, and D, S, M, and N are all positive integers.

In an optional implementation, $M=N_{tx}$, and $N=N_{Sb}$; or $M \leq N_{tx}$, and $N \leq N_{sb}$; or $M=N_{tx} \times x$, and $N=N_{sb} \times y$, where x and y are both greater than 1, or x is equal to 1 and y is greater than 1, or x is greater than 1 and y is equal to 1.

In an optional implementation, the reconstructed downlink channel matrix meets the following relationship:

$$H=\Sigma_{j=1}^{M} C(f_{dec}(q(ind_i)))\times U_{1,(j,k)}\times U^*_{2,(j,l)}, \text{ where}$$

$\{ind_i\}_{i=1 \ldots S}$ represents the S indexes of the S vectors in the first vector quantization dictionary, a function q(x) indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×2, the first matrix and the second matrix are both real matrices, a function C(x) indicates to convert the second matrix into a complex matrix whose dimension is M, $M \leq N_{tx} \times N_{sb}$, $\{U_{1,(j,k)}\}_{j=1 \ldots M}$ represents a space domain basis vector set, $U_{1,(j,k)}$ represents a $j^{th}$ vector in the space domain basis vector set, a length of a vector included in the space domain basis vector set is $N_{tx}$, $\{U_{2,(j,l)}\}_{j=1 \ldots M}$ represents a frequency domain basis vector set, $U_{2,(j,l)}$ represents a $j^{th}$ vector in the frequency domain basis vector set, a length of a vector included in the frequency domain basis vector set is $N_{sb}$, $N_{tx}$ represents a quantity of transmit antenna ports of the network device, $N_{sb}$ represents a quantity of frequency domain sub-bands, $U^*_{2,(j,l)}$ represents a conjugate transpose vector of $U_{2,(j,l)}$, and D, S, and M are all positive integers.

In an optional implementation, the reconstructed downlink channel matrix meets the following relationship:

$$H=\Sigma_{k=1}^{M}\Sigma_{l=1}^{N}(C(f_{dec}(q(ind_i))))|_{t=1 \ldots T}\times U_{1,k}\times U^*_{2,l},$$
where $q(ind_i)$ represents the S indexes of the S vectors in the first vector quantization dictionary, a function q(x) indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×N×T×2, $T=N_{rx}$, the first matrix and the second matrix are both real matrices, a function C(x) indicates to convert the second matrix into a complex matrix whose dimension is M×N×T, $(x)|_{t=1 \ldots T}$ indicates to separately process (or reconstruct), based on the second matrix and the relationship (that is, the foregoing formula), T matrices whose dimensions are M×N to obtain the reconstructed downlink channel matrix, $\{U_{1,k}\}_{k=1 \ldots M}$ represents a space domain basis vector set, $U_{1,k}$ represents a $k^{th}$ vector in the space domain basis vector set, a length of a vector included in the space domain basis vector set is $N_{tx}$, $\{U_{2,l}\}_{l=1 \ldots N}$ represents a frequency domain basis vector set, $U_{2,l}$ represents an $l^{th}$ vector in the frequency domain basis vector set, a length of a vector included in the frequency domain basis vector set is $N_{sb}$, $N_{tx}$ represents a quantity of transmit antenna ports of the network device, $N_{sb}$ represents a quantity of frequency domain sub-bands, $U^*_{2,l}$ represents a conjugate transpose vector of $U_{2,l}$, and D, S, M, N, and T are all positive integers.

In an optional implementation, the reconstructed downlink channel matrix meets the following relationship:

$$H=\Sigma_{k=1}^{M}(C(f_{dec}(q(ind_i)))|_{t=1 \ldots T}\times U_{1,(j,k)}\times U^*_{2,(j,l)},$$
where $q(ind_i)$ represents the S indexes of the S vectors in the first vector quantization dictionary, a function q(x) indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×T×2, $T=N_{rx}$, the first matrix and the second matrix are both real matrices, a function C(x) indicates to convert the second matrix into a complex matrix whose dimension is M×T, $(x)|_{t=1 \ldots T}$ indicates to separately process (or reconstruct), based on the second matrix and the relationship (that is, the foregoing formula), T matrices whose dimensions are M to obtain the reconstructed downlink channel matrix, $\{U_{1,(j,k)}\}_{j=1 \ldots M}$ represents a space domain basis vector set, $U_{1,(j,k)}$ represents a $j^{th}$ vector in the space domain basis vector set, a length of a vector included in the space domain basis vector set is $N_{tx}$, $\{U_{2,(j,l)}\}_{j=1 \ldots M}$ represents a frequency domain basis vector set, $U_{2,(j,l)}$ represents a $j^{th}$ vector in the frequency domain basis vector set, a length of a vector included in the frequency domain basis vector set is $N_{sb}$, $N_{tx}$ represents a quantity of transmit antenna ports of the network device, $N_{sb}$ represents a quantity of frequency domain sub-bands, $U^*_{2,l}$ represents a conjugate transpose vector of $U_{2,l}$, and D, S, M, and T are all positive integers.

In an optional implementation, the reconstructed downlink channel matrix meets the following relationship:

$$H=\Sigma_{k=1}^{M}\Sigma_{l=1}^{N}f_{dec}(q(ind_i))\times U_{1,k}\times U^*_{2,l}, \text{ where}$$

$\{ind_i\}_{i=1 \ldots S}$ represents the S indexes of the S vectors in the first vector quantization dictionary, a function q(x) indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×N×2, the first matrix and the second matrix are both real matrices, $\{U_{1,k}\}_{k=1 \ldots M}$ represents a space domain basis vector set, $U_{1,k}$ represents a $k^{th}$ vector in the space domain basis vector set, a length of a vector included in the space domain basis vector set is $N_{tx}$, $\{U_{2,l}\}_{l=1 \ldots N}$ represents a frequency domain basis vector set, $U_{2,l}$ represents an $l^{th}$ vector in the frequency domain basis vector set, a length of a vector included in the frequency domain basis vector set is $N_{sb}$, $N_{tx}$ represents a quantity of transmit antenna ports of the network device, $N_{sb}$ represents a quantity of frequency domain sub-bands, $U^*_{2,l}$ represents a conjugate transpose vector of $U_{2,l}$, and D, S, M, and N are all positive integers.

In an optional implementation, $M=N_{tx}$, and $N=N_{sb}$; or $M \leq N_{tx}$, and $N \leq N_{sb}$; or $M=N_{tx}\times x$, and $N=N_{sb}\times y$, where x and y are both greater than 1.

In an optional implementation, the reconstructed downlink channel matrix meets the following relationship:

$$H=\Sigma_{j=1}^{M}f_{dec}(q(ind_i))\times U_{1,(j,k)}\times U^*_{2,(j,l)}, \text{ where}$$

$\{ind_i\}_{i=1 \ldots S}$ represents the S indexes of the S vectors in the first vector quantization dictionary, a function q(x) indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×2, the first matrix and the second matrix are both real matrices, $M \leq N_{tx} \times N_{sb}$, $\{U_{1,(j,k)}\}_{j=1 \ldots M}$ represents a space domain basis vector set, $U_{1,(j,k)}$ represents a $j^{th}$ vector in the space domain basis vector set, a length of a vector included in the space domain basis vector set is $N_{tx}$, $\{U_{2,(j,l)}\}_{j=1 \ldots M}$ represents a frequency domain basis vector set, $U_{2,(j,l)}$ represents a $j^{th}$ vector in the frequency domain basis vector set, a length of a vector included in the frequency domain basis vector set is $N_{sb}$, $N_{tx}$ represents a quantity of transmit antenna ports of the network device, $N_{sb}$ represents a quantity of frequency domain sub-bands, $U^*_{2,(j,l)}$ represents a conjugate transpose vector of $U_{2,(j,l)}$, and D, S, and M are all positive integers.

In an optional implementation, the reconstructed downlink channel matrix meets the following relationship:

$$H=\Sigma_{k=1}^{M}\Sigma_{l=1}^{N}(f_{dec}(q(ind_i)))|_{t=1 \ldots T}\times U_{1,k}\times U^*_{2,l},$$
where q($ind_i$) represents the S indexes of the S vectors in the first vector quantization dictionary, a function q(x) indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×N×T×2, $T=N_{rx}$, the first matrix and the second matrix are both real matrices, $(x)|_{t=1 \ldots T}$ indicates to process (or reconstruct), based on the second matrix and the relationship (that is, the foregoing formula), T matrices whose dimensions are M×N to obtain the reconstructed downlink channel matrix, $\{U_{1,k}\}_{k=1 \ldots M}$ represents a space domain basis vector set, $U_{1,k}$ represents a $k^{th}$ vector in the space domain basis vector set, a length of a vector included in the space domain basis vector set is $N_{rx}$, $\{U_{2,l}\}_{l=1 \ldots N}$ represents a frequency domain basis vector set, $U_{2,l}$ represents an $P^{th}$ vector in the frequency domain basis vector set, a length of a vector included in the frequency domain basis vector set is $N_{sb}$, $N_{rx}$ represents a quantity of transmit antenna ports of the network device, $N_{sb}$ represents a quantity of frequency domain sub-bands, $U^*_{2,l}$ represents a conjugate transpose vector of $U_{2,l}$, and D, S, M, N, and T are all positive integers.

In an optional implementation, the reconstructed downlink channel matrix meets the following relationship:

$$H = \Sigma_{k=1}^{M}(f_{dec}(q(ind_i)))|_{t=1 \ldots T} \times U_{1,(j,k)} \times U^*_{2,(j,l)},$$
where q($ind_i$) represents the S indexes of the S vectors in the first vector quantization dictionary, a function q(x) indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×T×2, $T=N_{rx}$, the first matrix and the second matrix are both real matrices, $(x)|_{t=1 \ldots T}$ indicates to process (or reconstruct), based on the second matrix and the relationship (that is, the foregoing formula), T matrices whose dimensions are M to obtain the reconstructed downlink channel matrix, $\{U_{1,(j,k)}\}_{j=1 \ldots M}$ represents a space domain basis vector set, $U_{1,(j,k)}$ represents a $j^{th}$ vector in the space domain basis vector set, a length of a vector included in the space domain basis vector set is $N_{rx}$, $\{U_{2,(j,l)}\}_{j=1 \ldots M}$ represents a frequency domain basis vector set, $U_{2,(j,l)}$ represents a $j^{th}$ vector in the frequency domain basis vector set, a length of a vector included in the frequency domain basis vector set is $N_{sb}$, $N_{rx}$ represents a quantity of transmit antenna ports of the network device, $N_{sb}$ represents a quantity of frequency domain sub-bands, $U^*_{2,l}$ represents a conjugate transpose vector of $U_{2,l}$, and D, S, M, and T are all positive integers.

In an optional implementation, the method further includes: receiving information about the first vector quantization dictionary.

In an optional implementation, the receiving information about the first vector quantization dictionary includes: periodically receiving the information about the first vector quantization dictionary; periodically receiving the information about the first vector quantization dictionary after first configuration information is sent; receiving the information about the first vector quantization dictionary after first configuration information is sent; receiving the information about the first vector quantization dictionary in an arrival time unit of a first delay after first configuration information is sent; receiving the information about the first vector quantization dictionary after first parameter information is sent, where the first parameter information indicates parameter information of a decoder network; receiving the information about the first vector quantization dictionary in an arrival time unit of a first delay after first parameter information is sent, where the first parameter information indicates parameter information of a decoder network; receiving the information about the first vector quantization dictionary after first indication information is sent, where the first indication information is used to indicate (for example, trigger) sending of the vector quantization dictionary; or receiving the information about the first vector quantization dictionary in an arrival time unit of a first delay after first indication information is sent, where the first indication information is used to indicate (for example, trigger) to send the vector quantization dictionary.

Optionally, the first configuration information includes information about the first delay, or information about the first delay is indicated by using other signaling from the network device, or the first delay is agreed on in a protocol.

In an optional implementation, the method further includes: determining that a current networking manner with a terminal device is a first networking manner, and determining the first vector quantization dictionary corresponding to the first networking manner; determining that a current moving speed of a terminal device belongs to a first interval, and determining the first vector quantization dictionary corresponding to the first interval; determining that a terminal device is handed over from a second cell to a first cell, and determining the first vector quantization dictionary corresponding to the first cell; determining that a terminal device is switched from a second reference encoder network to a first reference encoder network, and determining the first vector quantization dictionary corresponding to the first reference encoder network; or sending second indication information, where the second indication information indicates the information about the first vector quantization dictionary.

In an optional implementation, the current networking manner is the first networking manner, and the first vector quantization dictionary is a vector quantization dictionary corresponding to the first networking manner; the moving speed of the terminal device belongs to the first interval, and the first vector quantization dictionary is a vector quantization dictionary corresponding to the first interval; the terminal device is handed over from the second cell to the first cell, and the first vector quantization dictionary is a vector quantization dictionary corresponding to the first cell; a reference encoder network used by the terminal device is switched from the second reference encoder network to a first reference encoder network, and the first vector quantization dictionary is a vector quantization dictionary corresponding to the first reference encoder network; or the method includes: sending second indication information, where the second indication information indicates the information about the first vector quantization dictionary.

In an optional implementation, the method further includes: receiving second parameter information, where the second parameter information indicates a parameter of an encoder network.

In an optional implementation, the receiving second parameter information includes: periodically receiving the second parameter information; periodically receiving the second parameter information after second configuration information is sent; receiving the second parameter information in an arrival time unit of a second delay after second configuration information is sent; receiving the second parameter information after third indication information is sent, where the third indication information indicates sending of parameter information of the encoder network; or receiving the second parameter information in an arrival time unit of a second delay after third indication information is sent, where the third indication information indicates sending of parameter information of the encoder network.

Optionally, the second configuration information includes information about the second delay, or information about the second delay is indicated by using other signaling from the network device, or the second delay is agreed on in a protocol.

For technical effect brought by the second aspect or various optional implementations, refer to the description of the technical effect brought by the first aspect or the corresponding implementations.

According to a third aspect, a communication apparatus is provided. The communication apparatus implements the method in the first aspect. The communication apparatus has functions of the foregoing terminal device. In an optional implementation, the apparatus includes modules that are in a one-to-one correspondence with the methods/operations/steps/actions described in the first aspect. The modules is implemented by a hardware circuit, software, or a combination of a hardware circuit and software. In at least one embodiment, the communication apparatus includes a baseband apparatus and a radio apparatus. In another optional implementation, the communication apparatus includes a processing unit (also referred to as a processing module sometimes) and a transceiver unit (also referred to as a transceiver module sometimes). The transceiver unit implements a sending function and a receiving function. In response to the transceiver unit implementing the sending function, the transceiver unit is referred to as a sending unit (sometimes referred to as a sending module). In response to the transceiver unit implementing the receiving function, the transceiver unit is referred to as a receiving unit (sometimes referred to as a receiving module). The sending unit and the receiving unit is a same functional module. The functional module is referred to as a transceiver unit. The functional module implements the sending function and the receiving function. Alternatively, the sending unit and the receiving unit is different functional modules. The transceiver unit is a general term of these functional modules.

The processing unit is configured to: determine channel state information, where the channel state information is determined based on S indexes of S vectors, each of the S vectors is included in a first vector quantization dictionary, the first vector quantization dictionary includes $N_1$ vectors, and $N_1$ and S are both positive integers. The transceiver unit (or the sending unit) is configured to send the channel state information to a network device.

For another example, the communication apparatus includes a processor and a communication interface. The processor uses the communication interface to implement the method described in the first aspect. The communication interface is used by the apparatus to communicate with another device. For example, the communication interface is a transceiver, a circuit, a bus, a pin, a module, or another type of communication interface. For example, the processor is configured to: determine channel state information, where the channel state information is determined based on S indexes of S vectors, each of the S vectors is included in a first vector quantization dictionary, the first vector quantization dictionary includes $N_1$ vectors, and $N_1$ and S are both positive integers; and the processor sends the channel state information to a network device by using the communication interface. The apparatus further includes a memory. The memory is configured to store program instructions and data. The memory is coupled to the processor. In response to executing the instructions stored in the memory, the processor implements the method described in the first aspect.

For another example, the communication apparatus includes a processor, coupled to a memory and configured to execute instructions in the memory, to implement the method in the first aspect. Optionally, the communication apparatus further includes another component, for example, an antenna, an input/output module, and an interface. These components is hardware, software, or a combination of software and hardware.

According to a fourth aspect, a communication apparatus is provided. The communication apparatus implements the method in the second aspect. The communication apparatus has functions of the foregoing network device. The network device is, for example, a base station or a baseband apparatus in abase station. In an optional implementation, the apparatus includes modules that are in a one-to-one correspondence with the methods/operations/steps/actions described in the second aspect. The modules is implemented by a hardware circuit, software, or a combination of a hardware circuit and software. In at least one embodiment, the communication apparatus includes a baseband apparatus and a radio apparatus. In another optional implementation, the communication apparatus includes a processing unit (also referred to as a processing module sometimes) and a transceiver unit (also referred to as a transceiver module sometimes). For an implementation of the transceiver unit, refer to the related description in the fourth aspect.

The transceiver unit (or the receiving unit) is configured to receive channel state information. The channel state information includes S indexes of S vectors.

The processing unit is configured to obtain information about a reconstructed downlink channel matrix based on the S indexes and a first vector quantization dictionary. Each of the S vectors is included in the first vector quantization dictionary. The first vector quantization dictionary includes $N_1$ vectors. $N_1$ and S are both positive integers.

For another example, the communication apparatus includes a processor and a communication interface. The processor uses the communication interface to implement the method described in the second aspect. The communication interface is used by the apparatus to communicate with another device. For example, the communication interface is a transceiver, a circuit, a bus, a pin, a module, or another type of communication interface. For example, the processor receives the channel state information by using the communication interface. The channel state information includes S indexes of S vectors. The processor is configured to obtain information about a reconstructed downlink channel matrix based on the S indexes and a first vector quantization dictionary. Each of the S vectors is included in the first vector quantization dictionary. The first vector quantization dictionary includes $N_1$ vectors. $N_1$ and S are both positive integers. The apparatus further includes a memory. The memory is configured to store program instructions and data. The memory is coupled to the processor. In response to executing the instructions stored in the memory, the processor implements the method described in the second aspect.

For another example, the communication apparatus includes a processor, coupled to a memory and configured to execute instructions in the memory, to implement the method in the second aspect. Optionally, the communication apparatus further includes another component, for example, an antenna, an input/output module, and an interface. These components is hardware, software, or a combination of software and hardware.

According to a fifth aspect, a computer-readable storage medium is provided. The computer-readable storage medium is configured to store a computer program or instructions. In response to the computer program or instructions being run, the method in the first aspect or the second aspect is implemented.

According to a sixth aspect, a computer program product including instructions is provided. In response to the computer program product being run on a computer, the method in the first aspect or the second aspect is implemented.

According to a seventh aspect, a chip system is provided. The chip system includes a processor, and further includes a memory. The chip system is configured to implement the method in the first aspect or the second aspect. The chip system includes a chip, or includes a chip and another discrete device.

According to an eighth aspect, a communication system is provided, including the communication apparatus in the third aspect and the communication apparatus in the fourth aspect.

DESCRIPTION OF EMBODIMENTS

To make objectives, technical solutions, and advantages of embodiments described herein clearer, the following further describes at least one embodiment in detail with reference to the accompanying drawings.

Figure 1:
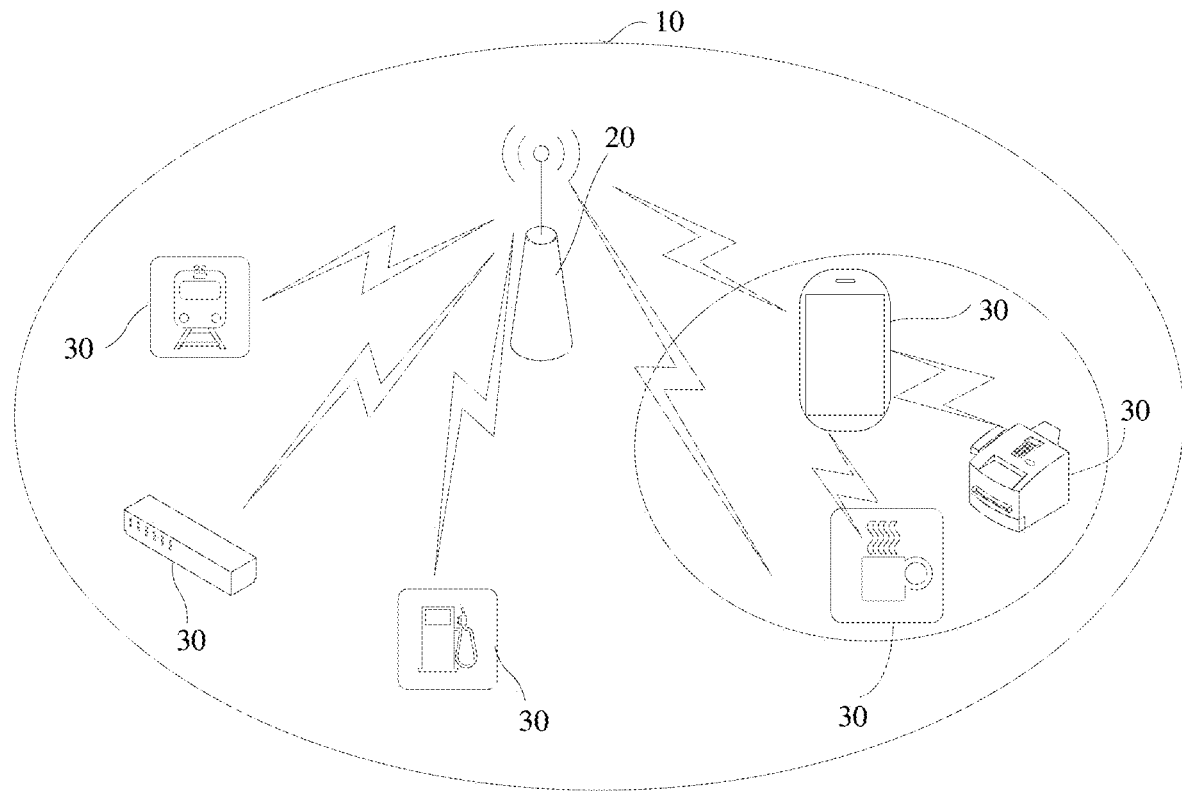
FIG. 1 is a schematic diagram of a communication system.

Technologies provided in at least one embodiment is applied to a communication system 10 shown in FIG. 1. The communication system 10 includes one or more communication apparatuses 30 (for example, a terminal device). The one or more communication apparatuses 30 are connected to one or more core network (core network, CN) devices through one or more access network (radio access network, RAN) devices 20, to implement communication between a plurality of communication devices. For example, the communication system 10 is a communication system that supports a 4G (including long term evolution (long term evolution, LTE)) access technology, a communication system that supports a 5G (sometimes referred to as new radio, NR) access technology, a wireless fidelity (wireless fidelity, Wi-Fi) system, a cellular system related to the 3rd generation partnership project (3rd generation partnership project, 3GPP), a communication system that supports convergence of a plurality of radio technologies, or a future-oriented evolved system.

The following separately describes in detail the terminal device and the RAN in FIG. 1.

1. Terminal Device

The terminal device is, briefly referred to as a terminal, a device having wireless sending and receiving functions. The terminal device is mobile or fixed. The terminal device is deployed on land, for example, including an indoor or outdoor device, a handheld device, or a vehicle-mounted device; is deployed on water (for example, on a ship); or is deployed in the air (for example, on an airplane, a balloon, and a satellite). The terminal device includes a mobile phone (mobile phone), a tablet computer (pad), a computer with wireless sending and receiving functions, a virtual reality (virtual reality, VR) terminal device, an augmented reality (augmented reality, AR) terminal device, a wireless terminal device in industrial control (industrial control), a wireless terminal device in self-driving (self-driving), a wireless terminal device in remote medical (remote medical), a wireless terminal device in a smart grid (smart grid), a wireless terminal device in transportation safety (transportation safety), a wireless terminal device in a smart city (smart city), and/or a wireless terminal device in a smart home (smart home). Alternatively, the terminal device is a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device with a wireless communication function, a vehicle-mounted device, a wearable device, a terminal device in the future 5th generation (the 5th generation, 5G) network, a terminal device in a future evolved public land mobile network (public land mobile network, PLMN), or the like. The terminal device is also referred to as user equipment (user equipment, UE) sometimes. Optionally, the terminal device communicates with a plurality of access network devices that use different technologies. For example, the terminal device communicates with an access network device that supports LTE, or communicates with an access network device that supports 5G, or simultaneously communicates with an access network device that supports LTE and an access network device that supports 5G. This is not limited in at least one embodiment.

In at least one embodiment, an apparatus configured to implement functions of the terminal device is a terminal device, or is an apparatus that supports the terminal device in implementing the functions, for example, a chip system, a hardware circuit, a software module, or a hardware circuit and a software module. The apparatus is installed in the terminal device or is used in a matching manner with the terminal device. In the technical solutions provided in at least one embodiment, an example in which the apparatus for implementing the functions of the terminal device is a terminal device and the terminal device is UE is used to describe the technical solutions provided in at least one embodiment.

In at least one embodiment, the chip system includes a chip, or includes a chip and another discrete device.

2. RAN

The RAN includes one or more RAN devices, for example, a RAN device 20. An interface between the RAN device and the terminal device is a Uu interface (or referred to as an air interface). In future communication, names of these interfaces remains unchanged, or is replaced with other names. This is not limited in at least one embodiment.

The RAN device is a node or a device that enables the terminal device to access the radio network. The RAN device is also referred to as a network device or a base station. For example, the RAN device includes but is not limited to: a base station, a next-generation NodeB (generation NodeB, gNB) in 5G, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a transmitting and receiving point (transmitting and receiving point, TRP), a transmission point (transmitting point, TP), and/or a mobile switching center. Alternatively, the access network device is at least one of a central unit (central unit, CU), a distributed unit (distributed unit, DU), a central unit control plane (CU control plane, CU-CP) node, a central unit user plane (CU user plane, CU-UP) node, integrated access and backhaul (integrated access and backhaul, IAB), a radio controller in a cloud radio access network (cloud radio access network, CRAN) scenario, or the like. Alternatively, the access network device is a relay station, an access point, a vehicle-mounted device, a terminal device, a wearable device, an access network device in a 5G network, an access network device in a future evolved public land mobile network (public land mobile network, PLMN), or the like.

In at least one embodiment, an apparatus configured to implement functions of the access network device is an access network device, or is an apparatus that supports the access network device in implementing the functions, for example, a chip system, a hardware circuit, a software module, or a hardware circuit and a software module. The apparatus is installed in the access network device or is used in a matching manner with the access network device. In the technical solutions provided in at least one embodiment, an example in which the apparatus for implementing the functions of the access network device is an access network device and the access network device is a base station is used to describe the technical solutions provided in at least one embodiment.

(1) Protocol Layer Structure

Communication between the access network device and the terminal device complies with a specific protocol layer structure. The protocol layer structure includes a control plane protocol layer structure and a user plane protocol layer structure. For example, the control plane protocol layer structure includes functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. For example, the user plane protocol layer structure includes functions of protocol layers such as the PDCP layer, the RLC layer, the MAC layer, and the physical layer. In an implementation, a service data adaptation protocol (service data adaptation protocol, SDAP) layer is further included above the PDCP layer.

(2) Central Unit (Central Unit, CU) and Distributed Unit (Distributed Unit, DU)

A RAN device includes a CU and a DU. A plurality of DUs is centrally controlled by one CU. For example, an interface between the CU and the DU is referred to as an F1 interface. A control plane (control plane, CP) interface is F1-C, and a user plane (user panel, UP) interface is F1-U. The CU and the DU is obtained through division based on protocol layers of a wireless network. For example, functions of the PDCP layer and a protocol layer above the PDCP layer are set on the CU, and functions of a protocol layer below the PDCP layer (for example, the RLC layer and the MAC layer) are set on the DU. For another example, functions of a protocol layer above the PDCP layer are set on the CU, and functions of the PDCP layer and a protocol layer below the PDCP layer are set on the DU.

Division of processing functions of the CU and the DU based on the protocol layers is merely an example. Division is alternatively performed in another manner. For example, the CU or the DU has functions of more protocol layers through division. For another example, the CU or the DU alternatively has some processing functions of protocol layers through division. In a design, some functions of the RLC layer and functions of protocol layers above the RLC layer are set on the CU, and remaining functions of the RLC layer and functions of a protocol layer below the RLC layer are set on the DU. In another design, division of functions of the CU or the DU is alternatively performed based on a service type or another system usage. For example, division is performed based on delays. A function whose processing time is to meet a delay parameter set on the DU, and a function whose processing time is able to not meet the delay parameter set on the CU. In another design, the CU alternatively has one or more functions of a core network. For example, the CU is disposed on a network side to facilitate centralized management. In another design, a radio unit (radio unit, RU) of the DU is remotely disposed. The RU has a radio frequency function.

Optionally, the DU and the RU is further divided at the physical layer (physical layer, PHY). For example, the DU implements higher-layer functions of the PHY layer, and the RU implements lower-layer functions of the PHY layer. In a sending procedure, the functions of the PHY layer includes: a cyclic redundancy check (cyclic redundancy check, CRC) code addition function, channel encoding, rate matching, scrambling, modulation, layer mapping, precoding, resource mapping, physical antenna mapping, and/or a radio frequency sending function. In a receiving procedure, the functions of the PHY layer includes CRC, channel decoding, rate dematching, descrambling, demodulation, layer demapping, channel sounding, resource demapping, physical antenna demapping, and/or a radio frequency receiving function. The higher-layer functions of the PHY layer includes some functions of the PHY layer. For example, the functions are closer to the MAC layer. The lower-layer functions of the PHY layer includes some other functions of the PHY layer. For example, these functions are closer to a radio frequency function. For example, the higher-layer functions of the PHY layer includes CRC code addition, channel encoding, rate matching, scrambling, modulation, and layer mapping; and the lower-layer functions of the PHY layer includes precoding, resource mapping, physical antenna mapping, and a radio frequency sending function. Alternatively, the higher-layer functions of the PHY layer includes CRC code addition, channel encoding, rate matching, scrambling, modulation, layer mapping, and precoding; and the lower-layer functions of the PHY layer includes resource mapping, physical antenna mapping, and a radio frequency sending function.

For example, the functions of the CU is implemented by one entity or different entities. For example, the functions of the CU is further divided. To be specific, the control plane and the user plane are separated and implemented by using different entities that are respectively a control plane CU entity (namely, a CU-CP entity) and a user plane CU entity (namely, a CU-UP entity). The CU-CP entity and the CU-UP entity is coupled to the DU, to jointly complete functions of the RAN device.

In the foregoing described architecture, signaling generated by the CU is sent to the terminal device through the DU, or signaling generated by the terminal device is sent to the CU through the DU. For example, signaling at the RRC layer or the PDCP layer is finally processed to obtain signaling at the physical layer and sent to the terminal device, or be converted from signaling received from the physical layer. In this architecture, the signaling at the RRC layer or the PDCP layer is considered to be sent through the DU or sent through the DU and the RU.

Optionally, any one of the DU, the CU, the CU-CP, the CU-UP, and the RU is a software module, a hardware structure, or a software module and a hardware structure. This is not limited. Different entities exist in different forms. This is not limited. For example, the DU, the CU, the CU-CP, and the CU-UP are software modules, and the RU is a hardware structure. These modules and methods performed by the modules also fall within the protection scope of at least one embodiment.

In at least one embodiment, the RAN device includes the CU-CP, the CU-UP, the DU, and the RU. For example, an execution entity of the method in at least one embodiment includes the DU, or includes the DU and the RU, or includes the CU-CP, the DU, and the RU. This is not limited. Methods performed by the modules also fall within the protection scope of at least one embodiment.

Because the network device in at least one embodiment is mainly an access network device, unless otherwise specified, the "network device" described below is an "access network device".

A quantity of devices in the communication system shown in FIG. 1 is merely used as an example, and at least one embodiment is not limited thereto. In actual application, the communication system further includes more terminal devices and more RAN devices; and further includes another device, for example, includes a core network device and/or a node configured to implement an artificial intelligence function.

The network architecture shown in FIG. 1 is used in communication systems of various radio access technologies (radio access technology, RAT), for example, a 4G communication system, or a 5G (or referred to as a new radio (new radio, NR)) communication system, or a transition system between an LTE communication system and a 5G communication system. The transition system is also referred to as a 4.5G communication system, or is a future communication system, for example, a 6G communication system. The network architecture and the service scenarios described in at least one embodiment are intended to describe the technical solutions in at least one embodiment more clearly, and do not constitute a limitation on the technical solutions provided in at least one embodiment. A person of ordinary skill in the art knows that, with evolution of a communication network architecture and emergence of new service scenarios, the technical solutions provided in at least one embodiment are also applicable to similar technical problems.

In addition to communication between the network device and the terminal device, the method provided in at least one embodiment is also used for communication between other communication devices, for example, communication between a macro base station and a micro base station in a wireless backhaul link, or communication between a first terminal device and a second terminal device in a sidelink (sidelink, SL). This is not limited. In at least one embodiment, the communication between the network device and the terminal device is used as an example for description.

In response to sending data to the terminal device, the network device performs precoding based on CSI fed back by the terminal device. For ease of understanding of at least one embodiment, the following first briefly describes some technical terms used in at least one embodiment.

1. Precoding Technology

In response to a channel state being known, the network device processes a to-be-sent signal by using a precoding matrix matching a channel condition. This technology is used to match a precoded to-be-sent signal with a channel, to improve quality (for example, an SINR) of a signal received by the terminal device and reduce complexity of eliminating impact between channels by the terminal device. By using the precoding technology, a sending device (for example, a network device) and a plurality of receiving devices (for example, terminal devices) effectively perform transmission on a same time-frequency resource, that is, effectively implement multiple-user multiple-input multiple-output (multiple user multiple input multiple output, MU-MIMO). Related description of the precoding technology is merely an example for ease of understanding, and is not intended to limit the disclosed scope of at least one embodiment. In a specific implementation process, the sending device alternatively performs precoding in another manner. For example, in response to channel information (for example but not limited to, a channel matrix) not being known, precoding is performed by using a preset precoding matrix or through weighting. For brevity, specific content of the precoding is not described in embodiments described herein.

2. Dual-Domain Compression

Dual-domain compression includes compression in two dimensions: space domain compression and frequency domain compression. Dual-domain compression includes two steps: space-frequency joint projection and compression. Space-frequency joint projection indicates to project a space-frequency two-dimensional channel matrix H separately by using a U1 matrix and a U2 matrix. The U1 matrix represents a space domain basis, and the U2 matrix represents a frequency domain basis. A projected equivalent coefficient matrix H has a sparse feature. Only some elements in the matrix H have relatively large modulus values. In other words, energy is concentrated in few space-frequency positions. Some coefficients with relatively high energy are selected from the sparse equivalent matrix H. The coefficients are quantized to implement compression. In other words, through the dual-domain compression, low-dimensional subspace is used to represent high-dimensional channel space.

3. CSI Feedback (CSI Feedback)

The CSI feedback is also referred to as a CSI report (CSI report). The CSI feedback is that, in a wireless communication system, a receiving end (for example, a terminal device) reports, to a transmitting end (for example, a network device), information used to describe a channel attribute of a communication link. The CSI report includes, for example, a precoding matrix indicator (precoding matrix indicator, PMI), a rank indicator (rank indicator, RI), and a channel quality indicator (channel quality indicator, CQI). The foregoing enumerated content included in the CSI is merely an example for description, and should not constitute any limitation on at least one embodiment. The CSI includes one or more of the foregoing items, or includes other information used to represent CSI other than the foregoing enumerated information. This is not limited in at least one embodiment.

4. Neural Network (Neural Network, NN)

The neural network is a specific implementation form of machine learning technologies. According to the universal approximation theorem, theoretically, the neural network approximates any continuous function, so that the neural network learns any mapping. In a conventional communication system, a communication module is able to be designed without rich expert knowledge. However, a neural network-based deep learning communication system automatically finds an implicit pattern structure from a large quantity of data sets, establish a mapping relationship between data, and obtain performance better than that of a conventional modeling method.

For example, a deep neural network (deep neural network, DNN) is a neural network with a relatively large quantity of layers. Based on different network structures and use scenarios, the DNN includes a multi-layer perceptron (multi-layer perceptron, MLP), a convolutional neural network (convolutional neural network, CNN), a recurrent neural network (recurrent neural network, RNN), and the like. A specific form of the DNN is not limited in at least one embodiment.

Figure 2:
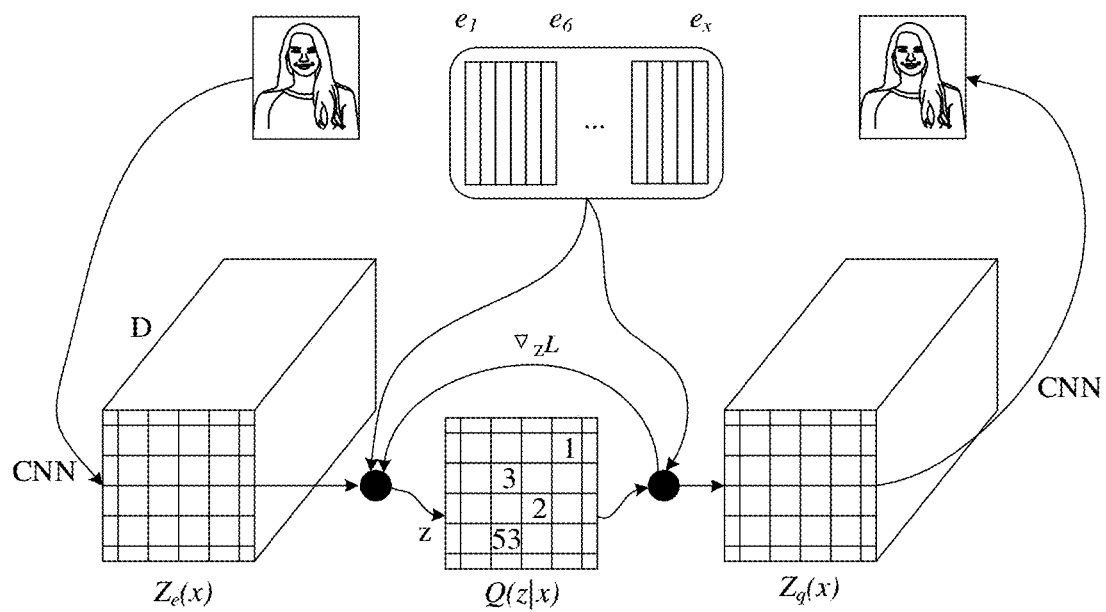
FIG. 2 is a schematic diagram of a working manner of a VQ-AE network.

5. Vector Quantization Auto-Encoder (Vector-Quantization Auto-Encoder, VQ-AE) Network or VQ-AE for Short The VQ-AE network includes an encoder and a corresponding decoder. For example, the encoder and/or the decoder are/is implemented by using a neural network (such as a DNN). In this case, the encoder is also referred to as an encoder network, and the decoder is also referred to as a decoder network. Based on an auto-encoder (auto-encoder, AE) network, in the VQ-AE network, a vector quantization (VQ) form is combined, and an optimization mechanism of joint training is designed. For example, in the AE network, the encoder and the corresponding decoder is obtained through joint training; and in the VQ-AE network, the encoder, the corresponding decoder, and a corresponding VQ dictionary is obtained through joint training. The encoder, the decoder, and the VQ dictionary that are obtained through training is used to encode and decode information. For example, an image is encoded by using the VQ-AE. As shown in FIG. 2, after an original image is input to the encoder of the VQ-AE, an output eigenmatrix is, for example, $Z_e(x)$. In this case, the original image is input information of the encoder, and $Z_e(x)$ is output information of the encoder or an encoding result.

In at least one embodiment, a feature distance is calculated between each D-dimensional vector in the eigenmatrix $Z_e(x)$ and each of x preset D-dimensional vectors. The x preset D-dimensional vectors is considered as a vector quantization dictionary, or a vector quantization dictionary includes the x D-dimensional vectors and optionally includes another vector. As described above, the vector quantization dictionary is also obtained through training. In FIG. 2, $e_1$ to $e_x$ represent the x preset D-dimensional vectors. For a D-dimensional vector in $Z_e(x)$, in response to a feature distance between the D-dimensional vector and an $i^{th}$ D-dimensional vector in the x D-dimensional vectors being the smallest, an index i of the $i^{th}$ D-dimensional vector in the x D-dimensional vectors is filled in a two-dimensional grid Q(z|x), to obtain an index matrix $Z_q(x)$. The index matrix $Z_q(x)$ is sent to a decoder side. In at least one embodiment, for each D-dimensional vector in the eigenmatrix $Z_e(x)$, in the x D-dimensional vectors, in response to a feature distance between the D-dimensional vector and an $i^{th}$ D-dimensional vector in the x D-dimensional vectors being less than a threshold, an index i of the $i^{th}$ D-dimensional vector in the x D-dimensional vectors is filled in a two-dimensional grid Q(z|x), to obtain an index matrix $Z_q(x)$. The index matrix $Z_q(x)$ is sent to a decoder side. In response to the $i^{th}$ D-dimensional vector being determined, all the x D-dimensional vectors is traversed, or some of the x D-dimensional vectors is traversed. This is not limited. A specific implementation of determining the $i^{th}$ D-dimensional vector from the x D-dimensional vectors is not limited in at least one embodiment.

The decoder side processes the index matrix $Z_q(x)$. For example, an index in the index matrix $Z_q(x)$ is restored to a corresponding matrix based on the vector quantization dictionary. For example, the matrix is represented as $p(x|z_q)$, and the matrix $p(x|z_q)$ is used as input information of the decoder. In this case, the decoder reconstructs information about the original image based on the information.

In at least one embodiment, unless otherwise specified, a quantity of nouns indicates "a singular noun or a plural noun", namely, "one or more". "At least one" means one or more, and "a plurality of" means two or more. "And/or" describes an association relationship for describing associated objects and indicates that three relationships exist. For example, A and/or B indicates the following cases: Only A exists, both A and B exist, and only B exists, where A and B is singular or plural. In response to a feature being indicated, the character "/" indicates an "or" relationship between associated objects. For example, A/B indicates A or B. In response to an operation being indicated, the symbol "/" further indicates a division operation. In addition, in at least one embodiment, the symbol "x" is also replaced with a symbol "*".

Ordinal numerals such as "first" and "second" in at least one embodiment are used to distinguish between a plurality of objects, and are not intended to limit sizes, content, an order, a time sequence, application scenarios, priorities, or importance degrees of the plurality of objects. For example, a first vector quantization dictionary and a second vector quantization dictionary is a same vector quantization dictionary, or is different vector quantization dictionaries. In addition, these names do not indicate that the two vector quantization dictionaries include different content, priorities, application scenarios, importance degrees, or the like.

Figure 3:
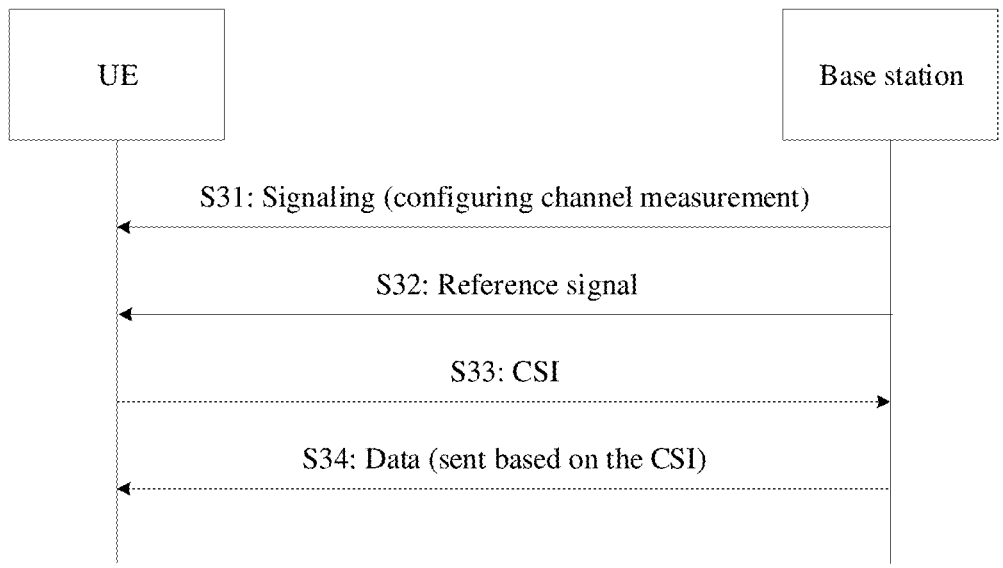
FIG. 3 is a flowchart of a CSI feedback mechanism.

In at least one embodiment, a CSI feedback mechanism uses a procedure shown in FIG. 3.

S31: A base station sends signaling, and correspondingly, UE receives the signaling from the base station.

The signaling is used to configure channel measurement information. For example, the signaling is used to notify the UE of at least one of the following: time information for performing channel measurement, a type of a reference signal (reference signal, RS) for performing channel measurement, a time domain resource of a reference signal, a frequency domain resource of a reference signal, and a report condition of a measured quantity.

S32: The base station sends a reference signal to the UE, and correspondingly, the UE receives the reference signal from the base station.

The UE measures the reference signal to obtain CSI.

S33: The UE sends the CSI to the base station, and correspondingly, the base station receives the CSI from the UE.

S34: The base station sends data to the UE based on the CSI, and correspondingly, the UE receives the data from the base station.

The data sent by the base station to the UE is carried on a downlink channel, for example, carried on a physical downlink shared channel (physical downlink shared channel, PDSCH). Optionally, a CSI feedback technology is used by the base station to send another downlink channel to the UE, for example, a physical downlink control channel (physical downlink control channel, PDCCH). In at least one embodiment, an example in which the CSI is used to transmit a PDSCH is used for description. The base station determines, based on an RI fed back by the UE, a quantity of flows used in response to the data being sent to the UE; and determines, based on a CQI fed back by the UE, a modulation order used in response to the data being sent to the UE, and/or an encoding bit rate of a channel carrying the data, and the like. In addition, the base station determines, based on a PMI fed back by the UE, a precoding matrix used in response to the data being sent to the UE, and the like.

In at least one embodiment, in the CSI feedback technology, the UE performs compression (such as dual-domain compression) on a measured channel matrix by using a sparse representation of a channel, and then quantize a coefficient extracted through compression to obtain the CSI. However, in dual-domain compression, some coefficients with higher energy are to be selected from an equivalent sparse matrix H, and the coefficients are quantized and fed back. Remaining coefficients are not fed back. Therefore, in response to the CSI feedback technology being used to feed back the CSI, a part of measured information is directly discarded. This leads to low accuracy of the fed-back CSI.

In view of this, the technical solutions in at least one embodiment are provided. In at least one embodiment, channel state information is determined based on a first vector quantization dictionary. For example, the channel state information is represented by using indexes of one or more vectors included in the first vector quantization dictionary. Because a dimension of a vector is usually relatively large, and is equivalent to dimension expansion on information or reduction of an information loss, thereby improving quantization precision. In addition, because the fed-back information is an index of a vector, an original channel matrix is compressed, thereby reducing signaling overheads. In addition, in a VQ-AE network, a quantization network and a compression network are jointly designed, so that joint optimization is implemented between compression and quantization, to reduce a performance loss and improve overall accuracy of the fed-back channel state information.

Figure 4A:
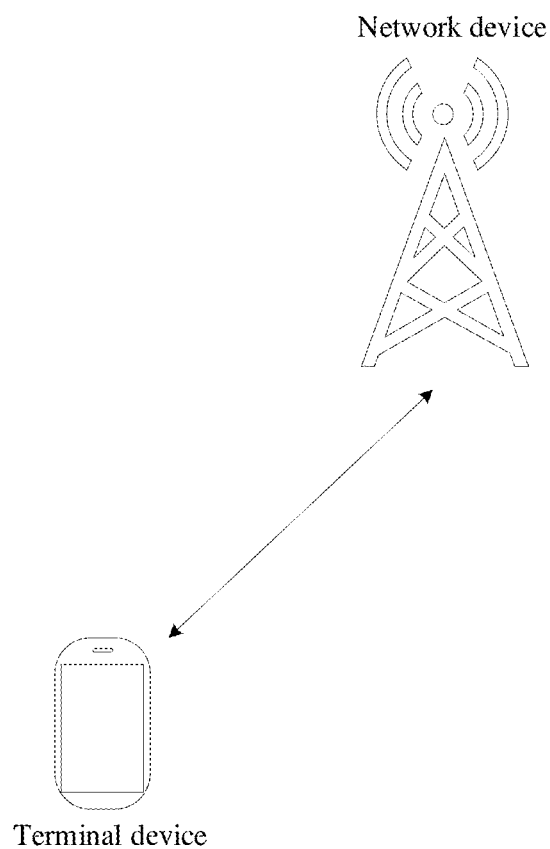
FIG. 4A is a schematic diagram of an application scenario.

FIG. 4A shows an architecture of a communication network in a communication system 10 according to at least one embodiment. Any one of embodiments shown in FIG. 5 to FIG. 8 that are subsequently provided is applicable to the architecture. A network device included in FIG. 4A is, for example, an access network device 20 included in the communication system 10, and a terminal device included in FIG. 4A is, for example, a communication apparatus 30 included in the communication system 10. The network device communicates with the terminal device.

A machine learning technology in at least one embodiment is a specific implementation of an artificial intelligence (artificial intelligence, AI) technology. For ease of understanding, the following describes the AI technology. The description is not intended to limit at least one embodiment.

AI is a technology for performing complex computing through simulating human brains. With improvement of data storage and capabilities, AI is increasingly applied.

Figure 4B:
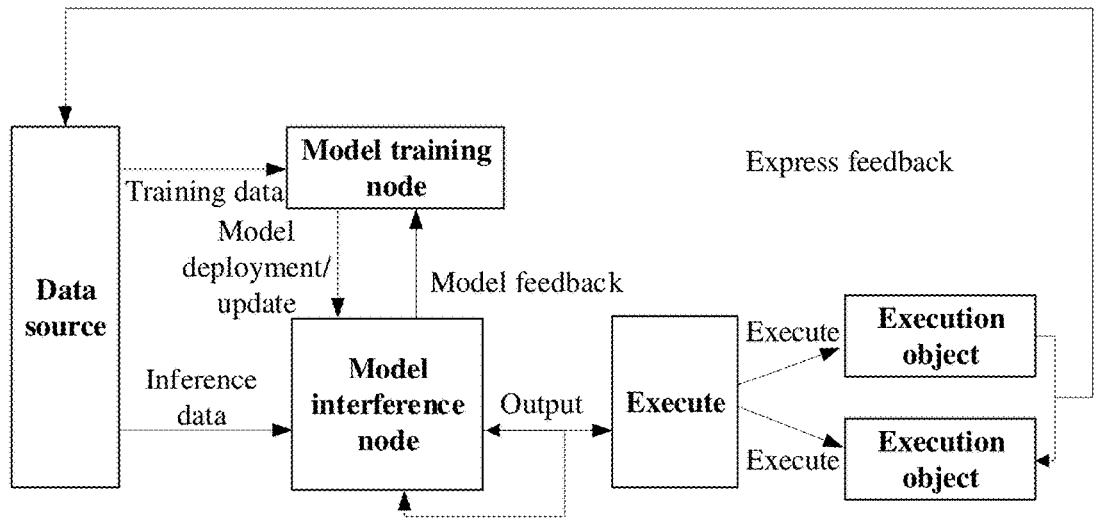
FIG. 4B to FIG. 4E are schematic diagrams of several application frameworks of AI in a communication system.

FIG. 4B is a schematic diagram of a first application framework of AI in a communication system. A data source (data source) is used to store training data and inference data. A model training node (model training host) analyzes or trains the training data (training data) provided by the data source to obtain an AI model, and deploys the AI model on a model inference node (model inference host). A model inference node uses the AI model to perform inference based on the inference data provided by the data source and obtain an inference result. The inference result is uniformly planned by an execution entity (actor), and is sent to one or more execution objects (for example, network entities) for execution.

For example, the AI model includes a decoder network in a VQ-AE network. The decoder network is deployed on a network device side. An inference result of the decoder network is, for example, used for reconstruction of a downlink channel matrix. The AI model includes an encoder network in the VQ-AE network. The encoder network is deployed on a UE side. An inference result of the encoder network is, for example, used for encoding of a downlink channel matrix.

Figure 4C:
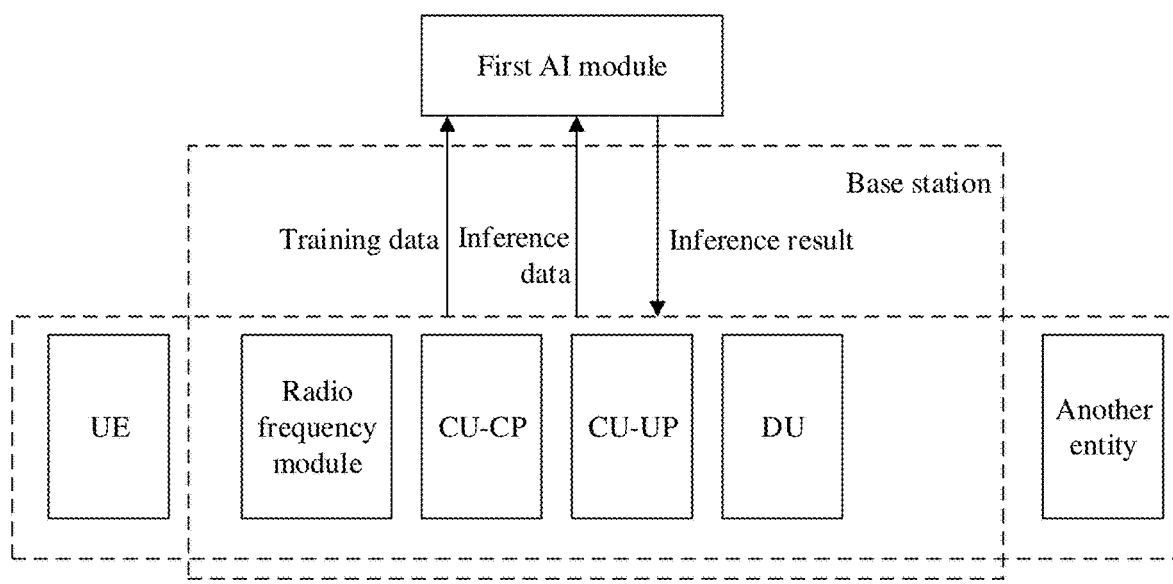
Figure 4D:
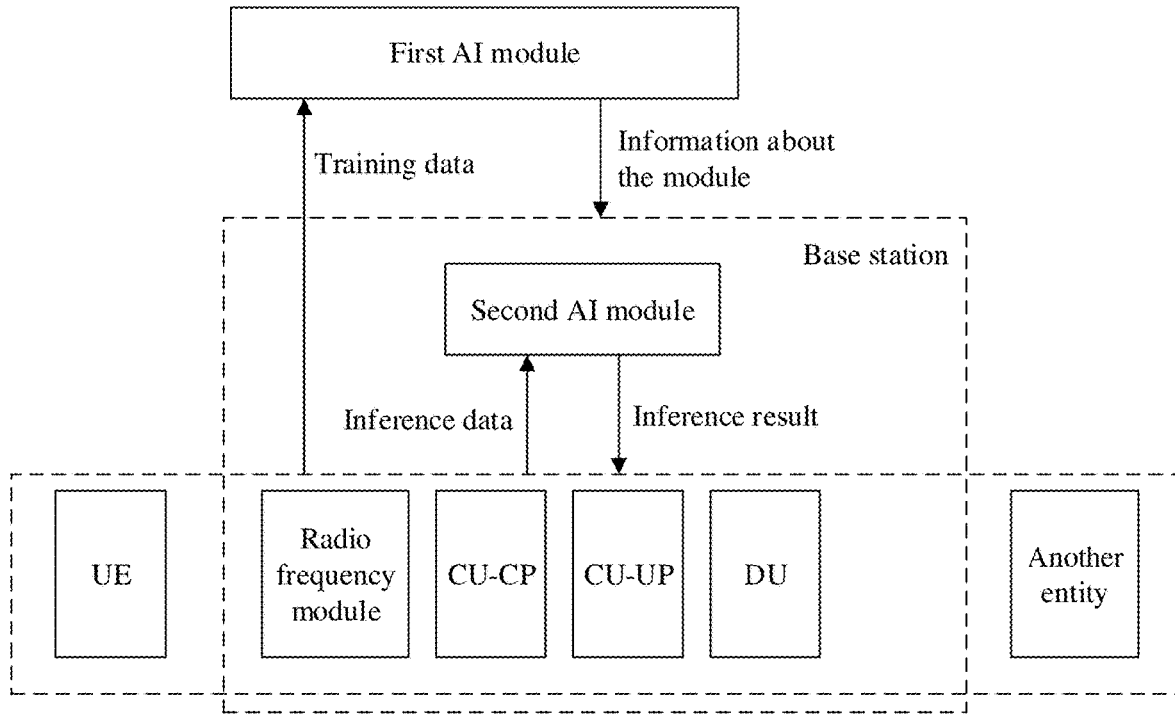
Figure 4E:
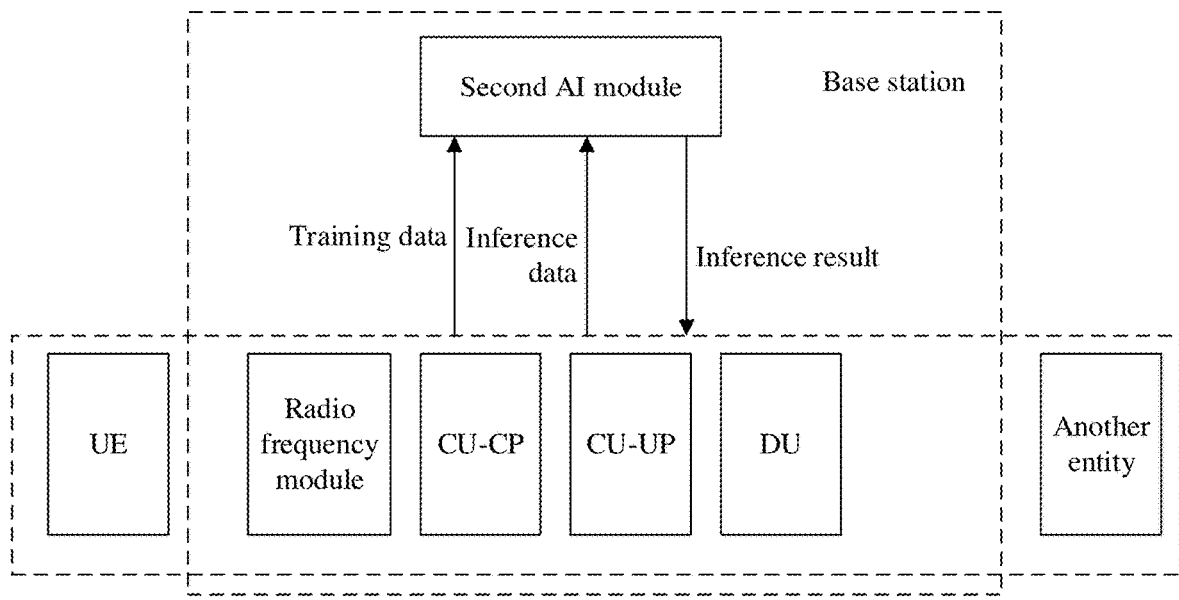

FIG. 4C, FIG. 4D, or FIG. 4E is a schematic diagram of a second application framework of AI in a communication system.

A first AI module independent of a base station receives the training data. The first AI module analyzes or trains the training data to obtain an AI model. With reference to FIG. 4C, for a parameter, the first AI module performs inference by using a corresponding AI model and the inference data to obtain the parameter. Alternatively, with reference to FIG. 4D, for a parameter, the first AI module sends information about the AI model to a second AI module located in a base station (or located in a RAN in description), and the second AI module performs inference by using a corresponding AI model and the inference data to obtain the parameter. Alternatively, with reference to FIG. 4E, the AI model used by the second AI module for inference is obtained by the second AI module through receiving the training data and training the training data. The AI model includes the decoder network in the VQ-AE network. On a base station side, an inference result of the decoder network is, for example, used for reconstruction of a downlink channel matrix. Optionally, the AI model includes the encoder network in the VQ-AE network, and model information of the encoder network is sent to the UE for inference performed by the UE.

In the frameworks in FIG. 4B to FIG. 4E, the AI model is briefly referred to as a model, and the AI model is considered as mapping from an input parameter (for example, an input matrix) to an output parameter (for example, an output matrix). For example, for the decoder network on the base station side, the input matrix is a matrix determined based on the received CSI. The training data includes a known input matrix, or include a known input matrix and a corresponding output matrix. The training data is used to train the AI model. The training data is data from the base station, a CU, a CU-CP, a CU-UP, a DU, an RU, UE, and/or another entity; and/or data inferred by using the AI technology. This is not limited. The inference data includes an input matrix, and is used to infer an output matrix by using a model. The inference data is data from the base station, the CU, the CU-CP, the CU-UP, the DU, the RU, the UE, and/or the another entity. The inferred matrix is considered as policy information, and sent to the execution object. The inferred matrix is sent to the base station, the CU, the CU-CP, the CU-UP, the DU, the RU, the UE, or the like for further processing, for example, for reconstruction of a downlink channel matrix.

In at least one embodiment, on a network side, the decoder network in the VQ-AE network is deployed in the network device (for example, the base station), for example, deployed in the RU, the DU, or the second AI module; or is deployed in an AI device (for example, the first AI module) independent of the network device. This is not limited. The inference result of the decoder network is obtained by the network device through inference, or is sent to the network device after the first AI module performs inference. For brief description, in at least one embodiment, an example in which the decoder network is deployed in the network device is used for description.

In at least one embodiment, the encoder network in the VQ-AE network is deployed in the UE, and the UE performs inference by using the encoder network.

The method provided in at least one embodiment is described below with reference to the accompanying drawings. In the accompanying drawings corresponding to at least one embodiment, all steps represented by using dashed lines is optional steps. In these methods, included steps or operations are merely examples. In at least one embodiment, other operations or variations of various operations is further performed. In addition, the steps is performed in different orders presented in at least one embodiment, and not all operations are performed.

In a technology in which CSI feedback is performed with reference to a neural network, a relatively typical neural network architecture is a dual architecture. An auto-encoder is used as an example, compressed transmission is implemented through joint optimization of an encoder and a decoder. For example, one or more reference network groups (or referred to as one or more reference networks) is obtained through training. These reference networks each is a pair of an encoder network (or referred to as reference encoder networks) and a decoder network (or referred to as reference decoder networks). In other words, a reference network group includes a reference encoder network and a corresponding reference decoder network. These reference networks is trained offline or online. In response to the training being performed offline, a specification is provided in a protocol. For example, the protocol provides parameters such as network structures and/or weights of these reference networks (including the reference encoder network and the reference decoder network). The UE or the network device implements these reference networks according to the protocol. Optionally, according to the protocol, evaluated performance corresponding to these specific reference networks is provided based on an agreed-on data set.

For example, encoding is performed on a UE side. In at least one embodiment, the UE selects a reference decoder network in the one or more reference network groups based on a factor such as complexity or performance, and train (offline or online), in a targeted manner, one or more encoder networks that is used in at least one embodiment. For a reference decoder network, the encoder network trained by the UE in the targeted manner is referred to as an encoder network corresponding to the reference decoder network. Correspondingly, the network device also selects a reference encoder network in the one or more reference network groups, and train (offline or online), in a targeted manner, one or more decoder networks that is used in at least one embodiment. For a reference encoder network, the decoder network trained by the network device in the targeted manner is referred to as a decoder network corresponding to the reference encoder network. The protocol does not restrict whether the actually used encoder network or decoder network is a reference network predefined in the protocol, but restricts evaluated performance of the actually used encoder network and corresponding reference decoder network to meet indicators specified in the protocol, and further restricts evaluated performance of the actually used decoder network and corresponding reference encoder network to meet indicators specified in the protocol. The protocol restricts the actually deployed encoder network to have same input and output dimensions as the corresponding reference encoder network, and/or restrict the decoder network to have same input and output dimensions as the corresponding reference decoder network.

At least one embodiment is based on a VQ-AE network. A difference from the auto-encoder lies in that a reference network group (or a reference network) in the VQ-AE network is a pair of a vector quantization encoder network (that is also briefly referred to as a reference encoder network) and a vector quantization decoder network (that is also briefly referred to as a reference decoder network), and a corresponding vector quantization dictionary (set). The vector quantization dictionary (set) is also referred to as a reference vector quantization dictionary (set). The vector quantization encoder network, the vector quantization decoder network, and the vector quantization dictionary (set) is jointly trained and optimized. Similar to the foregoing steps, one or more reference network groups is trained offline or online. In response to the offline training method being used, the protocol defines the one or more reference network groups, and optionally define a performance evaluation method and an indicator of the reference network.

Optionally, a vector quantization dictionary A defined in a reference network group is not necessarily a universal set of a vector quantization dictionary B defined in the protocol. For example, the protocol defines the vector quantization dictionary B including more vectors, and the vector quantization dictionary A corresponding to the group of the reference encoder network/the reference decoder network is only a subset of the vector quantization dictionary B. The "define" herein is an association relationship. For example, the protocol defines a reference vector quantization dictionary set. The set includes a plurality of vector quantization dictionaries. The reference vector quantization dictionary A included in the reference network group is, for example, one reference vector quantization dictionary in the reference vector quantization dictionary set. For example, in the reference vector quantization dictionary set, each reference vector quantization dictionary corresponds to an index. The reference vector quantization dictionary included in the reference network group corresponds to an index in the reference vector quantization dictionary set.

Optionally, before step S501 in at least one embodiment starts, two communication parties respectively train an encoder network and a decoder network for at least one embodiment (for example, meeting a performance indicator) online or offline based on the one or more reference network groups specified in the protocol. Because the vector quantization dictionary is to be known by the two communication parties, at an initial stage of network access communication, the vector quantization dictionary used by the two communication parties is, for example, predefined in the corresponding reference network; or is determined in another manner. With support of a subsequent signaling mechanism, one communication party exchanges, with the other communication party, the vector quantization dictionary trained offline by the communication party, and actually use the vector quantization dictionary.

Figure 5:
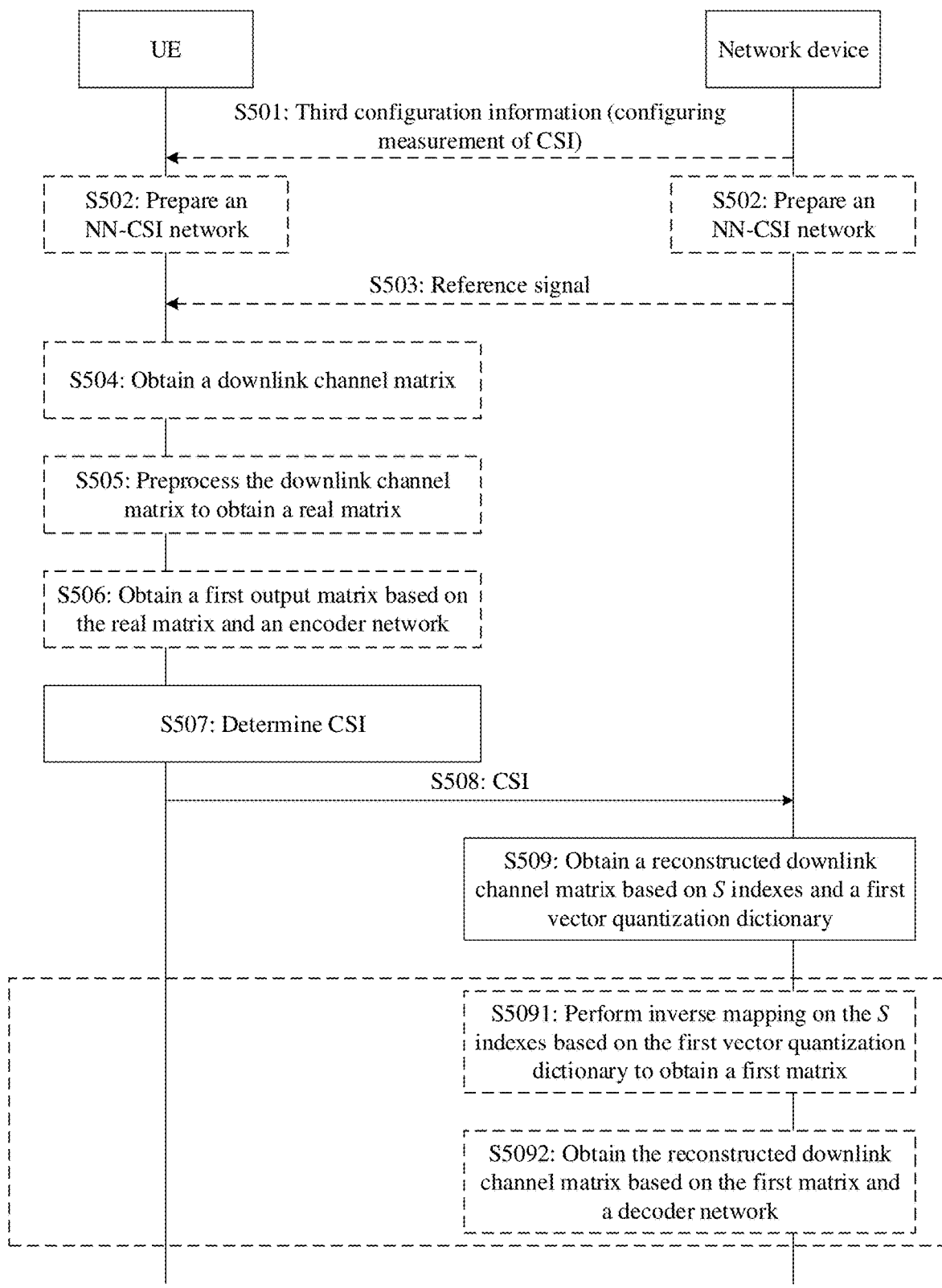
FIG. 5 to FIG. 8 are flowcharts of several communication methods.

FIG. 5 is a flowchart of a first communication method according to at least one embodiment.

S501: A network device sends configuration information to UE, and correspondingly, the UE receives the configuration information from the network device.

For example, the configuration information is referred to as configuration information 1 or third configuration information. The third configuration information is used to configure a parameter used during CSI measurement and/or CSI reporting. Therefore, the configuration information is also referred to as configuration information of CSI measurement.

The third configuration information is sent by the network device to the UE. The third configuration information indicates CSI resource configuration (CSI resource settings) and/or CSI reporting configuration (report quantity), and the like. For example, the third configuration information is used to indicate at least one of the following: a type of a reference signal used for measurement (for example, a channel state information reference signal (channel state information reference signal, CSI-RS) or a signal in a synchronization signal and a physical broadcast channel block (synchronization signal and physical broadcast channel block, SSB), a time domain resource and/or a frequency domain resource of a reference signal (for example, an index of the reference signal, a port number of the reference signal, and/or a period of the reference signal), a CSI reporting format, a time domain resource and/or a frequency domain resource used for CSI reporting, a trigger condition of CSI reporting, and/or a period of CSI reporting.

In at least one embodiment, the UE determines CSI by using a vector quantization dictionary in a VQ-AE network. The vector quantization dictionary in the VQ-AE network is similar to a public key or a public codebook, and is known by both communication parties (for example, the network device and the UE) in advance. Therefore, the third configuration information also includes information about the vector quantization dictionary. The following uses examples to describe a definition manner of the vector quantization dictionary.

1. A Protocol Predefines the Vector Quantization Dictionary.

The vector quantization dictionary is predefined by the protocol. To be specific, the protocol defines one or more vector quantization dictionaries, and defines a format, a specific parameter, and the like of each vector quantization dictionary. In this case, the two communication parties obtains all information about the vector quantization dictionary according to the protocol. The information includes a specific value (or is referred to as a weight, namely, a weight of a vector quantization dictionary that includes values of some or all elements in the vector quantization dictionary) of each vector included in the vector quantization dictionary. Each vector quantization dictionary includes one or more vectors.

The weight of the vector quantization dictionary is jointly updated with an encoder network/a decoder network. Therefore, in an offline training scenario, the weight of the vector quantization dictionary is also determined in an offline training manner. However, offline training usually focuses on generalization performance of a model. Therefore, a vector quantization dictionary obtained through offline training is generally applicable to all users in a given communication scenario. Generally, the vector quantization dictionary with universality obtained through offline training is pre-loaded by the device and used as the first vector quantization dictionary used In response to the UE initially accessing the network, until the UE is notified that the vector quantization dictionary is to be switched or updated. Generally, the predefined vector quantization dictionary with universality and a pair of a reference encoder network and a reference decoder network form a default reference network group. Optionally, the default reference network group further includes another parameter. This is not limited. The default reference network group is a reference network used by the UE in response to the UE initially accessing the network, in response to the UE entering a fallback mode, and/or in response to the network device not indicating the UE by using signaling.

2. A Protocol Predefines a Format of the Vector Quantization Dictionary.

The protocol defines one or more vector quantization dictionaries, and defines a format of each vector quantization dictionary, for example, define a length of a vector and/or a quantity of vectors included in the vector quantization dictionary. Optionally, a weight of a vector is not defined, or some elements of a vector is defined, or weights of some vectors in the dictionary is defined. An undefined weight of a vector is filled or updated through another mechanism.

In response to a solution of feeding back CSI by using a VQ-AE network (for example, briefly referred to as a VQ-AE-CSI solution) being actually applied, for some UEs in relatively fixed positions in a cell, the UEs does not generalize the network. Therefore, parameter filling or update is performed on the vector quantization dictionary based on a real-time channel environment. The method is described as follows: determining, in some online training manners, a dictionary weight that is adapted to a channel environment of a small region in which these UEs are located. In this manner, CSI reconstruction precision is further improved. The online training (or referred to as online update) manner is described in another embodiment below.

3. The Network Device Sends the Vector Quantization Dictionary.

The network device sends a format and/or a specific parameter (for example, a weight parameter) of one or more vector quantization dictionaries to the UE, and the UE uses the vector quantization dictionary from the network device as the vector quantization dictionary in the VQ-AE-CSI solution. In response to the network device sending a plurality of vector quantization dictionaries to the UE, the network device further additionally indicates a specific to-be-used vector quantization dictionary to the UE, or the UE determines a specific to-be-used vector quantization dictionary based on another factor (for example, an application scenario). This case is for a scenario in which a plurality of small cells are deployed. Each small cell has only limited coverage. In the limited coverage, the small cell obtains a targeted vector quantization dictionary through offline training or online training. The vector quantization dictionary is used by the UE accessing the small cell. In this case, the network device determines a format, a weight parameter, and the like of the vector quantization dictionary, and deliver the vector quantization dictionary to the UE.

The protocol predefines the plurality of vector quantization dictionaries. The UE determines the vector quantization dictionary in an implicit manner, or in an explicit manner, or in a combination of an implicit manner and an explicit manner. The following uses examples for description.

1. Explicit Manner

For example, the explicit manner includes: The UE determines the to-be-used vector quantization dictionary based on signaling (for example, indication signaling or switching signaling) sent by the network device.

In at least one embodiment, the signaling sent by the network device to the UE is, for example, radio resource control (radio resource control, RRC) signaling, a media access control (media access control, MAC) control element (control element, CE), or downlink control information (downlink control information, DCI).

With reference to at least one embodiment, the signaling includes, for example, the third configuration information or other signaling. For example, the third configuration information further includes a format and/or a weight parameter of the first vector quantization dictionary (corresponding to the foregoing manner in which the network device sends the vector quantization dictionary), or further includes an index (corresponding to the foregoing manner in which the protocol predefines the vector quantization dictionary, for example, the third configuration information indicates an index of the first vector quantization dictionary from the plurality of vector quantization dictionaries predefined by the protocol). The first vector quantization dictionary is, for example, a dictionary used by the VQ-AE network. The network device sends the first vector quantization dictionary or the index of the first vector quantization dictionary to the UE by using the third configuration information. This is a relatively simple dictionary delivery manner. In a scenario in which real-time update is not used, the first vector quantization dictionary is delivered by using the third configuration information (usually, RRC signaling).

In response to the signaling being a MAC-CE or DCI, the signaling indicates the index or an index set of the first vector quantization dictionary. In this design, signaling overheads is reduced.

In response to a notification being performed in the explicit manner, the network device sends one piece of signaling or sends a plurality of pieces of signaling to the UE. For a manner of sending the plurality of pieces of signaling, a notification manner for the plurality of pieces of signaling is a combination of the foregoing several signaling notification manners. For example, in a combination manner, the network device sends an index set of a group of vector quantization dictionaries by using signaling 1 (for example, RRC signaling or a MAC-CE), and the network device further indicates the index of the first vector quantization dictionary by using DCI, where the first vector quantization dictionary is included in the group of vector quantization dictionaries; and the UE determines the first vector quantization dictionary based on the two pieces of signaling. Formats, specific parameters, and/or the like of the group of vector quantization dictionaries is included in the third configuration information. In other words, information such as the formats and the parameters of the group of vector quantization dictionaries is sent by using the third configuration information, and then the signaling 1 and the DCI are used to indicate the specific to-be-used vector quantization dictionary. Alternatively, formats, specific parameters, and/or indexes of various vector quantization dictionaries in the group of vector quantization dictionaries is alternatively specified in a protocol. For another example, in another combination manner, the network device sends a group of vector quantization dictionaries (including formats, weights, and/or indexes of each group of vector quantization dictionaries) by using RRC signaling, and indicates an index of a vector quantization dictionary in the group of vector quantization dictionaries by using a MAC-CE or DCI; and the UE determines the vector quantization dictionary based on the two pieces of signaling. Alternatively, there is another combination manner. This is not limited in at least one embodiment.

The foregoing explicit indication manner is merely an example of the solution in at least one embodiment, and is not a limitation on the solution in at least one embodiment. Any manner of determining the vector quantization dictionary in the explicit manner falls within the protection scope of at least one embodiment.

2. Implicit Manner

In an optional implementation of the implicit manner, in the protocol, a vector quantization dictionary (for example, the first vector quantization dictionary) is predefined. The first vector quantization dictionary is universal to all channels of the UE. In this case, switching of the vector quantization dictionary is not related. In this case, the network device does not send the first vector quantization dictionary, and the UE determines the first vector quantization dictionary according to the protocol; and the network device also determines the first vector quantization dictionary according to the protocol. This is a relatively simple implementation of the protocol. In at least one embodiment, the first vector quantization dictionary is defined together with a (default) reference network. In other words, the reference network includes a reference vector quantization dictionary, a decoder network, and an encoder network.

In another optional implementation of the implicit manner, the protocol defines the plurality of vector quantization dictionaries. For example, these vector quantization dictionaries have a correspondence with configuration of one or more other system parameters. Therefore, in response to the one or more system parameters changing, the vector quantization dictionaries corresponding to the system parameters are also switched accordingly. The following uses examples for description.

For example, there is a correspondence between a networking scenario (or referred to as a networking manner) and each of the plurality of vector quantization dictionaries. Different networking manners match different vector quantization dictionaries, or match a same vector quantization dictionary. In this case, for example, in response to the UE determining that a current networking manner is a first networking manner, the UE determines a vector quantization dictionary (for example, the first vector quantization dictionary) corresponding to the first networking manner. Therefore, the network device is able to not send the first vector quantization dictionary. The network device also determines the first vector quantization dictionary according to the protocol. For example, different networking manners include a line-of-sight (line of sight, LoS) path and a non-line-of-sight (non line of sight, nLoS) path, and the two networking manners respectively correspond to vector quantization dictionaries. For another example, different networking manners include an urban microcell (urban microcell, Umi) and an urban macrocell (urban macrocell, Uma), and Umi and Uma corresponds to respective vector quantization dictionaries. In this implementation, the vector quantization dictionary is bound to the networking manner. Therefore, switching of the vector quantization dictionary is in the implicit manner. To be specific, in response to a communication scenario (or a networking manner) being determined, the vector quantization dictionary is also determined. On the contrary, in response to a communication scenario being switched, the vector quantization dictionary is also switched accordingly.

For another example, the plurality of vector quantization dictionaries match different moving speeds. For example, a moving speed of the UE is divided into a plurality of intervals, and different intervals respectively match corresponding vector quantization dictionaries. A division granularity is not limited in at least one embodiment. Different intervals match different vector quantization dictionaries, or match a same vector quantization dictionary. In this case, for example, in response to the UE determining that a current moving speed belongs to a first interval, the UE determines a vector quantization dictionary (for example, the first vector quantization dictionary) corresponding to the first interval. Therefore, the network device is able to not send the first vector quantization dictionary. In this implementation, the vector quantization dictionary is bound to the moving speed of the UE. Therefore, switching of the vector quantization dictionary is in the implicit manner. To be specific, in response to the moving speed of the UE being determined, the vector quantization dictionary is also determined. Correspondingly, in response to the moving speed of the UE changing, the vector quantization dictionary is also switched accordingly.

For another example, the plurality of vector quantization dictionaries match different antenna configuration and/or bandwidths. The bandwidth herein is, for example, a bandwidth of a carrier used for communication between the two communication parties, or a maximum bandwidth supported by the UE, or a bandwidth of an active bandwidth part (bandwidth part, BWP) of the UE. This is not limited. In response to the antenna configuration and/or the bandwidth changing, input and output dimensions of the encoder network and the decoder network changes accordingly. In at least one embodiment, the vector quantization dictionary is related to the encoder network and/or the decoder network. Especially in response to the vector quantization dictionary and the encoder network and/or the decoder network being jointly trained and optimized, in response to the encoder network and/or the decoder network changing, the vector quantization dictionary also changes accordingly. Therefore, after determining the antenna configuration and/or the bandwidth, the UE determines the first vector quantization dictionary. In this implementation, a correspondence is established between the vector quantization dictionary and the antenna configuration and/or the bandwidth. Therefore, switching of the vector quantization dictionary is in the implicit manner.

The foregoing several implicit manners is separately applied, or any combination of a plurality of the foregoing implicit manners is applied. For example, in a manner of applying a combination, the protocol defines the plurality of vector quantization dictionaries, and these vector quantization dictionaries match different reference networks and moving speeds. For example, there is a plurality of combinations of the moving speed and the reference network, and different combinations match corresponding vector quantization dictionaries. For example, in response to the moving speed of the UE belonging to the first interval and the current reference network being a first reference network, this case matches a vector quantization dictionary 1; or in response to the moving speed of the UE belonging to the first interval and the current reference network being a second reference network, this case matches a vector quantization dictionary 2.

The protocol defines a vector quantization dictionary, an encoder network, and a decoder network in a correspondence by using a form of a reference network. In consideration of this, implicit indications in the foregoing several implementations is uniformly given by an index of the reference network. In other words, the UE determines the index of the reference network based on the current networking manner, the moving speed, the antenna configuration, or the system bandwidth; and then determines the first vector quantization dictionary based on the index.

3. Combination of an Explicit Manner and an Implicit Manner

In an implementation, the protocol defines one or more vector quantization dictionary sets (for example, the protocol predefines a plurality of vector quantization dictionaries, where some or all of the vector quantization dictionaries belong to the one or more vector quantization dictionary sets), and each vector quantization dictionary set includes one or more vector quantization dictionaries. The UE determines a vector quantization dictionary set in the explicit manner, and determines a to-be-used vector quantization dictionary in the vector quantization dictionary set in the implicit manner. Alternatively, the UE determines a to-be-used vector quantization dictionary set in the implicit manner, and determines a to-be-used vector quantization dictionary in the vector quantization dictionary set in the explicit manner.

For example, the network device sends signaling to the UE, and the signaling indicates a vector quantization dictionary set 1 in the plurality of vector quantization dictionary sets defined by the protocol. In other words, the UE determines the vector quantization dictionary set in the explicit manner. The vector quantization dictionary set 1 includes a plurality of vector quantization dictionaries. For example, a vector quantization dictionary included in the vector quantization dictionary set 1 has a correspondence with a moving speed of the UE, and the correspondence is preconfigured in the UE. In this case, the UE determines a current moving speed of the UE, and determine that a vector quantization dictionary corresponding to an interval in which the current moving speed of the UE is located is the to-be-used vector quantization dictionary. The UE determines the vector quantization dictionary in the vector quantization dictionary set in the implicit manner.

For another example, there is a correspondence between a networking manner and each of the plurality of vector quantization dictionary sets defined in the protocol, and the correspondence is preconfigured in the UE. In this case, the UE determines a current networking manner of the UE and the network device, and determine that a vector quantization dictionary set corresponding to the networking manner is the to-be-used vector quantization dictionary set. For example, the vector quantization dictionary set is the vector quantization dictionary set 1. In other words, the UE determines the vector quantization dictionary set in the implicit manner. The network device sends signaling to the UE. The signaling indicates a vector quantization dictionary A in the vector quantization dictionary set 1. In this case, the UE determines to use the vector quantization dictionary A. In other words, the UE determines the vector quantization dictionary in the explicit manner.

Certainly, the foregoing is merely an example. An implementation of combining the explicit manner and the implicit manner is not limited thereto.

S502: The UE prepares a neural network (neural network, NN)-CSI network, and the network device prepares an NN-CSI network. The neural network herein is, for example, the foregoing VQ-AE network, or is another neural network.

Step S502 is implementation behaviors of the devices. A specific implementation form of step S502 is not limited. For example, in response to the network device sending the third configuration information to the UE, the third configuration information includes an information bit to indicate the UE to enable (enable) an artificial intelligence (artificial intelligence, AI)-based CSI feedback procedure or to indicate the UE to enable a VQ-AE network-based CSI feedback procedure. In this case, the network device prepares the NN- CSI network (for example, an NN-decoder network) at a moment. After receiving the third configuration information, the UE prepares the NN-CSI network (for example, an NN-encoder network).

"Preparation" described herein is understood as loading a network model (to a memory) or switching (from a conventional codebook calculation module) to a neural network module.

S503: The network device sends a reference signal to the UE, and correspondingly, the UE receives the reference signal from the network device.

The network device sends the reference signal to the UE based on a reference signal format indicated by the third configuration information. The reference signal includes, for example, a CSI-RS and/or an SSB.

S504: The UE obtains a downlink channel matrix.

The UE measures the reference signal to obtain the downlink channel matrix. The downlink channel matrix is also referred to as a downlink MIMO channel. For example, a dimension of the downlink channel matrix is $N_{tx} \times N_{rx} \times N_{RB}$, where $N_{tx}$ represents a quantity of transmit antenna ports of the sending device of the reference signal. The transmit antenna ports includes transmit antenna ports in different polarization directions. Herein, a value of $N_{tx}$ is a positive integer, $N_{rx}$ represents a quantity of receive antenna ports of the UE, and a value of $N_{rx}$ is a positive integer. The receive antenna ports includes receive antenna ports in different polarization directions. Herein, $N_{RB}$ represents a quantity of frequency domain resource blocks (resource block, RB), and a value $N_{RB}$ of is a positive integer. $N_{RB}$ represents a quantity of RBs included in a measurement bandwidth. The measurement bandwidth is a system bandwidth, a sub-band bandwidth, a maximum bandwidth supported by the UE, a bandwidth of a BWP of the UE, or the like. This is not limited. For example, in response to a carrier bandwidth being 10 MHz, and a subcarrier spacing is 15 kHz, $N_{RB}$ is 52. For another example, in response to a carrier bandwidth being 20 MHz, and a subcarrier spacing is 15 kHz, $N_{RB}$ is 104. For another example, in response to a carrier bandwidth being 10 MHz, and a subcarrier spacing is 30 kHz, $N_{RB}$ is 26, and so on. For example, in at least one embodiment, the network device sends the reference signal, and $N_{tx}$ represents the quantity of transmit antenna ports of the network device. However, in response to the technical solution provided in at least one embodiment being applied to another network architecture, the sending device of the reference signal changes, and $N_{tx}$ represents the quantity of transmit antenna ports of the sending device.

S505: The UE preprocesses the downlink channel matrix.

The UE preprocesses the downlink channel matrix in a plurality of manners. The following uses examples for description.

1. First Manner

In the first manner, a preprocessing process of the UE includes a plurality of steps. The steps are described below.

Step 1: Determine a Physical Meaning of H, in Other Words, Determine an Eigen Subspace Matrix H.

Optionally, the UE performs, based on a MIMO channel ($N_{tx} \times N_{rx}$) of each sub-band (sub-band), singular value decomposition (singular value decomposition, SVD) on the downlink channel matrix obtained in step S504, to obtain an eigen subspace matrix H. A dimension of the eigen subspace matrix H is, for example, $N_{tx} \times N_{sb}$. This is equivalent to that dimension reduction processing is performed on the downlink channel matrix through SVD. $N_{sb}$ represents a quantity of frequency domain sub-bands, for example, $N_{sb}=N_{RB}/a$, where a represents a frequency domain sub-band granularity or a sub-band bandwidth, that is, a quantity of RBs included in each sub-band. A common frequency domain sub-band granularity is two RBs or four RBs. In response to four RBs being used as an example, $N_{sb}=N_{RB}/4$. The frequency domain sub-band granularity is any value. For example, in response to the granularity being one RB, $N_{sb}=N_{RB}$.

Step 2: Determine a Space Domain Basis and a Frequency Domain Basis.

Optionally, the space domain basis and the frequency domain basis is generated according to a discrete fourier transform (discrete fourier transform, DFT) formula. In response to an orthogonal DFT basis being generated, a dimension of the basis meets a A×A form.

A specific form of the DFT basis is not limited in at least one embodiment. For example, refer to corresponding description in the 3GPP standard protocol TS 38.214, or refer to another form.

For example, the eigen subspace matrix H is a matrix whose dimension is $N_{tx} \times N_{sb}$. In response to the space domain basis being generated, $A=N_{tx}$. In response to the frequency domain basis being generated, $A=N_{sb}$. Therefore, two groups of orthogonal DFT bases is generated according to the DFT formula: respectively a space domain basis $G \in \mathcal{C}^{N_{tx} \times N_{tx}}$ and a frequency domain basis $F \in \mathcal{C}^{N_{sb} \times N_{sb}}$. $G \in \mathcal{C}^{N_{tx} \times N_{tx}}$ includes $N_{tx}$ ($N_{tx} \times 1$) DFT column vectors, and $F \in \mathcal{C}^{N_{sb} \times N_{sb}}$ includes $N_{sb}$ ($N_{sb} \times 1$) DFT column vectors.

Alternatively, optionally, a plurality of orthogonal space domain bases $\{G_1, G_2, G_3 \ldots\}$ and a plurality of orthogonal frequency domain bases $\{F_1, F_2, F_3 \ldots\}$ is generated in an oversampling manner, and a group of $G_1$ and $F_j$ are selected as the space domain basis and the frequency domain basis in at least one embodiment. For example, a group with relatively accurate projection directions is selected. For example, each group of a space domain basis and a corresponding frequency domain basis is processed in the following space-frequency joint projection manner. A group with relatively accurate projection directions is determined based on a result of the space-frequency joint projection. The group is determined as the space domain basis and the frequency domain basis in at least one embodiment.

Step 3: Determine a Sparse Representation $C_{complex}$ of the Eigen Subspace Matrix H.

Optionally, the UE performs space-frequency joint projection on H to determine the sparse representation $C_{complex}$ of H. For a manner of performing space-frequency joint projection on H, refer to the following formula:

$$C_{complex} = G^H \times H \times F, C_{complex} \in \mathcal{C}^{N_{tx} \times N_{sb}} \quad \text{(Formula 1)}$$

$G^H$ is a Hermitian (hermitian) matrix of G, and is also referred to as a self-adjoint matrix; and is obtained through performing conjugate transposition on the matrix G. In response to a group of $G_1$ and $F_j$ being selected from a plurality of groups of space domain bases and frequency domain bases, $G^H$ in Formula 1 is replaced with $G_i^H$, and F is replaced with $F_j$.

A complex matrix $C_{complex}$ obtained according to Formula 1 is the sparse representation of the eigen subspace matrix H of the downlink channel matrix, and a dimension of $C_{complex}$ is consistent with a dimension of the eigen subspace matrix H, for example, $N_{tx} \times N_{sb}$.

Step 4: Determine whether to further compress $C_{complex}$.

Optionally, the dimension of $C_{complex}$ remains unchanged. In other words, step 4 is not performed, and step 5 is performed after step 3 is completed.

Optionally, the UE further compresses $C_{complex}$. There are a plurality of compression manners that are described in detail in step 4 of a second manner. Details are not described herein.

Step 5: Convert a dimension of a matrix according to an input parameter of the encoder network.

The UE performs dimension conversion on a coefficient matrix C according to the input parameter of the encoder network.

Generally, the neural network processes real numbers. In response to step 4 being performed, in this step, a matrix obtained in step 4 after the complex matrix $C_{complex}$ is further compressed usually to be converted into a real matrix. The real matrix is an input matrix of the encoder network. Alternatively, in response to step 4 not being performed, in this step, the complex matrix $C_{complex}$ obtained in step 3 usually is to be converted into a real matrix. The real matrix is an input matrix of the encoder network. A method for converting a complex matrix into a real matrix is generally performing concatenation in a new dimension after a matrix formed by a real part of the complex matrix and a matrix formed by an imaginary part of the complex matrix are respectively obtained.

Regardless of whether compression is performed in step 4, the complex matrix before conversion in step 5 is referred to as $C_{complex}$.

In response to the complex matrix being a one-dimensional vector, for example, $C_{complex} \in \mathcal{C}^{M \times 1}$, a real matrix corresponding to the complex matrix is usually a two-dimensional matrix that is, for example, represented as $C_{real} \in \mathcal{R}^{M \times 2}$. Alternatively, in response to the complex matrix being a two-dimensional matrix, for example, $C_{complex} \in \mathcal{C}^{M \times N}$, a real matrix corresponding to the complex matrix is usually a three-dimensional matrix that is, for example, represented as $C_{real} \in \mathcal{R}^{M \times N \times 2}$. Alternatively, in response to the complex matrix being a three-dimensional matrix, for example, $C_{complex} \in \mathcal{C}^{M \times N \times T}$, a real matrix corresponding to the complex matrix is usually a four-dimensional matrix that is, for example, represented as $C_{real} \in \mathcal{R}^{M \times N \times T \times 2}$. Because "real" represents a real number, $C_{real}$ represents a real matrix.

A method for converting a complex matrix with a higher dimension into a real matrix is inferred by analogy.

In at least one embodiment, for example, in response to the complex matrix $C_{complex} \in \mathcal{C}^{N_{tx} \times N_{sb}}$, $M = N_{tx}$, $N = N_{sb}$, and the UE obtains the real matrix $C_{real} \in \mathcal{R}^{N_{tx} \times N_{sb} \times 2}$ based on the complex matrix. A first dimension ($N_{tx}$), a second dimension ($N_{sb}$), and a third dimension (2) in three dimensions $N_{tx} \times N_{sb} \times 2$ respectively represent the quantity of transmit antenna ports of the network device, the quantity of frequency domain sub-bands, and a real part and an imaginary part. However, an order of the three dimensions depends on an input format of the neural network. For example, the three dimensions is $2 \times N_{tx} \times N_{sb}$, $2 \times N_{sb} \times N_{tx}$, or $N_{sb} \times N_{tx} \times 2$; or is in another order.

After preprocessing of the foregoing five steps, in the first manner, a downlink channel matrix (complex matrix) whose dimension is $N_{tx} \times N_{rx} \times N_{RB}$ is converted into a coefficient matrix (real matrix) whose dimension is $M \times N \times 2$. $M = N_{tx}$, and $N = N_{sb}$. The foregoing preprocessing steps are merely examples. This is not limited.

2. Second Manner

In the second manner, a method for further compressing the complex matrix $C_{complex}$ in step 4 is mainly described, and content such as impact of further compression on matrix dimensions before and after the preprocessing is described. For other steps, refer to the first manner.

Step 1: Determine a physical meaning of H.

Optionally, refer to step 1 in the first manner. An eigen subspace matrix H is obtained. A dimension of H is $N_{tx} \times N_{sb}$.

Step 2: Determine a space domain basis and a frequency domain basis.

Optionally, refer to step 2 in the first manner. A pair of orthogonal DFT space-frequency bases is obtained: $S \in \mathcal{C}^{N_{tx} \times N_{tx}}$ and $F \in \mathcal{C}^{N_{sb} \times N_{sb}}$.

Step 3: Determine a sparse representation $C_{complex}$ of H.

Optionally, with reference to step 3 in the first manner, space-frequency joint projection is performed according to Formula 1.

Step 4: Determine whether to further compress $C_{complex}$.

Optionally, in the second manner, the UE further compresses sparseness of the complex matrix $C_{complex}$ by using coefficient energy. Compression processing is performed in a plurality of manners. The following uses examples for description.

For example, a manner is a manner 1. The manner 1 is converting the complex matrix $C_{complex} \in \mathcal{C}^{U \times V}$ into a one-dimensional vector $C_{col} \in \mathcal{C}^{(U \times V) \times 1}$, sorting coefficients included in the one-dimensional vector based on energy values, and selecting first M coefficients with largest energy, where $M \leq U \times V$. In this way, a coefficient matrix is obtained. The coefficient matrix is, for example, represented as $C_{topM\_complex} \in \mathcal{C}^{M \times 1}$.

For example, another manner is a manner 2. The manner 2 is selecting first K rows ($K \leq U$) with largest energy in a space domain dimension of $C_{complex} \in \mathcal{C}^{U \times V}$, and selecting first L columns ($L \leq V$) with largest energy in a frequency domain dimension of $C_{complex} \in \mathcal{C}^{U \times V}$. A coefficient matrix formed by the K rows and the L columns is represented as $C_{topK \times L\_complex} \in \mathcal{C}^{K \times L}$. The matrix $C_{topK \times L\_complex} \in \mathcal{C}^{K \times L}$ is converted into a one-dimensional vector $C_{topK \times L\_col} \in \mathcal{C}^{(K \times L) \times 1}$. Coefficients included in the one-dimensional vector are sorted based on energy values. First M coefficients ($M \leq K \times L$) with largest energy are selected. In this way, a coefficient matrix is obtained. The coefficient matrix is, for example, represented as $C_{topM\_complex} \in \mathcal{C}^{M \times 1}$. M, L, and K are positive integers.

For example, still another manner is a manner 3. The manner 3 is selecting first M rows ($M \leq U$) with largest energy in a space domain dimension of $C_{complex} \in \mathcal{C}^{U \times V}$, and selecting first N columns ($N \leq V$) with largest energy in a frequency domain dimension of $C_{complex} \in \mathcal{C}^{U \times V}$. A coefficient matrix formed by the M rows and the N columns is represented as $C_{topM \times N\_complex} \in \mathcal{C}^{M \times N}$. M and N is positive integers.

In the foregoing three manners for further compressing $C_{complex}$ included in this step, some coefficients are selected based on an original size $N_{tx} \times N_{sb}$ of $C_{complex}$ according to a rule, and dimension reduction is performed to obtain $C_{topM\_complex} \in \mathcal{C}^{M \times 1}$ or $C_{topM \times N\_complex} \in \mathcal{C}^{M \times N}$. In this step, information compression is completed. Therefore, in any one of the three manners, $U = N_{tx}$, and $V = N_{sb}$. In other words, in this step, original information is approximately expressed through selecting main features. The dimension of the matrix obtained through processing in this preprocessing manner is usually smaller than the dimension of the matrix obtained in the first manner, and is used as an input dimension of a subsequent neural network (for example, an input dimension of the encoder network), thereby reducing complexity of the neural network.

In response to an original size of $C_{complex}$ changing, only values of U and V are to be replaced.

Step 5: Determine a dimension of an input matrix of the encoder network.

In the second manner, the complex matrix output in step 4 is a one-dimensional matrix $C_{complex} \in \mathcal{C}^{M \times 1}$, or is a two-dimensional matrix $C_{complex} \in \mathcal{C}^{M \times N}$. The following separately describes the two cases by using examples.

Based on the manner 1 or the manner 2 of step 4, the real matrix corresponding to the complex matrix $C_{complex} \in \mathcal{C}^{M \times 1}$ is $C_{real} \in \mathcal{R}^{M \times 2}$. The real matrix is the input matrix of the encoder network.

Based on the manner 3 of step 4, the real matrix corresponding to the complex matrix $C_{complex} \in \mathcal{C}^{M \times N}$ is $C_{real} \in \mathcal{R}^{M \times N \times 2}$. The real matrix is the input matrix of the encoder network.

After preprocessing of the foregoing five steps, a downlink channel matrix (complex matrix) whose dimension is $N_{tx} \times N_{rx} \times N_{RB}$ is converted into a coefficient matrix (real matrix) whose dimension is M×2 or M×N×2. Certainly, the foregoing preprocessing steps are merely examples. This is not limited.

3. Third Manner

In the third manner, content such as a method for improving spatial direction resolution by using oversampled space-frequency bases, and impact of this manner on matrix dimensions before and after preprocessing is mainly described.

Step 1: Determine a physical meaning of h.

Optionally, refer to step 1 in the first manner. An eigen subspace matrix H is obtained. A dimension of H is $N_{tx} \times N_{sb}$.

Step 2: Determine a space domain basis and a frequency domain basis.

Optionally, in response to an oversampled DFT basis being generated, a dimension of the basis meets a form of A×B, where A<B. Generally, B=A×o, and o is an oversampling coefficient.

For example, H is an eigen subspace matrix whose dimension is $N_{tx} \times N_{sb}$. In response to the space domain basis being generated, $A = N_{tx}$, and $B = N_{tx} \times x$. In response to the frequency domain basis being generated, $A = N_{sb}$, and $B = N_{sb} \times y$. Herein, x and y are respectively oversampling coefficients of space domain and frequency domain, where x and y are both greater than 1, or x is equal to 1 and y is greater than 1, or x is greater than 1 and y is equal to 1, and x and y is equal or not equal.

The eigen subspace matrix H is a complex matrix whose dimension is $N_{tx} \times N_{sb}$. In this case, the UE generates a plurality of space domain bases $\{G_1, G_2, G_3 \ldots\}$ and a plurality of frequency domain bases $\{F_1, F_2, F_3 \ldots\}$ by using different oversampling rates. According to the foregoing rule, the UE concatenates the plurality of space domain bases by column to obtain a space domain basis set $\vec{G} \in \mathcal{C}^{N_{tx} \times (N_{tx} \times x)}$, and combines the plurality of frequency domain bases by column to obtain a frequency domain basis set $\vec{F} \in \mathcal{C}^{N_{sb} \times (N_{sb} \times y)}$. In this case the space domain basis set $\vec{G} \in \mathcal{C}^{N_{tx} \times (N_{tx} \times x)}$ and the frequency domain basis set $\vec{F} \in \mathcal{C}^{N_{sb} \times (N_{sb} \times y)}$ is considered as a group of the space domain basis and the frequency domain basis obtained in the third manner.

In comparison with the first manner and the second manner, column vector dimensions of the space domain basis set and the frequency domain basis set are still consistent with a corresponding dimension of H, but a quantity of column vectors in the basis set is increased. This helps improve DFT beam direction resolution.

Step 3: Determine a sparse representation $C_{complex}$ of H.

For a manner of performing space-frequency joint projection on H, refer to the following formula:

$$C_{complex} = \vec{G}^H \times H \times \vec{F}, C_{complex} \in \mathcal{C}^{(N_{tx} \times x) \times (N_{sb} \times y)} \quad \text{(Formula 2)}$$

$\vec{G}^H$ is obtained through performing conjugate transposition on a matrix $\vec{G}$.

The complex matrix $C_{complex}$ obtained according to Formula 2 is the sparse representation of the eigen subspace matrix H of the downlink channel matrix, and a dimension of $C_{complex}$ is different from a dimension of the eigen subspace matrix H. The eigen subspace matrix H is a complex matrix whose dimension is $N_{tx} \times N_{sb}$. The dimension of the complex matrix $C_{complex}$ is $(N_{tx} \times x) \times (N_{sb} \times y)$. In the third manner, a dimension of a coefficient matrix is increased after the space-frequency joint projection according to Formula 2 is performed. Therefore, the complex matrix obtained in the third manner is considered that dimension expansion processing is performed on the complex matrix in the first manner. From a perspective of sparse projection, resolution of original information is increased, and accuracy of original information reconstructed by the network device is improved.

Step 4: Determine whether to further compress $C_{complex}$.

Optionally, refer to step 4 in the first manner. $C_{complex}$ remains unchanged.

Alternatively, optionally, refer to any manner of step 4 in the second manner. $C_{complex}$ is further compressed. For the reference, U is replaced with $N_{tx} \times x$, and V is replaced with $N_{sb} \times y$ in the three example manners of step 4 of the second manner.

Step 5: Determine a dimension of an input matrix of the encoder network.

Optionally, for example, a dimension of $C_{complex}$ is $(N_{tx} \times x) \times (N_{sb} \times y)$. Based on a two-dimensional complex matrix, M and N are respectively replaced with $N_{tx} \times x$ and $N_{sb} \times y$ to obtain a real matrix $C_{real} \in \mathcal{R}^{(N_{tx} \times x) \times (N_{sb} \times y) \times 2}$. The real matrix is an input matrix of the encoder network.

In response to the complex matrix having another dimension, with reference to the example in step 5 in the second manner, a corresponding real matrix is also correspondingly obtained. Details are not described herein again.

After preprocessing of the foregoing five steps, in response to $C_{complex}$ not being further compressed in step 4, a downlink channel matrix (complex matrix) whose dimension is $N_{tx} \times N_{rx} \times N_{RB}$ is converted into a coefficient matrix (real matrix) whose dimension is M×N×2, where $M = N_{tx} \times x$, and $N = N_{sb} \times y$. In response to $C_{complex}$ being further compressed in step 4, a downlink channel matrix (complex matrix) whose dimension is $N_{tx} \times N_{rx} \times N_{RB}$ is converted into a coefficient matrix (real matrix) whose dimension is M×2 or M×N×2. For value ranges of M and N, refer to the related description of the manner 1 to the manner 3 of step 4 in the second manner, provided that U is replaced with $N_{tx} \times x$ and V is replaced with $N_{sb} \times y$.

4. Fourth Manner, Also Referred to as a Full-Channel Feedback+2D Convolutional Network Manner In the fourth manner, CSI feedback is performed based on an original downlink channel, and DFT joint projection is performed on a dimension $N_{tx} \times N_{rx}$.

Step 1: Determine a physical meaning of H.

Optionally, a downlink channel matrix H is obtained by using step S504, and a dimension is $N_{tx} \times N_{rx} \times N_{RB}$. Different from the eigen subspace matrix H in the foregoing manner, H herein represents a downlink channel instead of eigen subspace (that is, SVD is not performed on the downlink channel matrix in the fourth manner).

Step 2: Determine a space domain basis and a frequency domain basis.

Optionally, two orthogonal DFT bases are generated. In response to a space domain basis being generated, $A=N_{tx} \times N_{rx}$. In response to a frequency domain basis being generated, $A=N_{sb}$. Therefore, the two generated bases are respectively a space domain basis $G \in \mathcal{C}^{(N_{tx} \times N_{rx}) \times (N_{tx} \times N_{rx})}$ and a frequency domain basis $F \in \mathcal{C}^{N_{sb} \times N_{sb}}$. G includes $N_{tx} \times N_{rx}$ DFT column vectors with dimensions of $N_{tx} \times N_{rx}$. The DFT column vector whose dimension is $N_{tx} \times N_{rx}$ is obtained through a Kronecker (kroneck) product of a vector whose dimension is $N_{tx} \times 1$ and a vector whose dimension is $N_{rx} \times 1$. F includes $N_{sb}$ DFT column vectors with dimensions of $N_{sb} \times 1$.

Optionally, G and F is also a group of bases, with the most accurate projection direction, selected from a plurality of groups of orthogonal oversampled space-frequency bases (for a specific method, refer to the foregoing description).

Optionally, two oversampled DFT bases are generated. In response to the space domain basis being generated, $A=N_{tx} \times N_{rx}$, and $B=N_{tx} \times N_{rx} \times x$. In response to the frequency domain basis being generated, $A=N_{sb}$, and $B=N_{sb} \times y$. Herein, x and y are respectively oversampling coefficients of space domain and frequency domain, where x and y are both greater than 1, or x is equal to 1 and y is greater than 1, or x is greater than 1 and y is equal to 1, and x and y is equal or not equal.

$\vec{S}$ and $\vec{F}$ is obtained through inference with reference to step 2 in the third manner.

Step 3: Determine a sparse representation $C_{complex}$ of H.

The UE performs space-frequency joint projection on the matrix H. In response to G and F being orthogonal bases, for a space-frequency joint projection manner, refer to Formula 1. Herein, obtained $C_{complex} \in \mathcal{C}^{(N_{tx} \times N_{rx}) \times N_{sb}}$.

$\mathcal{C}^{(N_{tx} \times N_{rx}) \times N_{sb}}$ represents a two-dimensional matrix. Content in parentheses is considered as a dimension. For example, $(N_{tx} \times N_{rx})$ represents one dimension, and $N_{sb}$ represents the other dimension. In response to similar cases existing for other formulas, the understanding is also similar.

Optionally, in response to G and F being oversampled DFT bases, with reference to Formula 1, $G^H$ in Formula 1 is replaced with $\vec{G}^H$, and F is replaced with $\vec{F}$. For a space-frequency joint projection formula, refer to the following formula:

$$C_{complex} = \vec{G}^H \times H \times \vec{F}, C_{complex} \in \mathcal{C}^{(N_{tx} \times N_{rx} \times x) \times (N_{sb} \times y)} \quad \text{(Formula 3)}$$

Step 4: Determine whether to further compress $C_{complex}$.

Optionally, in response to $C_{complex}$ not being further compressed, this step is skipped.

Alternatively, optionally, reference is made to the corresponding step in the second manner for further compression performed on $C_{complex}$. For example, U is replaced with $N_{tx} \times N_{rx}$, and V is replaced with $N_{sb}$; or U is replaced with $N_{tx} \times N_{rx} \times x$, and V is replaced with $N_{sb} \times y$.

Step 5: Determine a dimension of an input matrix of the encoder network.

In response to $C_{complex}$ not being further compressed in step 4, a real matrix $C_{real} \in \mathcal{R}^{M \times N \times 2}$ is obtained, where $M = N_{tx} \times N_{rx}$, and $N = N_{sb}$. The real matrix is an input matrix of the encoder network.

In response to $C_{complex}$ being further compressed in step 4, a real matrix $C_{real} \in \mathcal{R}^{M \times 2}$ or $C \in \mathcal{R}^{M \times N \times 2}$ is obtained. A relationship between value ranges of M and N, and U and/or V remains unchanged with the relative relationship described in step 4 in the second manner. For an absolute value, U is replaced with $N_{tx} \times N_{rx}$, and V is replaced with $N_{sb}$; or U is replaced with $N_{tx} \times N_{rx} \times x$, and V is replaced with $N_{sb} \times y$. The real matrix is the input matrix of the encoder network.

After preprocessing of the foregoing five steps, in response to $C_{complex}$ not being further compressed in step 4, a downlink channel matrix (complex matrix) whose a dimension is $N_{tx} \times N_{rx} \times N_{RB}$ is converted to a coefficient matrix (real matrix) whose dimension is $M \times N \times 2$, where $M = N_{tx} \times N_{rx}$, and $N = N_{sb}$. in response to $C_{complex}$ being further compressed in step 4, a downlink channel matrix (complex matrix) whose dimension is $N_{tx} \times N_{rx} \times N_{RB}$ is converted into a coefficient matrix (real matrix) whose dimension is $M \times 2$ or $M \times N \times 2$. A relationship between value ranges of M and N, and U and/or V remains unchanged with the relative relationship described in step 4 in the second manner. For an absolute value, U is replaced with $N_{tx} \times N_{rx}$, and V is replaced with $N_{sb}$; or U is replaced with $N_{tx} \times N_{rx} \times x$, and V is replaced with $N_{sb} \times y$.

In the fourth manner, the channel dimension $N_{rx}$ is reserved, and joint projection is performed with $N_{tx}$. In this way, original channel information (without SVD compression) is fed back by using CSI, and a 2D convolutional network is used in cooperation to reduce operation complexity.

5. Fifth Manner, Also Referred to as a Full Channel Feedback+Three-Dimensional (Dimension, D) Convolutional Network Manner In the fifth manner, CSI feedback is performed based on an original downlink channel, and DFT projection is separately performed in dimensions: $N_{tx}$ and $N_{rx}$.

Step 1: Determine a physical meaning of H.

Optionally, a downlink channel matrix H is obtained by using step S504, and a dimension is $N_{tx} \times N_{rx} \times N_{RB}$. It is learned that, different from the eigen subspace matrix H in the first manner, the second manner, or the third manner, H herein represents a downlink channel instead of eigen subspace (that is, SVD is not performed on the downlink channel matrix).

Step 2: Determine a Space Domain Basis and a Frequency Domain Basis.

Optionally, two orthogonal DFT bases are generated. In response to a space domain basis being generated, $A=N_{tx}$. In response to a frequency domain basis being generated, $A=N_{sb}$. Therefore, the two generated bases are respectively a space domain basis $G \in \mathcal{C}^{N_{tx} \times N_{tx}}$ and a frequency domain basis $F \in \mathcal{C}^{N_{sb} \times N_{sb}}$.

Optionally, G and F is a group, with most accurate projection directions, selected from a plurality of groups of orthogonal oversampled space-frequency bases.

Alternatively, optionally, two oversampled DFT bases are generated. In response to the space domain basis being generated, $A=N_{tx}$, and $B=N_{tx} \times x$. In response to the frequency domain basis being generated, $A=N_{sb}$, and $B=N_{sb} \times y$. x and y are respectively oversampling coefficients of space domain and frequency domain, where x and y are both greater than 1, or x is equal to 1 and y is greater than 1, or x is greater than 1 and y is equal to 1, and x and y is equal or not equal. $\vec{G}$ and $\vec{F}$ is obtained through inference with reference to step 2 in the third manner.

Step 3: Determine a sparse representation $C_{complex}$ of H.

The UE performs space-frequency joint projection on H. In response to G and F being orthogonal bases, for a space-frequency joint projection manner, refer to the following formula:

$$C_{complex}=N_{rx}\times(G^H\times H\times F), C_{complex}\in \mathcal{C}^{N_{rx}\times N_{tx}\times N_{sb}} \quad \text{(Formula 4)}$$

In response to G and F being oversampled DFT bases, $G^H$ in Formula 4 is replaced with $\vec{G}^H$, and F is replaced with $\vec{F}$. For a space-frequency joint projection formula, refer to the following formula:

$$C_{complex}=\vec{G}^H\times H\times \vec{F}, C_{complex}\in \mathcal{C}^{N_{rx}\times(N_{tx}\times x)\times(N_{sb}\times y)} \quad \text{(Formula 5)}$$

Step 4: Determine whether to further compress $C_{complex}$.

A difference from the plurality of foregoing manners is that $C_{complex}$ is a three-dimensional matrix.

Optionally, $C_{complex}$ is not further compressed. In this case, step 4 is not performed, and step 5 is performed after step 3 is completed.

Optionally, $C_{complex}$ is further compressed.

For example, a compression manner is a manner 1. The manner 1 is converting the complex matrix $C_{complex}\in \mathcal{C}^{N_{rx}\times U\times V}$ into a two-dimensional vector $C_{col}\in \mathcal{C}^{N_{rx}\times(U\times V)}$, sorting coefficients included in the two-dimensional vector based on energy values in a second dimension, and selecting first M coefficients with largest energy, where $M\leq U\times V$. In this way, a coefficient matrix is obtained. The coefficient matrix is, for example, represented as $C_{topM\_complex}\in \mathcal{C}^{N_{rx}\times M}$.

For example, another compression manner is a manner 2. The manner 2 is selecting first K rows ($K\leq U$) with largest energy in a space domain dimension of $C_{complex}\in \mathcal{C}^{N_{rx}\times U\times V}$, and selecting first L columns ($L\leq V$) with largest energy in a frequency domain dimension of $C_{complex}\in \mathcal{C}^{U\times V}$. A coefficient matrix formed by the K rows and the L columns is represented as $C_{topK\times L\_complex}\in \mathcal{C}^{N_{rx}\times K\times L}$. The matrix $C_{topK\times L\_complex}\in \mathcal{C}^{N_{rx}\times K\times L}$ is converted into a two-dimensional vector $C_{topK\times L\_col}\in \mathcal{C}^{N_{rx}\times(K\times L)}$. Coefficients included in the two-dimensional vector are sorted based on energy values. First M coefficients ($M\leq K\times L$) with largest energy are selected. In this way, a coefficient matrix is obtained. The coefficient matrix is, for example, represented as $C_{topM\_complex}\in \mathcal{C}^{N_{rx}\times M}$.

For example, still another compression manner is a manner 3. The manner 3 is selecting first M rows ($M\leq U$) with largest energy in a space domain dimension of $C_{complex}\in \mathcal{C}^{N_{rx}\times U\times V}$, and selecting first N columns ($N\leq V$) with largest energy in a frequency domain dimension of $C_{complex}\in \mathcal{C}^{N_{rx}\times U\times V}$. A coefficient matrix formed by the M rows and the N columns is represented as $C_{topM\times N\_complex}\in \mathcal{C}^{N_{rx}\times M\times N}$.

Step 5: Determine a dimension of an input matrix of the encoder network.

In response to step 4 not being performed, in step 5, the complex matrix $C_{complex}$ is converted into a real matrix $C\in \mathcal{R}^{N_{rx}\times M\times N\times 2}$, where $M=N_{tx}$, and $N=N_{sb}$.

In response to $C_{complex}$ being further compressed in step 4, a compressed matrix $\mathcal{C}^{N_{rx}\times M}$ is converted into a real matrix $C_{real}\in \mathcal{R}^{N_{rx}\times M\times 2}$, or a compressed matrix $\mathcal{C}^{N_{rx}\times M\times N}$ is converted into a real matrix $C_{real}\in \mathcal{R}^{N_{rx}\times M\times N\times 2}$.

After preprocessing of the foregoing five steps, in response to step 4 not being performed, a downlink channel matrix (complex matrix) whose dimension is $N_{rx}\times N_{rx}\times N_{RB}$ is converted into a coefficient matrix (real matrix) whose dimension is $N_{rx}\times M\times N\times 2$, where $M=N_{tx}$, and $N=N_{sb}$. In response to $C_{complex}$ being further compressed in step 4, a downlink channel matrix (complex matrix) whose dimension is $N_{rx}\times N_{rx}\times N_{RB}$ is converted into a coefficient matrix (real matrix) whose dimension is $N_{rx}\times M\times 2$ or $N_{rx}\times M\times N\times 2$. A relationship between value ranges of M and N, and U and/or V remains unchanged with the relative relationship described in step 4. For an absolute value, U is replaced with $N_{tx}$, and V is replaced with $N_{sb}$; or U is replaced with $N_{tx}\times x$, and V is replaced with $N_{sb}\times y$.

In the fifth manner, the channel dimension $N_{rx}$ is reserved, but space-frequency projection is not performed. In this way, original channel information (without SVD compression) is fed back by using CSI, and a 3D convolutional network is used in cooperation to search for a coefficient correlation in a dimension $N_{rx}$ by using a neural network, thereby obtaining better compression effect.

In the foregoing several manners, the encoder network is a real number network, and an input of the encoder network has a plurality of possibilities such as a two-dimensional tensor, a three-dimensional tensor, and a four-dimensional tensor. A channel dimension of a tensor is usually equal to 2, that is, represents a real part and an imaginary part. Another dimension represents a shape of an original complex matrix, for example, a one-dimensional vector, or a two-dimensional/three-dimensional matrix. Based on the foregoing manners, the input of the encoder network is one of the following three cases: $2\times M$, $2\times M\times N$, and $2\times M\times N\times T$. Correspondingly, an output dimension of the encoder network is one of the following three cases: $D\times S$, $D\times P\times Q$, and $D\times P\times Q\times R$, where D represents a channel dimension of a tensor in the encoder network, and P, Q, R, and the like represent dimensions of an output matrix. Generally, dimension quantities of an input tensor and an output tensor of a neural network are consistent. For example, in response to a dimension of the input tensor being a two-dimensional tensor, a dimension of the output tensor is also a two-dimensional tensor. Therefore, input/output combinations in a one-to-one correspondence with the foregoing dimensions of two-dimensional/three-dimensional/four-dimensional are preferred combinations of the encoder network. Optionally, the encoder network also meets the input and output dimensions according to an actual application scenario. In this case, a combination of the input and output dimensions of the encoder network is any combination of the foregoing nine combinations (that is, in response to the input of the encoder network having the foregoing three cases, and the output of the encoder network has the foregoing three cases, in response to consistency between the input and output dimensions not being considered, the three inputs and the three outputs is randomly combined, that is, $3\times 3$). An order of a first dimension, a second dimension, and a third dimension is correspondingly changed.

In the foregoing five manners, the first manner is a preprocessing process based on an example of using the eigen subspace matrix and the orthogonal DFT bases: G and F (or orthogonal bases generated in an oversampling manner), and is a relatively basic process. In the second manner, based on the first manner, the sparsely projected coefficient matrix $C_{complex}$ is further compressed. In the third manner, based on the first manner, oversampled DFT bases: $\vec{G}$ and $\vec{F}$ are used. In a fourth manner, the original channel matrix is used, and $N_{tx}$ and $N_{rx}$ are processed in one dimension in a preprocessing process. In the fifth manner, an example in which the original channel matrix is used and the dimension $N_{rx}$ is not processed in a preprocessing process is used. Although the foregoing five preprocessing manners respectively focus on changes of only some steps, any two or more of the five preprocessing manners is combined. Some combination cases are also covered in the examples of the foregoing five manners. For example, the original channel matrix in the fourth manner is also further compressed with reference to the oversampled DFT bases and a projected coefficient matrix. A combination manner is not limited to the foregoing five manners that have been fully described by using examples, and arrangements and combinations of the foregoing manners without creative efforts shall fall within the protection scope of at least one embodiment.

Particularly, the examples of the foregoing five manners are all based on a DFT basis. These are merely examples, and impose no limitation. Optionally, another method is also used to generate space-frequency projection bases. For example, an eigenvector obtained through SVD is performed on (a covariance matrix of) a channel is used as a projection basis. This basis is usually referred to as an eigen basis. Generally, a dimension of the eigen basis is the same as that of an orthogonal DFT basis, that is, A×A. However, sampling cannot be performed on the eigen basis. In the foregoing five manners, an orthogonal DFT basis is replaced with an eigen basis in any manner that is not related to oversampling. A dimension of the eigen basis is consistent with a dimension of the orthogonal DFT basis in the foregoing five manners. A manner of replacing the orthogonal DFT basis with the eigen basis also falls within the protection scope of at least one embodiment.

S506: The UE obtains the output matrix of the encoder network based on the real matrix and the encoder network. For example, the UE inputs the real matrix to the encoder network to obtain the output matrix of the encoder network.

For example, the output matrix of the encoder network is referred to as a first output matrix. For example, a reference network currently used by the UE and the network device is a first reference network, and the first reference network includes a first reference encoder network and a first reference decoder network. Optionally, the UE performs encoding by using the first reference encoder network. Alternatively, optionally, the protocol does not restrict whether the encoder network actually used by the UE is a reference encoder network, but restricts that evaluated performance of the actually used encoder network and the corresponding reference decoder network meet indicators specified in the protocol. Therefore, features of the encoder network currently used by the UE is determined based on features of the first reference encoder network. For example, an input dimension of the encoder network currently used by the UE is determined based on an input dimension of the first reference encoder network. For example, the input dimension of the encoder network currently used by the UE is equal to the input dimension of the first reference encoder network. Similarly, for example, the output dimension of the encoder network currently used by the UE is also determined based on an output dimension of the first reference encoder network. For example, the output dimension of the encoder network currently used by the UE is equal to an output dimension of the first reference encoder network.

For example, the UE obtains, through a preprocessing process, a real matrix whose dimension is M×N×2. The input dimension of the encoder network (in other words, the dimension of the input matrix of the encoder network) is M×N×2. The real matrix is the input matrix of the encoder network. The UE uses the real matrix as an input of the encoder network, and obtains an output $la \in \mathcal{R}^{D \times S}$ of the encoder network through inference, where la represents a first output matrix. The first output matrix is a real matrix whose dimension is D×P×Q. The output dimension of the encoder network is D×P×Q, where S=P×Q. The encoder network outputs S vectors, each of the S vectors represents one pixel, a dimension of each of the S vectors is D, and D represents a quantity of channels of a tensor (tensor) of an output layer of the neural network (for example, the encoder network). In response to $M \leq N_{tx}$, $N \leq N_{sb}$, and $S \leq M \times N$. For example, generally, S<<M×N. In other words, the original information (downlink channel matrix) obtained by the UE through measurement is compressed to a lower dimension by using the encoder network, where << indicates far less than. Alternatively, in response to $M = N_{tx} \times x$, and $N = N_{sb} \times y$, $S \leq (N_{tx} \times x) \times (N_{sb} \times y)$. Alternatively, in response to $M = N_{tx} \times N_{rx}$, and $N = N_{sb}$, $S \leq (N_{tx} \times N_{rx}) \times N_{sb}$.

For another example, the UE obtains, through a preprocessing process, a real matrix whose dimension is M×2. The input dimension of the encoder network (in other words, the dimension of the input matrix of the encoder network) is M×2. The real matrix is the input matrix of the encoder network. The UE uses the real matrix as an input of the encoder network, and obtains an output $la \in \mathcal{R}^{D \times S}$ of the encoder network through inference, where la represents a first output matrix. The first output matrix is a real matrix whose dimension is D×S. Herein, $S \leq N_{tx} \times N_{sb} \times z$, where z is a positive integer greater than or equal to 1. For example, in the foregoing second manner, z=1 is used as an example. In addition, S≤M.

For still another example, the UE obtains, through a preprocessing process, a real matrix whose dimension is M×N×T×2. The input dimension of the encoder network (in other words, the dimension of the input matrix of the encoder network) is M×N×T×2. The real matrix is the input matrix of the encoder network. The UE uses the real matrix as an input of the encoder network, and obtains an output $la \in \mathcal{R}^{D \times S}$ of the encoder network through inference, where la represents a first output matrix. The first output matrix is a real matrix whose dimension is D×P×Q×R. For example, S=P×Q×R. In response to $M = N_{rx}$, $N = N_{tx}$, and $T = N_{sb}$, $S \leq N_{rx} \times N_{tx} \times N_{sb}$.

The dimension of the matrix changes after the encoder network.

S507: The UE determines the CSI.

In this step, the UE uses the first vector quantization dictionary. For a manner of determining the first vector quantization dictionary, refer to step S501. For example, the first vector quantization dictionary includes $N_1$ vectors. Lengths of the $N_1$ vectors is the same. The length is equal to at least one dimension in the output dimension of the encoder network. Therefore, the first vector quantization dictionary is used by a receiving end of the CSI to restore (or reconstruct) a downlink channel matrix. For example, the UE performs quantization processing on the first output matrix based on the first vector quantization dictionary to obtain the CSI, so that the receiving end of the CSI restores the downlink channel matrix based on the CSI. The UE directly performs quantization processing on the first output matrix based on the first vector quantization dictionary. Alternatively, the UE performs corresponding processing on the first output matrix, and then perform quantization processing on a processed first output matrix based on the first vector quantization dictionary. In at least one embodiment, that the UE directly performs quantization processing on the first output matrix based on the first vector quantization dictionary is used as an example.

Performing quantization processing on the first output matrix based on the first vector quantization dictionary is equivalent to replacing (or representing) a channel feature included in the first output matrix by using some or all vectors in the $N_1$ vectors included in the first vector quantization dictionary. Therefore, from this perspective, each of the $N_1$ vectors included in the first vector quantization dictionary represents one channel feature, or represent one type of channel information. Channel features included in the matrix output by the encoder network is also understood as channel features represented by many vectors. Therefore, the vectors in the first vector quantization dictionary is used to approximately represent vectors in a first matrix. In other words, the first output matrix is quantized based on the first vector quantization dictionary.

A dimension of the first vector quantization dictionary is, for example, D×E. The $N_1$ vectors are, for example, all the vectors included in the first vector quantization dictionary. In this case, $N_1$ is equal to E. Alternatively, the $N_1$ vectors are, for example, some vectors included in the first vector quantization dictionary. In this case, $N_1$ is less than E. Herein, E is a positive integer. The output dimension of the encoder network is $la \in \mathcal{R}^{D \times S}$. One dimension (for example, the dimension is also lengths of the $N_1$ vectors) of the first vector quantization dictionary and one dimension of the output dimension of the encoder network are both D. Herein, an example in which the lengths of the $N_1$ vectors included in the first vector quantization dictionary are equal to one dimension in the output dimension of the encoder network is used. In some other implementations, the lengths of the $N_1$ vectors included in the first vector quantization dictionary is also equal to a plurality of dimensions in the output dimension of the encoder network.

A specific implementation of performing quantization processing on the first output matrix based on the first vector quantization dictionary is not limited in at least one embodiment. For example, $\vec{la}_{i=1\ldots s} \in \mathcal{R}^{D \times 1}$ is any column vector in la, the UE determines, in the first vector quantization dictionary, a vector most similar to $\vec{la}_{i=1\ldots s}$ or a vector with similarity greater than a threshold, and return an index $Ind_i$ of the vector. Indexes of S column vectors in the first vector quantization dictionary is obtained through traversing the vectors in la. The S column vectors are referred to as the S column vectors included in the first vector quantization dictionary. The similar vector is, for example, a vector with a minimum feature distance. Each of the S column vectors included in the first vector quantization dictionary belongs to the $N_1$ vectors. There is repeated column vectors in the S column vectors, or the S column vectors are different column vectors. For example, in response to S being equal to $N_1$ (for example, $N_1$ is equal to E), the S vectors is the $N_1$ vectors, or is some of the $N_1$ vectors (that is, there are repeated vectors in the S vectors). For another example, in response to S being greater than $N_1$ (for example, $N_1$ is equal to E), the S vectors include the $N_1$ vectors, and there are repeated vectors in the S vectors. For another example, in response to S being less than $N_1$ (for example, $N_1$ is equal to E), the S vectors include some or all of the $N_1$ vectors. There is or is not repeated vectors in the S vectors. After obtaining the S column vectors included in the first vector quantization dictionary through traversing la, the UE obtains an index matrix whose dimension is 1*S.

A vector most similar to $\vec{la}_{i=1\ldots s}$ is determined in the first vector quantization dictionary, for example, determined in the following manner:

$$Ind_i = \arg\min_{j \in \{1\ldots E\}} \sum_{d=1}^{D} (Dic_{j,d} - la_{i,d})^2 \qquad \text{(Formula 6)}$$

$Dic_{j,d}$ represents a $d^{th}$ element of a $j^{th}$ vector in the first vector quantization dictionary, and $la_{i,d}$ represents a $d^{th}$ element of a $la_i$ vector. By using Formula 6, a continuous floating-point channel representation is approximately represented by using a vector represented by a discrete index. An error caused by processing in this step is considered as a quantized error.

The index matrix whose dimension is 1*S is used as a PMI. Alternatively, the UE further converts the index matrix into a binary bit (bit) stream. The binary bit stream is used as a PMI. This is not limited.

S508: The UE sends the CSI to the network device, and correspondingly, the network device receives the CSI from the UE.

The UE determines the CSI based on information such as the CQI, the RI, and the obtained PMI, and send the CSI to the network device. For example, in response to the UE receiving the third configuration information in step S501, and the third configuration information indicates CSI reporting configuration and/or CSI resource configuration and the like, the UE sends the CSI to the network device based on the third configuration information. Because determining of the PMI is related to the first vector quantization dictionary, the CSI is determined based on the first vector quantization dictionary, or more specifically, the CSI is determined based on indexes of one or more vectors included in the first vector quantization dictionary.

S509: The network device obtains information about a reconstructed downlink channel matrix based on the S indexes and the first vector quantization dictionary.

For example, the information about the reconstructed downlink channel matrix is the reconstructed downlink channel matrix; or the information about the reconstructed downlink channel matrix is not the reconstructed downlink channel matrix, but the reconstructed downlink channel matrix is obtained or a transmission parameter of a downlink channel is determined based on the information.

The S indexes are the S indexes of the S vectors in the first vector quantization dictionary included in the CSI (or the PMI). For example, the reference network currently used by the UE and the network device is the first reference network, and the first reference network includes the first reference encoder network and the first reference decoder network. The protocol does not restrict whether the decoder network actually used by the network device is a reference decoder network, but restricts that evaluated performance of the actually used decoder network and the corresponding reference encoder network meets indicators specified in the protocol. Therefore, features of the decoder network currently used by the network device is determined based on features of the first reference decoder network. For example, the input dimension of the decoder network currently used by the network device is determined based on the input dimension of the first reference decoder network. For example, the input dimension of the decoder network currently used by the network device is equal to the input dimension of the first reference decoder network. Similarly, for example, the output dimension of the decoder network currently used by the network device is also determined based on the output dimension of the first reference decoder network. For example, the output dimension of the decoder network currently used by the network device is equal to the output dimension of the first reference decoder network.

Step S509 includes a plurality of steps. The following provides description.

S5091: The network device performs inverse mapping on the S indexes based on the first vector quantization dictionary to obtain a first matrix. The network device performs, based on the first vector quantization dictionary, inverse mapping on the PMI included in the CSI, to obtain the first matrix.

In response to the PMI being an index matrix, the network device finds, from the first vector quantization dictionary, the S column vectors corresponding to the S indexes included in the index matrix, to obtain a matrix including the S column vectors. The matrix is, for example, referred to as the first matrix. The first matrix is a real matrix. A dimension is D×S. In response to the PMI being a binary bit stream, the network device first parses the binary bit stream to obtain an index matrix, and then obtains the first matrix based on the first vector quantization dictionary.

S5092: The network device obtains information about the reconstructed downlink channel matrix based on the first matrix and the decoder network.

For example, the network device inputs the first matrix to the decoder network, a matrix output by the decoder network is referred to as a second matrix, and then the network device obtains the information about the reconstructed downlink channel matrix based on the second matrix.

For example, a dimension of the first matrix is D×S. The network device inputs the first matrix to the decoder network, and the decoder network obtains the second matrix through inference. In response to the input dimension of the encoder network being M×N×2, the second matrix is represented as $\tilde{C} \in \mathcal{R}^{M \times N \times 2}$. Alternatively, in response to the input dimension of the encoder network being M×2, the second matrix is represented as $\tilde{C} \in \mathcal{R}^{M \times 2}$. Alternatively, in response to the input dimension of the encoder network being M×N×T×2, the second matrix is represented as $\tilde{C} \in \mathcal{R}^{M \times N \times T \times 2}$. In other words, by using the decoder network, the first matrix is reconstructed to obtain the second matrix whose dimension is M×N×2, or the second matrix whose dimension is M×2, or the second matrix whose dimension is M×N×T×2, where the second matrix is also a real matrix. The input dimension of the decoder network is D×S, and the output dimension is M×N×2, M×2, or M×N×T×2. For values or value ranges of M and N, refer to the foregoing description.

Based on different output dimensions of the decoder network, manners in which the network device obtains the information about the reconstructed downlink channel matrix based on the second matrix is also different. The following uses examples for description.

1. The output dimension of the decoder network is M×N×2.

Herein, a dimension of the second matrix is M×N×2. In response to M×N in the dimension of the second matrix being the same as a dimension of a to-be-reconstructed downlink channel feature matrix H', a corresponding complex matrix $\tilde{C}_{complex}$ is obtained based on the second matrix with direct reference to the following manner of converting a real matrix into a complex matrix: In response to a real matrix being a two-dimensional matrix, for example, $C_{real} \in \mathcal{R}^{M \times 2}$ a complex matrix corresponding to the real matrix is usually a one-dimensional vector, for example, represented as $\tilde{C}_{complex} \in \mathcal{C}^{M \times 1}$. Alternatively, in response to a real matrix being a three-dimensional matrix, for example, $C_{real} \in \mathcal{R}^{M \times N \times 2}$, a complex matrix corresponding to the real matrix is usually a two-dimensional matrix, for example, represented as $\tilde{C}_{complex} \in \mathcal{C}^{M \times N}$. Alternatively, in response to the real matrix being a four-dimensional matrix, for example, $C_{real} \in \mathcal{R}^{M \times N \times T \times 2}$, a complex matrix corresponding to the real matrix is usually a three-dimensional matrix, for example, represented as $\tilde{C}_{complex} \in \mathcal{C}^{M \times 2 \times T}$.

A method for converting a real matrix with a higher dimension into a complex matrix is obtained by analogy.

Alternatively, in response to M×N in the dimension of the second matrix being different from a dimension of a to-be-reconstructed downlink channel feature matrix H' (for example, further compression is performed in step S505 with reference to the manner 3 of step 4 in the second manner), optionally, the network device converts the second matrix into a complex matrix, and fills, based on M×N pieces of position information obtained from the CSI, elements of the complex matrix in an all-zero matrix with a same dimension as the downlink channel feature matrix H' one by one according to positions corresponding to the elements. This is equivalent to restoration of the compressed information to obtain $\tilde{C}_{complex}$. The CSI sent by the UE includes the M×N pieces of position information.

The network device performs inverse transform on the complex matrix $\tilde{C}_{complex} \in \mathcal{C}^{M \times N}$ to obtain the eigen subspace matrix H'∈$\mathcal{C}^{M \times N}$, that is, the reconstructed downlink channel matrix.

For differentiation from the foregoing eigen subspace matrix, the foregoing eigen subspace matrix (for example, the eigen subspace matrix H in step S505) is referred to as a first eigen subspace matrix, and the eigen subspace matrix H' herein is referred to as a second eigen subspace matrix. For example, the network device performs inverse transform on the complex matrix $\tilde{C}_{complex}$ in the following manner to obtain the second eigen subspace matrix:

$$H' = G \times \tilde{C}_{complex} \times F^H \quad \text{(Formula 7)}$$

In response to the output dimension of the decoder network being M×N×2, step S509 is also expressed by using a uniform reconstruction formula. The network device obtains the information about the reconstructed downlink channel matrix in any manner, provided that the information about the reconstructed downlink channel matrix meets a first relationship. Steps (for example, steps S5091 and S5092) performed by the network device in step S509 are merely examples, and are not intended to limit behavior of the network device. The first relationship includes:

$$H' = \Sigma_{k=1}^{M} \Sigma_{l=1}^{N} C(f_{dec}(q(ind_i))) \times U_{1,k} - U^*_{2,l} \quad \text{(Formula 8)}$$

In Formula 8, $\{ind_i\}_{i=1 \ldots S}$ represents the S indexes of the S vectors included in the first vector quantization dictionary, that is, the S indexes of the S vectors corresponding to the PMI. A function q(x) indicates to map, based on the first vector quantization dictionary, the indexes of the S vectors to obtain the first matrix whose dimension is D×S. A function $f_{dec}(x)$ indicates to reconstruct the first matrix by using the decoder network to obtain the second matrix whose dimension is M×N×2. The first matrix and the second matrix are both real matrices. A function C(x) indicates to convert the second matrix into a complex matrix (for example, the complex matrix $\tilde{C}_{complex}$ described in step S509) whose dimension is M×N. $U^*_{2,l}$ represents a conjugate transpose vector of $U_{2,l}$, and $\{U^*_{2,l}\}$ represents a conjugate transpose matrix of $\{U_{2,l}\}$.

In all formulas in at least one embodiment, counting always starts from 1 and ends with a specific letter. For example, k in Formula 8 is an integer from 1 to M, that is, k=1, 2, . . . , M. Alternatively, in some or all of the formulas in at least one embodiment, counting starts from 0 and end with (a letter−1). For example, k=1, 2, . . . , M in Formula 8 is replaced with k=0, 1, . . . , (M−1).

$\{U_{1,k}\}_{k=1 \ldots M}$ represents a space domain basis vector set. The space domain basis vector set is, for example, the space domain basis used in response to the UE performing space-frequency joint projection described above. $U_{1,k}$ represents a $k^{th}$ vector in the space domain basis vector set. A length of a vector included in the space domain basis vector set is $N_{tx}$ (a physical meaning of a corresponding downlink channel matrix H is an eigen subspace matrix obtained through SVD) or $N_{tx} \times N_{rx}$ (a physical meaning of a corresponding downlink channel matrix H is an original channel). $\{U_{2,l}\}_{l=1 \ldots N}$ represents a frequency domain basis vector set. The frequency domain basis vector set is, for example, a frequency domain basis that is used in response to the UE performing space-frequency joint projection and that is described above. For example, the network device uses a DFT formula to obtain the space domain basis vector set and the frequency domain basis vector set. $U_{2,l}$ represents an $l^{th}$ vector in the frequency domain basis vector set. A length of a vector included in the frequency domain basis vector set is $N_{sb}$. In response to a frequency domain granularity being one RB, $N_{sb} = N_{rb}$.

Values of M and N depend on the preprocessing manner of step S505. In at least one embodiment, a relationship (for example, Formula 8) met by the reconstructed downlink channel matrix restricts the preprocessing manner performed by the UE. For example, in response to the value ranges of M and N being determined, the relationship met by the reconstructed downlink channel matrix is considered to be known to the UE, and the UE determines how to perform preprocessing. Optionally, $\{U_{1,k}\}_{k=1 \ldots M}$ and $\{U_{2,l}\}_{l=1 \ldots N}$ are orthogonal DFT basis vector sets, and $C_{complex}$ is not further compressed. In this case, the values of M and N each are equal to a length of a vector included in a corresponding basis vector set. To be specific, $M=N_{tx}$ (a physical meaning corresponding to a downlink channel matrix H is an eigen subspace matrix obtained through SVD) or $M=N_{tx} \times N_{rx}$ (a physical meaning corresponding to a downlink channel matrix H is an original channel), and $N=N_{sb}$.

Optionally, $\{U_{1,k}\}_{k=1 \ldots M}$ and $\{U_{2,l}\}_{l=1 \ldots N}$ are orthogonal DFT basis vector sets, and $C_{complex}$ is compressed with reference to the manner 3 of step 4 (in the second manner). In this case, the values of M and N each are less than a length of a vector included in a corresponding basis vector set. To be specific, $M<N_{tx}$ (a physical meaning corresponding to a downlink channel matrix H is an eigen subspace matrix obtained through SVD) or $M<N_{tx} \times N_{rx}$ (a physical meaning corresponding to a downlink channel matrix H is an original channel), and $N<N_{sb}$.

Optionally, $\{U_{1,k}\}_{k=1 \ldots M}$ and $\{U_{2,(j,l)}\}_{l=1 \ldots N}$ are oversampled DFT basis vector sets, and $C_{complex}$ is not further compressed. In this case, the values of M and N each are equal to a product of a length of a vector included in a corresponding basis vector set and an oversampling coefficient. To be specific, $M=N_{tx} \times x$ (a physical meaning corresponding to a downlink channel matrix H is an eigen subspace matrix obtained through SVD) or $M=N_{tx} \times N_{rx} \times x$ (a physical meaning corresponding to a downlink channel matrix H is an original channel), and $N=N_{sb} \times y$. Herein, x and y are respectively space-frequency oversampling coefficients.

Optionally, $\{U_{1,k}\}_{k=1 \ldots M}$ and $\{U_{2,(j,l)}\}_{l=1 \ldots N}$ are oversampled DFT basis vector sets, and $C_{complex}$ is compressed with reference to the manner 3 of step 4 (in the second manner). In this case, the values of M and N each are less than a product of a length of a vector included in a corresponding basis vector set and an oversampling coefficient. To be specific, $M<N_{tx} \times x$ (a physical meaning corresponding to a downlink channel matrix H is an eigen subspace matrix obtained through SVD) or $M<N_{tx} \times N_{rx} \times x$ (a physical meaning corresponding to a downlink channel matrix H is an original channel), and $N<N_{sb} \times y$. Particularly, to reach a purpose of information compression, in the case, generally, $M<N_{tx}$ or $M<N_{tx} \times N_{rx}$, and $N<N_{sb}$.

The reconstructed channels obtained by using Formula 7 and Formula 8 are equivalent. Formula 7 indicates inverse transform of space-frequency projection. Although S, F, and the dimension of $\tilde{C}_{complex}$ varies with preprocessing manners, in Formula 7, S, F, and the dimension of $\tilde{C}_{complex}$ meet a dimension of matrix multiplication. Formula 8 indicates an end-to-end reconstruction formula. To be specific, an index $ind_i$ fed back by using the PMI is obtained by using the CSI, a weighting coefficient plane is restored, and multiplication and summation are performed with corresponding space-frequency basis vectors one by one, to obtain the reconstructed H'.

Formula 8 represents a general process of restoring channel information included in the PMI to some D-dimensional vectors by using a function q(x), converting these D-dimensional vectors into M×N×2 real matrices by using a function $f_{dec}(x)$, calculating complex matrix forms of the real matrices, obtaining M×N weighting complex coefficients, separately multiplying the weighting complex coefficients by M space domain basis vectors and N frequency domain basis vectors, and finally performing summation to obtain a reconstructed downlink channel feature matrix H'. The foregoing value of M×N is used as an example instead of limitation. In other words, a specific value of M×N is different from that in the foregoing examples due to different preprocessing methods. Provided that the end-to-end reconstruction manner meets the first relationship described in Formula 8, this shall fall within the protection scope of at least one embodiment.

Formula 8 further imposes limitation on the preprocessing procedure of step S505. In response to $C_{complex}$ being compressed, a selected coefficient is a two-dimensional matrix that separately corresponds to a space domain dimension and a frequency domain dimension (similar to the manner 3).

2. The output dimension of the decoder network is M×2.

A dimension of the second matrix is M×2. In response to M in the dimension of the second matrix being the same as a dimension of a to-be-reconstructed downlink channel feature matrix H', the second matrix is directly converted into a complex matrix to obtain a corresponding complex matrix $C_{complex}$. The dimension of the to-be-reconstructed downlink channel feature matrix H' is $M_1 \times M_2$. In response to $M=M_1 \times M_2$, M and the dimension are the same. In other words, although the output dimension of the decoder network is not strictly consistent with H', a total quantity of valid channel features is M, and only simple matrix transform is used to implement the equivalence.

Alternatively, in response to M in the dimension of the second matrix being different from a dimension of a to-be-reconstructed downlink channel feature matrix H' (for example, the UE performs further compression in step S505 with reference to the manner 1 or the manner 2 of step 4 in the second manner), the network device obtains information about the reconstructed downlink channel matrix based on the second matrix. In an implementation, the network device converts the second matrix into a complex matrix whose dimension is M, and then fills M complex coefficients in corresponding positions based on positions of the M complex coefficients at an original $N_{rx} \times N_{sb}$ two-dimensional plane. Other positions at the original $N_{rx} \times N_{sb}$ two-dimensional plane are set to 0. In this way, a complex matrix $\tilde{C}_{complex}$ is obtained.

The network device performs inverse transform on the complex matrix $\tilde{C}_{complex}$ to obtain the eigen subspace matrix H', that is, the reconstructed downlink channel matrix. For differentiation from the foregoing eigen subspace matrix, the foregoing eigen subspace matrix (for example, the eigen subspace matrix H in step S505) is referred to as a first eigen subspace matrix, and the eigen subspace matrix H' herein is referred to as a second eigen subspace matrix. For example, for a process in which the network device performs inverse transform on the complex matrix $\tilde{C}_{complex}$, refer to Formula 7.

In response to the output dimension of the decoder network being M×2, step S509 is also expressed by using a uniform reconstruction formula. The network device obtains the information about the reconstructed downlink channel matrix in any manner, provided that the information about the reconstructed downlink channel matrix meets a second relationship. Steps (for example, steps S5091 and S5092) performed by the network device in step S509 are merely examples, and are not intended to limit behavior of the network device. The second relationship includes:

$$H = \Sigma_{j=1}^{M} C(f_{dec}(q(ind_i))) \times U_{1,(j,k)} \times U^*_{2,(j,l)} \quad \text{(Formula 9)}$$

In Formula 9, $\{ind_i\}_{i=1 \ldots S}$ represents the S indexes of the S vectors included in the first vector quantization dictionary, that is, the S indexes of the S vectors corresponding to the PMI. A function q(x) indicates to map, based on the first vector quantization dictionary, the indexes of the S vectors to obtain the first matrix whose dimension is D×S. A function $f_{dec}(x)$ indicates to reconstruct the first matrix by using the decoder network to obtain the second matrix whose dimension is M×2. The first matrix and the second matrix are both real matrices. A function C(x) indicates to convert the second matrix into a complex matrix (for example, the complex matrix $\tilde{C}_{complex}$ described in step S509) whose dimension is M. $U^*_{2,(j,l)}$ represents a conjugate transpose vector of $U_{2,(j,l)}$, and $\{U^*_{2,(j,l)}\}$ represents a conjugate transpose matrix of $\{U_{2,(j,l)}\}$.

$\{U_{1,(j,k)}\}_{j=1 \ldots M}$ represents a space domain basis vector set. The space domain basis vector set is, for example, the space domain basis used in response to the UE performing space-frequency joint projection described above. A length of a vector included in the space domain basis vector set is $N_{rx}$ (a physical meaning of a corresponding downlink channel matrix H is an eigen subspace matrix obtained through SVD) or $N_{rx} \times N_{rx}$ (a physical meaning of a corresponding downlink channel matrix H is an original channel). $\{U^*_{2,(j,l)}\}_{j=1 \ldots M}$ represents a frequency domain basis vector set. The frequency domain basis vector set is, for example, a frequency domain basis that is used in response to the UE performing space-frequency joint projection and that is described above. For example, the network device uses a DFT formula to obtain the space domain basis vector set and the frequency domain basis vector set. A length of a vector included in the frequency domain basis vector set is $N_{sb}$. On response to a frequency domain granularity being one RB, $N_{sb} = N_{rb}$. In response to Formula 9 being used, in response to performing preprocessing, the UE further compresses the complex matrix $C_{complex}$ obtained through space-frequency joint projection. For example, the UE performs further compression in step S505 with reference to the manner 1 or the manner 2 of step 4 in the second manner. In this way, a coefficient matrix $C_{topM\_complex} \in \mathcal{C}^{M \times 1}$ is obtained. An element included in the coefficient matrix is a subset of elements included in the complex matrix. The complex matrix $C_{complex}$ is a two-dimensional matrix. An element j in the coefficient matrix corresponds to an element in the complex matrix. The complex matrix is, for example, a two-dimensional matrix, and is considered as a two-dimensional plane. In this case, (j,k) and (j,l) represent a position mapping relationship at the two-dimensional plane formed by the complex matrix $C_{complex}$. In other words, any value of j uniquely corresponds to one group of (k,l) at the two-dimensional plane. (k,l) is a two-dimensional coordinate point at the two-dimensional plane, that is, an element in the complex matrix. The M groups of two-dimensional coordinates (k,l) is sent by the UE to the network device. The network device obtains the M groups of two-dimensional coordinates (k,l). Therefore, the complex matrix whose dimension is M and that is obtained through conversion based on the second matrix is converted, based on $U_{1,(j,k)}$ and $U^*_{2,(j,l)}$ in Formula 9, into a complex matrix $C_{complex}$ before compression.

A value of M depends on the preprocessing manner of step S505. Optionally, $\{U_{1,(j,k)}\}_{j=1 \ldots M}$ and $\{U^*_{2,(j,l)}\}_{j=1 \ldots M}$ are orthogonal DFT basis sets, and $C_{complex}$ is not further compressed. In this case, the value of M is a dimension product of the $C_{complex}$ matrix. Herein, $M = N_{rx} \times N_{sb}$ (a physical meaning corresponding to a downlink channel matrix H is an eigen subspace matrix obtained through SVD) or $M = N_{rx} \times N_{rx} \times N_{sb}$ (a physical meaning corresponding to a downlink channel matrix H is an original channel).

Optionally, $\{U_{1,(j,k)}\}_{j=1 \ldots M}$ and $\{U^*_{2,(j,l)}\}_{j=1 \ldots M}$ are orthogonal DFT basis sets, and $C_{complex}$ is compressed with reference to the manner 1 or 2 of step 4 (in the second manner). In this case, the value of M is less than a dimension product of the $C_{complex}$ matrix. Herein, $M < N_{rx} \times N_{sb}$ (a physical meaning corresponding to a downlink channel matrix H is an eigen subspace matrix obtained through SVD) or $M < N_{rx} \times N_{rx} \times N_{sb}$ (a physical meaning corresponding to a downlink channel matrix H is an original channel).

Optionally, $\{U_{1,(j,k)}\}_{j=1 \ldots M}$ and $\{U^*_{2,(j,l)}\}_{j=1 \ldots M}$ are oversampled DFT basis sets, and $C_{complex}$ is not further compressed. In this case, the value of M is a dimension product of the oversampled $C_{complex}$ matrix. Herein, $M = N_{rx} \times x \times N_{sb} \times y$ (a physical meaning corresponding to a downlink channel matrix H is an eigen subspace matrix obtained through SVD) or $M = N_{rx} \times N_{rx} \times x \times N_{sb} \times y$ (a physical meaning corresponding to a downlink channel matrix H is an original channel).

Optionally, $\{U_{1,(j,k)}\}_{j=1 \ldots M}$ and $\{U^*_{2,(j,l)}\}_{j=1 \ldots M}$ are oversampled DFT basis sets, and $C_{complex}$ is compressed with reference to the manner 1 or 2 of step 4 (in the second manner). In this case, the value of M is less than a dimension product of the oversampled $C_{complex}$ matrix. Herein, $M \leq N_{rx} \times x \times N_{sb} \times y$ (a physical meaning corresponding to a downlink channel matrix H is an eigen subspace matrix obtained through SVD) or $M \leq N_{rx} \times N_{rx} \times x \times N_{sb} \times y$ (a physical meaning corresponding to a downlink channel matrix H is an original channel). Particularly, to reach a purpose of information compression, in the case, generally, $M \leq N_{tx} \times N_{sb}$ or $M \leq N_{tx} \times N_{rx} \times N_{sb}$.

The reconstructed channels obtained by using Formula 7 and Formula 9 are equivalent. Formula 7 indicates inverse transform of space-frequency projection. Although S, F and the dimension of $C_{complex}$ varies with preprocessing manners, in Formula 7, F and the dimension of $C_{complex}$ meet a dimension of matrix multiplication. Formula 9 indicates an end-to-end reconstruction formula. To be specific, an index $ind_i$ fed back by using the PMI is obtained by using the CSI, a weighting coefficient vector is restored, and multiplication and summation are performed with corresponding space-frequency basis vectors one by one, to obtain the reconstructed H'.

Formula 9 represents a general process of restoring channel information included in the PMI to some D-dimensional vectors by using a function q(x), converting these D-dimensional vectors into M×2 real matrices by using a function $f_{dec}(x)$, calculating complex matrix forms of the real matrices, obtaining M weighting complex coefficients, separately multiplying the weighting complex coefficients by M groups of space-frequency basis vectors, and finally performing summation to obtain a reconstructed downlink channel feature matrix H'. The foregoing value of M is used as an example instead of limitation. In other words, a specific value of M is different from that in the foregoing examples due to different preprocessing methods. Provided that the end-to-end reconstruction manner meets the second relationship described in Formula 9, this shall fall within the protection scope of at least one embodiment.

Generally, H is a two-dimensional matrix plane (space domain x frequency domain). Formula 9 further imposes the following limitation on the preprocessing procedure of step S505: A selected coefficient is to be arranged according to a one-dimensional vector. For example, H is converted into a one-dimensional vector (without compression); or a candidate coefficient matrix is converted into a one-dimensional vector, and then M coefficients with largest energy are selected (similar to the compression manner 1 or 2).

3. The output dimension of the decoder network is M×N×T×2.

Herein, a dimension of the second matrix is M×N×T×2. This case is generally for the fifth manner, where $T=N_{rx}$.

In response to M×N×T in the dimension of the second matrix being the same as a dimension of a to-be-reconstructed downlink channel feature matrix H', the second matrix is directly converted into a complex matrix to obtain a corresponding complex matrix $\tilde{C}_{complex}$.

Alternatively, in response to M×N×T in the dimension of the second matrix being different from a dimension of a to-be-reconstructed downlink channel feature matrix H' (for example, further compression is performed in step S505 with reference to the manner 3 of step 4 in the second manner), optionally, the network device converts the second matrix into a complex matrix, and fills, based on M×N pieces of position information obtained from the CSI, elements of the complex matrix in an all-zero matrix with a same dimension as the downlink channel feature matrix H' one by one to obtain $\tilde{C}_{complex}$.

Alternatively, in response to M×N×T in the dimension of the second matrix being different from a dimension of a to-be-reconstructed downlink channel feature matrix H' (for example, further compression is performed in step S505 with reference to the manner 1 or 2 of step 4 in the second manner), optionally, the network device converts the second matrix into a complex matrix, and fills, based on M pieces of position information obtained from the CSI, elements of the complex sequence in an all-zero matrix with a same dimension as the downlink channel feature matrix H' one by one to obtain $\tilde{C}_{complex}$.

The network device performs inverse transform on the complex matrix $\tilde{C}_{complex}$ to obtain the eigen subspace matrix H', that is, the reconstructed downlink channel matrix. For differentiation from the foregoing eigen subspace matrix, the foregoing eigen subspace matrix (for example, the eigen subspace matrix H in step S505) is referred to as a first eigen subspace matrix, and the eigen subspace matrix H' herein is referred to as a second eigen subspace matrix. For example, for a process in which the network device performs inverse transform on the complex matrix $\tilde{C}_{complex}$, refer to Formula 10.

$$H' = (G \times \tilde{C}_{complex_{M \times N}} \times F^H)|_{1 \ldots T} \quad \text{(Formula 10)}$$

Compared with Formula 7, in the relationship expressed in Formula 10, a dimension T in M×N×T does not participate in inverse transform. This is equivalent to T times of inverse transform performed on an M×N dual-domain plane.

In response to the output dimension of the decoder network being M×N×T, step S509 is also expressed by using a uniform reconstruction formula. The network device obtains the information about the reconstructed downlink channel matrix in any manner, provided that the information about the reconstructed downlink channel matrix meets a third relationship. Steps (for example, steps S5091 and S5092) performed by the network device in step S509 are merely examples, and are not intended to limit behavior of the network device. The third relationship includes:

$$H' = \Sigma_{k=1}^{M} \Sigma_{l=1}^{N} (C(f_{dec}(q(ind_i))))|_{t=1 \ldots T} \times U_{1,k} \times U^*_{2,l} \quad \text{(Formula 11)}$$

In Formula 11, $q(ind_i)$ represents the S indexes of the S vectors included in the first vector quantization dictionary, that is, the S indexes of the S vectors corresponding to the PMI. A function q(x) indicates to map, based on the first vector quantization dictionary, the indexes of the S vectors to the first matrix whose dimension is D×S. A function $f_{dec}(x)$ indicates to reconstruct the first matrix by using the decoder network to obtain the second matrix whose dimension is M×N×T×2. Herein, $T=N_{rx}$. The first matrix and the second matrix are both real matrices. A function C(x) indicates to convert the second matrix into a complex matrix (for example, the complex matrix $\tilde{C}_{complex}$ described in step S509) whose dimension is M×N×T. $(x)|_{t=1 \ldots T}$ herein indicates to process (or reconstruct), based on the second matrix according to Formula 11, T matrices whose dimensions are M×N, to obtain a reconstructed downlink channel matrix. $U^*_{2,l}$ represents a conjugate transpose vector of $U_{2,l}$, and $\{U^*_{2,l}\}$ represents a conjugate transpose matrix of $\{U_{2,l}\}$.

$\{U_{1,k}\}_{k=1 \ldots M}$ represents a space domain basis vector set. The space domain basis vector set is, for example, the space domain basis used in response to the UE performing space-frequency joint projection described above. A length of a vector included in the space domain basis vector set is $N_{rx}$. $\{U_{2,l}\}_{l=1 \ldots N}$ represents a frequency domain basis vector set. The frequency domain basis vector set is, for example, a frequency domain basis that is used in response to the UE performing space-frequency joint projection and that is described above. For example, the network device uses a DFT formula to obtain the space domain basis vector set and the frequency domain basis vector set. A length of a vector included in the frequency domain basis vector set is $N_{sb}$. In response to a frequency domain granularity being one RB, $N_{sb}=N_{rb}$. $U_{2,l}$ represents a conjugate transpose vector of $U_{2,l}$.

Values of M and N depend on the preprocessing manner of step S505. Optionally, $\{U_{1,k}\}_{k=1 \ldots M}$ and $\{U_{2,l}\}_{l=1 \ldots N}$ are orthogonal DFT basis vector sets, and $C_{complex}$ is not further compressed. In this case, values of M and N each are equal to a length of a vector included in a corresponding basis vector set. Herein, $M=N_{tx}$, and $N=N_{sb}$.

Optionally, $\{U_{1,k}\}_{k=1 \ldots M}$ and $\{U_{2,l}\}_{l=1 \ldots N}$ are orthogonal DFT basis vector sets, and $C_{complex}$ is compressed with reference to the manner 3 of step 4 (in the second manner). In this case, the values of M and N each are less than a length of a vector included in a corresponding basis vector set. Herein, $M<N_{tx}$, and $N<N_{sb}$.

Optionally, $\{U_{1,k}\}_{k=1 \ldots M}$ and $\{U_{2,(j,l)}\}_{l=1 \ldots N}$ are oversampled DFT basis vector sets, and $C_{complex}$ is not further compressed. In this case, the values of M and N each are equal to a product of a length of a vector included in a corresponding basis vector set and an oversampling coefficient. Herein, $M=N_{tx} \times x$, and $N=N_{sb} \times y$, where x and y are respectively space-frequency oversampling coefficients. For value ranges of x and y, refer to the foregoing content.

Optionally, $\{U_{1,k}\}_{k=1 \ldots M}$ and $\{U_{2,(j,l)}\}_{l=1 \ldots N}$ are oversampled DFT basis vector sets, and $C_{complex}$ is compressed with reference to the manner 3 of step 4 (in the second manner). In this case, the values of M and N each are less than a product of a length of a vector included in a corresponding basis vector set and an oversampling coefficient. Herein, $M<N_{tx} \times x$, and $N<N_{sb} \times y$. Particularly, to reach a purpose of information compression, in the case, generally, $M<N_{tx}$ and $N<N_{sb}$.

Reconstructed channels obtained by using Formula 10 and Formula 11 are equivalent. Formula 10 indicates inverse transform of space-frequency projection. Although S, F and the dimension of $\tilde{C}_{complex}$ varies with preprocessing manners, in Formula 10, F and the dimension of $\tilde{C}_{complex}$ meet a dimension of matrix multiplication. Formula 11 indicates an end-to-end reconstruction formula. To be specific, an index $ind_i$ fed back by using the PMI is obtained by using the CSI, a weighting coefficient plane is restored, and multiplication and summation are performed with corresponding space-frequency basis vectors one by one, to obtain a reconstructed H'.

Formula 11 represents a general process of restoring channel information included in the PMI to some D-dimensional vectors by using a function q(x), converting these D-dimensional vectors into $M \times N \times T \times 2$ real matrices by using a function $f_{dec}(x)$, calculating complex matrix forms of the real matrices, obtaining $M \times N \times T$ weighting complex coefficients, taking $M \times N$ weighting complex coefficients element by element based on a dimension T, separately multiplying the weighting complex coefficients by M space domain basis vectors and N frequency domain basis vectors, and finally performing summation to obtain a reconstructed downlink channel feature matrix H'. The foregoing value of $M \times N$ is used as an example instead of limitation. In other words, a specific value of $M \times N$ is different from that in the foregoing examples due to different preprocessing methods. Provided that the end-to-end reconstruction manner meets the third relationship described in Formula 11, this shall fall within the protection scope of at least one embodiment.

Particularly, Formula 11 further imposes the following limitation on the preprocessing procedure of step S505: In response to $C_{complex}$ being compressed, a selected coefficient is necessarily a two-dimensional matrix that separately corresponds to a space domain dimension and a frequency domain dimension (similar to the manner 3).

4. The output dimension of the decoder network is $M \times T \times 2$.

Herein, a dimension of the second matrix is $M \times T \times 2$. This case is generally for the fifth manner, where $T=N_{rx}$.

For example, in response to $M \times T \times 2$ in the dimension of the second matrix being different from a dimension of a to-be-reconstructed downlink channel feature matrix H' (for example, further compression is performed in step S505 with reference to the manner 1 or the manner 2 of step 4 in the second manner), optionally, the network device converts the second matrix into a complex matrix whose dimension is $T \times M$. The $T \times M$ complex matrix includes T complex vectors whose dimensions are M. For each complex vector whose dimension is M, the network device fills M complex coefficients in corresponding positions based on positions of the M complex coefficients at an original two-dimensional space-frequency plane that are reported by using the CSI. Other positions are set to 0. In this way, a complex matrix $\tilde{C}_{complex}$ is obtained. For a process in which the network device performs inverse transform on a complex matrix $\tilde{C}_{complex}$ to obtain an eigen subspace matrix H', refer to Formula 10.

In response to the output dimension of the decoder network being $M \times T \times 2$, step S509 is also expressed by using a uniform reconstruction formula. The network device obtains the information about the reconstructed downlink channel matrix in any manner, provided that the information about the reconstructed downlink channel matrix meets a fourth relationship. Steps (for example, steps S5091 and S5092) performed by the network device in step S509 are merely examples, and are not intended to limit behavior of the network device. The fourth relationship includes:

$$H=\Sigma_{k=1}^{M}(C(f_{dec}(q(ind_i))))|_{t=1 \ldots T} \times U_{1,(j,k)} \times U^*_{2,(j,l)} \quad \text{(Formula 12)}$$

In Formula 12, $q(ind_i)$ represents the S indexes of the S vectors included in the first vector quantization dictionary, that is, the S indexes of the S vectors corresponding to the PMI. A function q(x) indicates to map, based on the first vector quantization dictionary, the indexes of the S vectors to the first matrix whose dimension is $D \times S$. A function $f_{dec}(x)$ indicates to reconstruct the first matrix by using the decoder network to obtain the second matrix whose dimension is $M \times T \times 2$. Herein, $T=N_{rx}$. The first matrix and the second matrix are both real matrices. A function C(x) indicates to convert the second matrix into a complex matrix (for example, the complex matrix $\tilde{C}_{complex}$ described in step S509) whose dimension is $M \times T$. $(x)|_{t=1 \ldots T}$ herein indicates to process (or reconstruct), based on the second matrix according to Formula 12, T matrices whose dimensions are M, to obtain a reconstructed downlink channel matrix. $U^*_{2,(j,l)}$ represents a conjugate transpose vector of $U_{2,(j,l)}$, and $\{U^*_{2,(j,l)}\}$ represents a conjugate transpose matrix of $\{U_{2,(j,l)}\}$.

$\{U_{1,(j,k)}\}_{j=1 \ldots M}$ represents a space domain basis vector set. The space domain basis vector set is, for example, the space domain basis used in response to the UE performing space-frequency joint projection described above. A length of a vector included in the space domain basis vector set is $N_{tx}$. $\{U^*_{2,(j,l)}\}_{j=1 \ldots M}$ represents a frequency domain basis vector set. The frequency domain basis vector set is, for example, a frequency domain basis that is used in response to the UE performing space-frequency joint projection and that is described above. For example, the network device uses a DFT formula to obtain the space domain basis vector set and the frequency domain basis vector set. A length of a vector included in the frequency domain basis vector set is $N_{sb}$. In response to a frequency domain granularity being one RB, $N_{sb}=N_{rb}$. $U^*_{2,(j,l)}$ represents a conjugate transpose vector of $U_{2,(j,l)}$. (j,k) and (j,l) are a position mapping relationship at a $C_{complex}$ two-dimensional plane. In other words, any value of j uniquely corresponds to one group of (k,l). (k,l) is a two-dimensional coordinate point at $C_{complex}$. Herein, M groups of two-dimensional coordinates (k,l) is fed back by the UE.

A value of M depends on the preprocessing manner of step S505. Optionally, $\{U_{1,(j,k)}\}_{j=1 \ldots M}$ and $\{U^*_{2,(j,l)}\}_{j=1 \ldots M}$ are orthogonal DFT basis sets, and $C_{complex}$ is not further compressed. In this case, the value of M is a dimension product of the $C_{complex}$ matrix, where $M=N_{tx} \times N_{sb}$.

Optionally, $\{U_{1,(j,k)}\}_{j=1 \ldots M}$ and $\{U^*_{2,(j,l)}\}_{j=1 \ldots M}$ are orthogonal DFT basis sets, and $C_{complex}$ is compressed with reference to the manner 1 or 2 of step 4 (in the second manner). In this case, the value of M is less than a dimension product of the $C_{complex}$ matrix, where $M \leq N_{tx} \times N_{sb}$.

Optionally, $\{U_{1,(j,k)}\}_{j=1 \ldots M}$ and $\{U^*_{2,(j,l)}\}_{j=1 \ldots M}$ are oversampled DFT basis sets, and $C_{complex}$ is not further compressed. In this case, the value of M is a dimension product of the oversampled $C_{complex}$ matrix, where $M=N_{tx} \times x \times N_{sb} \times y$.

Optionally, $\{U_{1,(j,k)}\}_{j=1 \ldots M}$ and $\{U^*_{2,(j,l)}\}_{j=1 \ldots M}$ are oversampled DFT basis sets, and $C_{complex}$ is compressed with reference to the manner 1 or 2 of step 4 (in the second manner). In this case, the value of M is less than a dimension product of the oversampled $C_{complex}$ matrix, where $M \leq N_{tx} \times x \times N_{sb} \times y$. Particularly, to reach a purpose of information compression, in the case, generally, $M \leq N_{tx} \times N_{sb}$.

The reconstructed channels obtained by using Formula 10 and Formula 12 are equivalent. Formula 10 indicates inverse transform of space-frequency projection. Although S, F and the dimension of $\tilde{C}_{complex}$ varies with preprocessing manners, in Formula 10, F and the dimension of $\tilde{C}_{complex}$ meet a dimension of matrix multiplication. Formula 12 indicates an end-to-end reconstruction formula. To be specific, an index $ind_i$ fed back by using the PMI is obtained by using the CSI, a weighting coefficient vector is restored, and multiplication and summation are performed with corresponding space-frequency basis vectors one by one, to obtain the reconstructed H'.

Formula 12 represents a general process of restoring channel information included in the PMI to some D-dimensional vectors by using a function q(x), converting these D-dimensional vectors into M×T×2 real matrices by using a function $f_{dec}(x)$, calculating complex matrix forms of the real matrices, obtaining M×T weighting complex coefficients, taking M weighting complex coefficients element by element based on a dimension T, separately multiplying the weighting complex coefficients by M groups of space-frequency basis vectors, and finally performing summation to obtain a reconstructed downlink channel feature matrix H'. The foregoing value of M is used as an example instead of limitation. In other words, a specific value of M is different from that in the foregoing examples due to different preprocessing methods. Provided that the end-to-end reconstruction manner meets the fourth relationship described in Formula 12, this shall fall within the protection scope of at least one embodiment.

Generally, H is a two-dimensional matrix plane (space domain x frequency domain). Formula 12 further imposes the following limitation on the preprocessing procedure of step S505: A selected coefficient is to be arranged according to a one-dimensional vector. For example, H is converted into a one-dimensional vector (without compression); or a candidate coefficient matrix is converted into a one-dimensional vector, and then M coefficients with largest energy are selected (similar to the compression manner 1 or 2).

In at least one embodiment, steps S501 to S506 are optional steps. In addition, steps S5091 and S5092 included in step S509 are also optional steps.

In addition, at least one embodiment is applied to a network architecture of UE and a network device, or is applied to a network architecture of UE, a network device, and an AI module. The architecture includes two AI modules. One AI module is disposed inside the network device, and implements functions such as real-time inference. The other AI module is disposed outside the network device. The AI module implements model training, non-real-time function inference, and the like. In response to at least one embodiment being applied to the network architecture of UE, a network device, and an AI module, for example, processes of offline training the decoder network, preparing an NN-CSI network by the network device in step S502, inputting the first matrix to the decoder network to obtain the second matrix in step S509, and the like is performed by the AI module.

In at least one embodiment, the CSI is determined based on the first vector quantization dictionary. For example, the PMI is represented by using an index of one or more vectors included in the first vector quantization dictionary. In this case, information obtained through measurement is quantized by using the index included in the first vector quantization dictionary. The UE sends quantized information, to reduce signaling overheads. For example, because a dimension of a quantized vector is usually relatively large, and is equivalent to dimension expansion on information or maintenance at a relatively high dimension, thereby improving quantization precision. In addition, optionally, in cooperation with the encoder network and the decoder network, the original channel matrix is compressed. To be specific, instead of extracting some coefficients from the original channel matrix for feedback, the original channel matrix is compressed as a whole by using a network. In this case, discarded information is reduced, thereby reducing a compression loss. In addition, the VQ-AE network is used in at least one embodiment. In the VQ-AE network, a quantization network and a compression network are jointly designed, so that joint optimization is implemented between compression and quantization, to reduce a performance loss and improve overall accuracy of the fed-back channel state information. In addition, in at least one embodiment, input and output dimensions of a neural network (for example, input and output dimensions of an encoder and/or input and output dimensions of a decoder) is restricted, to adjust CSI feedback complexity, thereby highlighting an advantage of compressing a downlink channel matrix by using the neural network.

Figure 6:
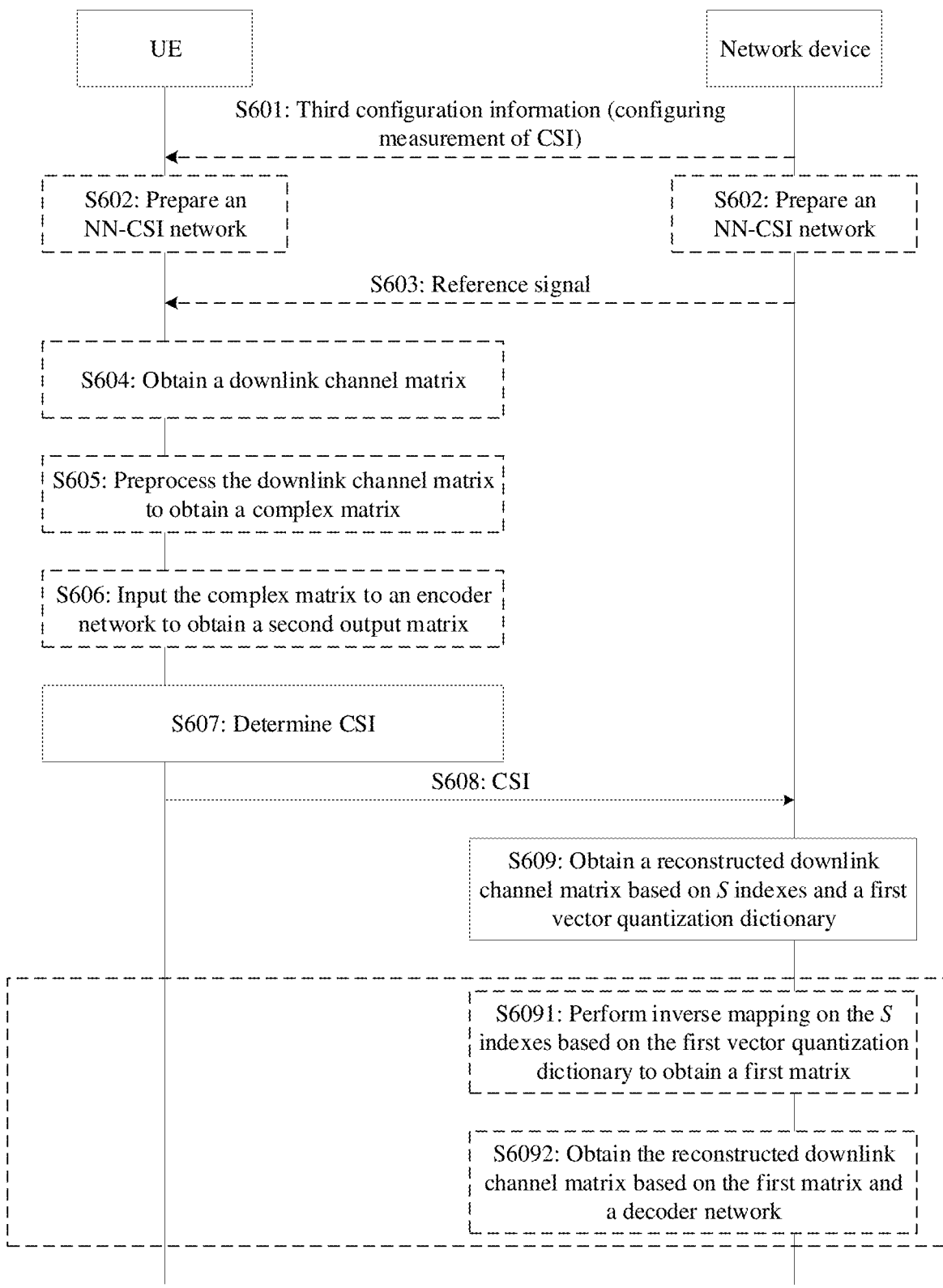

In the embodiment shown in FIG. 5, conversion between a complex matrix and a real matrix is performed. In this case, the UE converts a complex matrix into a real matrix, and the network device converts a real matrix into a complex matrix. The following describes a second communication method provided in at least one embodiment. According to the method, a matrix conversion process is reduced, thereby simplifying processing complexity. FIG. 6 is a flowchart of the method.

S601: A network device sends configuration information to UE, and correspondingly, the UE receives the configuration information from the network device. For example, the configuration information is referred to as configuration information 1 or third configuration information, and the third configuration information is used to configure CSI measurement.

For more content of step S601, refer to step S501 in the embodiment shown in FIG. 5.

S602: The UE prepares an NN-CSI network, and the network device prepares an NN-CSI network.

For more content of step S602, refer to step S502 in the embodiment shown in FIG. 5.

S603: The network device sends a reference signal to the UE, and correspondingly, the UE receives the reference signal from the network device.

The network device sends the reference signal to the UE based on the third configuration information.

S604: The UE obtains a downlink channel matrix.

For more content of step S604, refer to step S504 in the embodiment shown in FIG. 5.

S605: The UE preprocesses the downlink channel matrix.

For example, for a manner in which the UE obtains a complex matrix $C_{complex}$, refer to any one of the first manner to the fifth manner described in step S505 in the embodiment shown in FIG. 5. In step S505 in the embodiment shown in FIG. 5, in the first manner to the fifth manner, the complex matrix $C_{complex}$ is to be converted into a real matrix. However, in at least one embodiment, regardless of a specific manner that is used by the UE to obtain the complex matrix $C_{complex}$, the UE is able to not convert the complex matrix $C_{complex}$ into a real matrix. In other words, a preprocessing result in at least one embodiment is that the complex matrix $C_{complex}$ is obtained. The complex matrix $C_{complex}$ is obtained in any one of the five manners of step S505 in the embodiment shown in FIG. 5.

S606: The UE obtains an output matrix of an encoder network based on the complex matrix and the encoder network. For example, the UE inputs the complex matrix to the encoder network to obtain the output matrix of the encoder network. For example, the output matrix of the encoder network is referred to as a second output matrix. For example, a reference network currently used by the UE and the network device is a first reference network, and the first reference network includes a first reference encoder network and a first reference decoder network. A protocol does not restrict whether the actually used encoder network is a reference encoder network, but restricts that evaluated performance of the actually used encoder network and a corresponding reference decoder network meets indicators specified in the protocol. Therefore, features of the encoder network currently used by the UE is determined based on features of the first reference encoder network. For example, an input dimension of the encoder network currently used by the UE is determined based on an input dimension of the first reference encoder network. For example, the input dimension of the encoder network currently used by the UE is equal to the input dimension of the first reference encoder network. Similarly, for example, an output dimension of the encoder network currently used by the UE is also determined based on an output dimension of the first reference encoder network. For example, the output dimension of the encoder network currently used by the UE is equal to an output dimension of the first reference encoder network.

For example, the UE obtains, through a preprocessing process, a complex matrix whose dimension is M×N. The input dimension of the encoder network (in other words, a dimension of an input matrix of the encoder network) is M×N. The complex matrix is the input matrix of the encoder network. The UE uses a complex matrix $C \in \mathcal{C}^{M \times N}$ as an input of the encoder network, and obtains an output $la \in \mathcal{R}^{D \times S}$ of the encoder network through inference, where la represents a first output matrix. The first output matrix is a real matrix whose dimension is D×P×Q, or the first output matrix is a complex matrix whose dimension is D×P×Q. For example, S=P×Q. Therefore, the output dimension of the encoder network is understood to be D×S. In at least one embodiment, for example, $M \leq N_{tx}$, $N \leq N_{sb}$, and $S \leq M \times N$; or $M = N_{tx} \times x$, $N = N_{sb} \times y$, and $S \leq (N_{tx} \times x) \times (N_{sb} \times y)$. Herein, both x and y are greater than 1, or x is equal to 1 and y is greater than 1, or x is greater than 1 and y is equal to 1.

For another example, the UE obtains, through a preprocessing process, a complex matrix whose dimension is M. The input dimension of the encoder network (in other words, a dimension of an input matrix of the encoder network) is M. The complex matrix is the input matrix of the encoder network. The UE uses a complex matrix $C \in \mathcal{C}^M$ as an input of the encoder network, and obtains an output $la \in \mathcal{R}^{D \times S}$ of the encoder network through inference, where la represents a first output matrix. The first output matrix is a real matrix whose dimension is D×S, and includes S real vectors whose lengths are D. Alternatively, the first output matrix is a complex matrix whose dimension is D×S, and includes S complex vectors whose lengths are D. The output dimension of the encoder network is understood to be D×S. In at least one embodiment, for example, $M \leq N_{tx} \times N_{sb} \times z$, and $S \leq M$.

For still another example, the UE obtains, through a preprocessing process, a complex matrix whose dimension is M×N×T. The input dimension of the encoder network (in other words, a dimension of an input matrix of the encoder network) is M×N×T. The complex matrix is the input matrix of the encoder network. The UE uses a complex matrix $C \in \mathcal{C}^{M \times N \times T}$ as an input of the encoder network, and obtains an output $la \in \mathcal{R}^{D \times S}$ of the encoder network through inference, where la represents a first output matrix. The first output matrix is a real matrix whose dimension is D×P×Q×R, or the first output matrix is a complex matrix whose dimension is D×P×Q×R. For example, S=P×Q×R. Therefore, the output dimension of the encoder network is understood to be D×S. In at least one embodiment, for example, $M = N_{rx}$, $N = N_{tx}$, $T = N_{sb}$, and $S \leq N_{rx} \times N \times N_{sb}$.

S607: The UE determines CSI. For content such as explanation of the first vector quantization dictionary, refer to step S507 in the embodiment shown in FIG. 5.

For example, the UE performs quantization processing on the second output matrix based on the first vector quantization dictionary to obtain the CSI, so that the downlink channel matrix is restored based on the CSI. The UE directly performs quantization processing on the second output matrix based on the first vector quantization dictionary. Alternatively, the UE performs corresponding processing on the second output matrix, and then perform quantization processing on a processed second output matrix based on the first vector quantization dictionary. In at least one embodiment, that the UE directly performs quantization processing on the second output matrix based on the first vector quantization dictionary is used as an example.

A dimension of the first vector quantization dictionary is, for example, D×E. The output dimension of the encoder network is $la \in \mathcal{R}^{D \times S}$. An assumption is that $\overline{la}_{i=1 \ldots S} \in \mathcal{R}^{D \times 1}$ is any column vector in la, the UE determines, in the first vector quantization dictionary, a vector most similar to $\overline{la}_{i=1 \ldots S}$ or a vector with similarity greater than a threshold, and return an index $Ind_i$ of the vector. After traversing the S column vectors in $la \in \mathcal{R}^{D \times S}$ the UE obtains an index matrix whose dimension is 1×S. For more description of this part of content, refer to step S507 in the embodiment shown in FIG. 5. In response to the first vector quantization dictionary being a real matrix, and the first output matrix being a real matrix, a vector most similar to $\vec{la}_{i=1\ldots S}$ is determined in the first vector quantization dictionary, for example, determined by using Formula 5.

Alternatively, in response to the first vector quantization dictionary being a complex matrix, and the first output matrix is a complex matrix, a vector most similar to $\vec{la}_{i=1\ldots S}$ is determined in the first vector quantization dictionary, for example, determined in the following manner:

$$Ind_i = \arg\max_{j \in \{1\ldots E\}} \left( \frac{|Dic_j^H \times la_i|}{\|Dic_j\|_2 \times \|la_i\|_2} \right) \quad \text{(Formula 13)}$$

$Dic_j$ represents a $j^{th}$ vector in the first vector quantization dictionary, and $Dic_j^H$ is obtained through performing conjugate transposition on $Dic_j$. $\|x\|$ indicates to obtain a norm of x, and |x| indicates to obtain an absolute value of x.

By using Formula 13, a continuous floating-point channel representation is approximately represented by using a vector represented by a discrete index. An error caused by processing in this step is considered as a quantized error.

For example, in response to the first output matrix being a complex matrix, Formula 13 is used; or in response to the first output matrix being a real matrix, Formula 6 is used. Certainly, this is merely an example, and is not specific limitation. For example, even in response to the first output matrix being a complex matrix, Formula 6 is used (for example, Formula 6 is correspondingly changed based on the complex matrix); or even in response to the first output matrix being a real matrix, Formula 13 is used (for example, Formula 13 is correspondingly changed based on the real matrix).

The index matrix is used as a PMI. Alternatively, the UE further converts the index matrix into a binary bit stream. The binary bit stream is used as a PMI.

S608: The UE sends the CSI to the network device, and correspondingly, the network device receives the CSI from the UE.

For more content of step S608, refer to step S508 in the embodiment shown in FIG. 5.

S609: The network device obtains information about a reconstructed downlink channel matrix based on the S indexes and the first vector quantization dictionary.

For example, the information about the reconstructed downlink channel matrix is the reconstructed downlink channel matrix; or the information about the reconstructed downlink channel matrix is not the reconstructed downlink channel matrix, but the reconstructed downlink channel matrix is obtained or a transmission parameter of a downlink channel is determined based on the information.

The S indexes are the S indexes of the S vectors in the first vector quantization dictionary included in the CSI (or the PMI). For example, the reference network currently used by the UE and the network device is the first reference network, and the first reference network includes the first reference encoder network and the first reference decoder network. A protocol does not restrict whether the actually used decoder network is a reference decoder network predefined in the protocol, but restricts that evaluated performance of the actually used decoder network and a corresponding reference encoder network meet indicators specified in the protocol. Therefore, features of the decoder network currently used by the network device is determined based on features of the first reference decoder network. For example, an input dimension of the decoder network currently used by the network device is determined based on an input dimension of the first reference decoder network. For example, the input dimension of the decoder network currently used by the network device is equal to the input dimension of the first reference decoder network. Similarly, for example, the output dimension of the decoder network currently used by the network device is also determined based on the output dimension of the first reference decoder network. For example, the output dimension of the decoder network currently used by the network device is equal to the output dimension of the first reference decoder network.

Step S609 includes a plurality of steps. The following provides description.

S6091: The network device performs inverse mapping on the CSI based on the first vector quantization dictionary to obtain a first matrix. The network device performs, based on the first vector quantization dictionary, inverse mapping on the PMI included in the CSI, to obtain the first matrix. The first matrix is a complex matrix.

For more content of step S6091, refer to step S5091 in the embodiment shown in FIG. 5.

S6092: The network device obtains information about the reconstructed downlink channel matrix based on the first matrix and the decoder network.

For example, the network device inputs the first matrix to the decoder network, a matrix output by the decoder network is referred to as a second matrix, and then the network device obtains the information about the reconstructed downlink channel matrix based on the second matrix.

For example, a dimension of the first matrix is D×S. The network device inputs the first matrix to the decoder network, and the decoder network obtains the second matrix through inference. In response to the input dimension of the encoder network being M×N, a dimension of the second matrix is M×N. In other words, the first matrix is reconstructed by using the decoder network to obtain the second matrix whose dimension is M×N. The second matrix is also a complex matrix. The input dimension of the decoder network is D×P×Q, and the output dimension is M×N, where S=P×Q. For content such as values of M, N, and S, refer to the description of step S606.

Alternatively, in response to the input dimension of the encoder network being M, a dimension of the second matrix is M. In other words, the first matrix is reconstructed by using the decoder network to obtain the second matrix whose dimension is M. The second matrix is also a complex matrix. The input dimension of the decoder network is D×S, and the output dimension is M. For content such as the values of M and S, refer to the description of step S606.

Alternatively, in response to the input dimension of the encoder network being M×N×T, a dimension of the second matrix is M×N×T. In other words, the first matrix is reconstructed by using the decoder network to obtain the second matrix whose dimension is M×N×T. The second matrix is also a complex matrix. The input dimension of the decoder network is D×P×Q×R, and the output dimension is M×N×T. For content such as values of M, N, T, and S, refer to the description of step S606.

Based on different output dimensions of the decoder network, manners in which the network device obtains the information about the reconstructed downlink channel matrix based on the second matrix is also different. The following uses examples for description.

1. The output dimension of the decoder network is M×N.

Herein, the dimension of the second matrix is M×N×2. In response to M×N in the dimension of the second matrix being the same as a dimension of a to-be-reconstructed downlink channel feature matrix H', a corresponding complex matrix $\tilde{C}_{complex}$ is obtained based on the second matrix with direct reference to the following manner of converting a real matrix into a complex matrix: In response to a real matrix being a two-dimensional matrix, for example, $C_{real} \in \mathcal{R}^{M \times 2}$, a complex matrix corresponding to the real matrix is usually a one-dimensional vector, for example, represented as $\tilde{C}_{complex} \in \mathcal{C}^{M \times 1}$. Alternatively, in response to a real matrix being a three-dimensional matrix, for example, $C_{real} \in \mathcal{R}^{M \times N \times 2}$, a complex matrix corresponding to the real matrix is usually a two-dimensional matrix, for example, represented as $\tilde{C}_{complex} \in \mathcal{C}^{M \times N}$. Alternatively, in response to the real matrix being a four-dimensional matrix, for example, $C_{real} \in \mathcal{R}^{M \times N \times T \times 2}$, a complex matrix corresponding to the real matrix is usually a three-dimensional matrix, for example, represented as $\tilde{C}_{complex} \in \mathcal{C}^{M \times N \times T}$.

A method for converting a real matrix with a higher dimension into a complex matrix is obtained by analogy.

Alternatively, in response to M×N in the dimension of the second matrix being different from a dimension of a to-be-reconstructed downlink channel feature matrix H' (for example, further compression is performed in step S505 with reference to the manner 3 of step 4 in the second manner), optionally, with reference to Formula 7, the network device converts the second matrix into a complex matrix, and fills, based on M×N pieces of position information obtained from the CSI, elements of the complex matrix in an all-zero matrix with a same dimension as the downlink channel feature matrix H' one by one according to positions corresponding to the elements. This is equivalent to restoration of the compressed information to obtain $\tilde{C}_{complex}$. The CSI sent by the UE includes the M×N piece of position information.

The network device performs inverse transform on the complex matrix $\tilde{C}_{complex} \in \mathcal{C}^{M \times N}$ to obtain the eigen subspace matrix $H' \in \mathcal{C}^{M \times N}$, that is, the reconstructed downlink channel matrix.

For differentiation from the foregoing eigen subspace matrix, the foregoing eigen subspace matrix (for example, the eigen subspace matrix H in step S505) is referred to as a first eigen subspace matrix, and the eigen subspace matrix H' herein is referred to as a second eigen subspace matrix. For a manner in which the network device performs inverse transform on a complex matrix $\tilde{C}_{complex}$ to obtain a second eigen subspace matrix, refer to Formula 7.

In response to the output dimension of the decoder network being M×N×2, step S509 is also expressed by using a uniform reconstruction formula. The network device obtains the information about the reconstructed downlink channel matrix in any manner, provided that the information about the reconstructed downlink channel matrix meets a fifth relationship. Steps (for example, steps S5091 and S5092) performed by the network device in step S509 are merely examples, and are not intended to limit behavior of the network device. The fifth relationship includes:

$$H' = \Sigma_{k=1}^{M} \Sigma_{l=1}^{N} f_{dec}(q(ind_i)) \times U_{1,k} \times U^*_{2,l} \quad \text{(Formula 14)}$$

In Formula 14, $\{ind_i\}_{i=1 \ldots S}$ represents the S indexes of the S vectors included in the first vector quantization dictionary, that is, the S indexes of the S vectors corresponding to the PMI. A function q(x) indicates to map, based on the first vector quantization dictionary, the indexes of the S vectors to the first matrix whose dimension is D×S. A function $f_{dec}(x)$ indicates to reconstruct the first matrix by using the decoder network to obtain the second matrix whose the dimension is M×N×2. The first matrix and the second matrix are both real matrices. $U^*_{2,l}$ represents a conjugate transpose vector of $U_{2,l}$, and $\{U^*_{2,l}\}$ represents a conjugate transpose matrix of $\{U_{2,l}\}$.

$\{U_{1,k}\}_{k=1 \ldots M}$ represents a space domain basis vector set. The space domain basis vector set is, for example, the space domain basis used in response to the UE performing space-frequency joint projection described above. A length of a vector included in the space domain basis vector set is $N_{tx}$ (a physical meaning of a corresponding downlink channel matrix H is an eigen subspace matrix obtained through SVD) or $N_{tx} \times N_{rx}$ (a physical meaning of a corresponding downlink channel matrix H is an original channel). $\{U_{2,l}\}_{l=1 \ldots N}$ represents a frequency domain basis vector set. The frequency domain basis vector set is, for example, a frequency domain basis that is used in response to the UE performing space-frequency joint projection and that is described above. For example, the network device uses a DFT formula to obtain the space domain basis vector set and the frequency domain basis vector set. A length of a vector included in the frequency domain basis vector set is $N_{sb}$. In response to a frequency domain granularity being one RB, $N_{sb} = N_{rb}$.

Values of M and N depend on a preprocessing manner of step S605. For example, a specific manner used by the UE to perform preprocessing is specified in a protocol, or the network device sends signaling to the UE to indicate the preprocessing manner. Optionally, $\{U_{1,k}\}_{k=1 \ldots M}$ and $\{U_{2,l}\}_{l=1 \ldots N}$ are orthogonal DFT basis vector sets, and $C_{complex}$ is not further compressed. In this case, the values of M and N each are equal to a length of a vector included in a corresponding basis vector set. To be specific, $M = N_{tx}$ (a physical meaning corresponding to a downlink channel matrix H is an eigen subspace matrix obtained through SVD) or $M = N_{tx} \times N_{rx}$ (a physical meaning corresponding to a downlink channel matrix H is an original channel), and $N = N_{sb}$.

Optionally, $\{U_{1,k}\}_{k=1 \ldots M}$ and $\{U_{2,l}\}_{l=1 \ldots N}$ are orthogonal DFT basis vector sets, and $C_{complex}$ is compressed with reference to the manner 3 of step 4 (in the second manner). In this case, the values of M and N each are less than a length of a vector included in a corresponding basis vector set. To be specific, $M < N_{tx}$ (a physical meaning corresponding to a downlink channel matrix H is an eigen subspace matrix obtained through SVD) or $M < N_{tx} \times N_{rx}$ (a physical meaning corresponding to a downlink channel matrix H is an original channel), and $N < N_{sb}$.

Optionally, $\{U_{1,k}\}_{k=1 \ldots M}$ and $\{U_{2,l}\}_{l=1 \ldots N}$ are oversampled DFT basis vector sets, and $C_{complex}$ is not further compressed. In this case, the values of M and N each are equal to a product of a length of a vector included in a corresponding basis vector set and an oversampling coefficient. To be specific, $M = N_{tx} \times x$ (a physical meaning corresponding to a downlink channel matrix H is an eigen subspace matrix obtained through SVD) or $M = N_{tx} \times N_{rx} \times x$ (a physical meaning corresponding to a downlink channel matrix H is an original channel), and $N = N_{sb} \times y$. Herein, x and y are respectively space-frequency oversampling coefficients.

Optionally, $\{U_{1,k}\}_{k=1 \ldots M}$ and $\{U_{2,l}\}_{l=1 \ldots N}$ are oversampled DFT basis vector sets, and $C_{complex}$ is compressed with reference to the manner 3 of step 4 (in the second manner). In this case, the values of M and N each are less than a product of a length of a vector included in a corresponding basis vector set and an oversampling coefficient. To be specific, $M \le N_{tx} \times x$ (a physical meaning corresponding to a downlink channel matrix H is an eigen subspace matrix obtained through SVD) or $M < N_{tx} \times N_{rx} \times x$ (a physical meaning corresponding to a downlink channel matrix H is an original channel), and $N < N_{sb} \times y$. Particularly, to reach a purpose of information compression, in the case, generally, $M < N_{tx}$ or $M < N_{tx} \times N_{rx}$, and $N < N_{sb}$.

The reconstructed channels obtained by using Formula 7 and Formula 14 are equivalent. Formula 7 indicates inverse transform of space-frequency projection. Although S, F and the dimension of $\tilde{C}_{complex}$ varies with preprocessing manners, in Formula 7, F and the dimension of $\tilde{C}_{complex}$ meet a dimension of matrix multiplication. Formula 14 indicates an end-to-end reconstruction formula. To be specific, an index $ind_i$ fed back by using the PMI is obtained by using the CSI, a weighting coefficient plane is restored, and multiplication and summation are performed with corresponding space-frequency basis vectors one by one, to obtain the reconstructed H'.

Formula 14 represents a general process of restoring channel information included in the PMI to some D-dimensional vectors by using a function q(x), converting these D-dimensional vectors into M×N×2 real matrices by using a function $f_{dec}(x)$, calculating complex matrix forms of the real matrices, obtaining M×N weighting complex coefficients, separately multiplying the weighting complex coefficients by M space domain basis vectors and N frequency domain basis vectors, and finally performing summation to obtain a reconstructed downlink channel feature matrix H'. The foregoing value of M×N is used as an example instead of limitation. In other words, a specific value of M×N is different from that in the foregoing examples due to different preprocessing methods. Provided that the end-to-end reconstruction manner meets the fifth relationship described in Formula 14, this shall fall within the protection scope of at least one embodiment.

Particularly, Formula 14 further imposes the following limitation on the preprocessing procedure of step S505: In response to $C_{complex}$ being compressed, a selected coefficient is necessarily a two-dimensional matrix that separately corresponds to a space domain dimension and a frequency domain dimension (similar to the manner 3).

2. The output dimension of the decoder network is M.

The dimension of the second matrix is M×2. In response to M in the dimension of the second matrix being the same as a dimension of a to-be-reconstructed downlink channel feature matrix H', the second matrix is directly converted into a complex matrix to obtain a corresponding complex matrix $\tilde{C}_{complex}$. The dimension of the to-be-reconstructed downlink channel feature matrix H' is $M_1 \times M_2$. In response to $M=M_1 \times M_2$, Also M and the dimension are the same. In other words, although the output dimension of the decoder network is not strictly consistent with H', a total quantity of valid channel features is M, and only simple matrix transform is used to implement the equivalence.

Alternatively, in response to M in the dimension of the second matrix being different from a dimension of a to-be-reconstructed downlink channel feature matrix H' (for example, further compression is performed in step S505 with reference to the manner 1 or the manner 2 of step 4 in the second manner), the network device obtains information about the reconstructed downlink channel matrix based on the second matrix. In an implementation, the network device converts the second matrix into a complex matrix whose dimension is M, and then fills M complex coefficients in corresponding positions based on positions of the M complex coefficients at an original $N_{tx} \times N_{sb}$ two-dimensional plane. Other positions at the original $N_{tx} \times N_{sb}$ two-dimensional plane are set to 0. In this way, a complex matrix $\tilde{C}_{complex}$ is obtained.

The network device performs inverse transform on the complex matrix $\tilde{C}_{complex}$ to obtain the eigen subspace matrix H', that is, the reconstructed downlink channel matrix. For differentiation from the foregoing eigen subspace matrix, the foregoing eigen subspace matrix (for example, the eigen subspace matrix H in step S505) is referred to as a first eigen subspace matrix, and the eigen subspace matrix H' herein is referred to as a second eigen subspace matrix. For example, for a process in which the network device performs inverse transform on the complex matrix $\tilde{C}_{complex}$, refer to Formula 7.

In response to the output dimension of the decoder network being M×2, step S509 is also expressed by using a uniform reconstruction formula. The network device obtains the information about the reconstructed downlink channel matrix in any manner, provided that the information about the reconstructed downlink channel matrix meets a sixth relationship. Steps (for example, steps S5091 and S5092) performed by the network device in step S509 are merely examples, and are not intended to limit behavior of the network device. The sixth relationship includes:

$$H = \sum_{j=1}^{M} f_{dec}(q(ind_i)) \times U_{1,(j,k)} \times U^*_{2,(j,l)} \quad \text{(Formula 15)}$$

In Formula 15, $\{ind_i\}_{i=1 \ldots S}$ represents the S indexes of the S vectors included in the first vector quantization dictionary, that is, the S indexes of the S vectors corresponding to the PMI. A function q(x) indicates to map, based on the first vector quantization dictionary, the indexes of the S vectors to the first matrix whose dimension is D×S. A function $f_{dec}(x)$ indicates to reconstruct the first matrix by using the decoder network to obtain the second matrix whose dimension is M×2. The first matrix and the second matrix are both real matrices. $U^*_{2,(j,l)}$ represents a conjugate transpose vector of $U_{2,(j,l)}$, and $\{U^*_{2,(j,l)}\}$ represents a conjugate transpose matrix of $\{U_{2,(j,l)}\}$.

$\{U_{1,(j,k)}\}_{j=1 \ldots M}$ represents a space domain basis vector set. The space domain basis vector set is, for example, the space domain basis used in response to the UE performing space-frequency joint projection described above. A length of a vector included in the space domain basis vector set is $N_{tx}$ (a physical meaning of a corresponding downlink channel matrix H is an eigen subspace matrix obtained through SVD) or $N_{tx} \times N_{rx}$ (a physical meaning of a corresponding downlink channel matrix H is an original channel). $\{U^*_{2,(j,l)}\}_{j=1 \ldots M}$ represents a frequency domain basis vector set. The frequency domain basis vector set is, for example, a frequency domain basis that is used in response to the UE performing space-frequency joint projection and that is described above. For example, the network device uses a DFT formula to obtain the space domain basis vector set and the frequency domain basis vector set. A length of a vector included in the frequency domain basis vector set is $N_{sb}$. In response to a frequency domain granularity being one RB, $N_{sb} = N_{rb}$. For explanations of (j,k) and (j,l), refer to the embodiment shown in FIG. 5.

A value of M depends on the preprocessing manner of step S605. Optionally, $\{U_{1,(j,k)}\}_{j=1 \ldots M}$ and $\{U^*_{2,(j,l)}\}_{j=1 \ldots M}$ are orthogonal DFT basis sets, and $C_{complex}$ is not further compressed. In this case, the value of M is a dimension product of the $C_{complex}$ matrix. Herein, $M=N_{tx} \times N_{sb}$ (a physical meaning corresponding to a downlink channel matrix H is an eigen subspace matrix obtained through SVD) or $M=N_{tx} \times N_{rx} \times N_{sb}$ (a physical meaning corresponding to a downlink channel matrix H is an original channel).

Optionally, $\{U_{1,(j,k)}\}_{j=1\ldots M}$ and $\{U^*_{2,(j,l)}\}_{j=1\ldots M}$ are orthogonal DFT basis sets, and $C_{complex}$ is compressed with reference to the manner 1 or 2 of step 4 (in the second manner). In this case, the value of M is less than a dimension product of the $C_{complex}$ matrix. Herein, $M \leq N_{tx} \times N_{sb}$ (a physical meaning corresponding to a downlink channel matrix H is an eigen subspace matrix obtained through SVD) or $M \leq N_{tx} \times N_{rx} \times N_{sb}$ (a physical meaning corresponding to a downlink channel matrix H is an original channel).

Optionally, $\{U_{1,(j,k)}\}_{j=1\ldots M}$ and $\{U^*_{2,(j,l)}\}_{j=1\ldots M}$ are oversampled DFT basis sets, and $C_{complex}$ is not further compressed. In this case, the value of M is a dimension product of the oversampled $C_{complex}$ matrix. Herein, $M=N_{tx} \times x \times N_{sb} \times y$ (a physical meaning corresponding to a downlink channel matrix H is an eigen subspace matrix obtained through SVD) or $M=N_{tx} \times N_{rx} \times x \times N_{sb} \times y$ (a physical meaning corresponding to a downlink channel matrix H is an original channel).

Optionally, $\{U_{1,(j,k)}\}_{j=1\ldots M}$ and $\{U^*_{2,(j,l)}\}_{j=1\ldots M}$ are oversampled DFT basis sets, and $C_{complex}$ is compressed with reference to the manner 1 or 2 of step 4 (in the second manner). In this case, the value of M is less than a dimension product of the oversampled $C_{complex}$ matrix. Herein, $M<N_{tx} \times x \times N_{sb} \times y$ (a physical meaning corresponding to a downlink channel matrix H is an eigen subspace matrix obtained through SVD) or $M<N_{tx} \times N_{rx} \times x \times N t \times y$ (a physical meaning corresponding to a downlink channel matrix H is an original channel). Particularly, to reach a purpose of information compression, in the case, generally, $M<N_{tx} \times N_{sb}$ or $M<N_{tx} \times N_{rx} \times N_{sb}$.

The reconstructed channels obtained by using Formula 7 and Formula 15 are equivalent. Formula 7 indicates inverse transform of space-frequency projection. Although S, F and the dimension of $\tilde{C}_{complex}$ varies with preprocessing manners, in Formula 7, F and the dimension of $\tilde{C}_{complex}$ meet a dimension of matrix multiplication. Formula 15 indicates an end-to-end reconstruction formula. To be specific, an index $ind_i$ fed back by using the PMI is obtained by using the CSI, a weighting coefficient vector is restored, and multiplication and summation are performed with corresponding space-frequency basis vectors one by one, to obtain the reconstructed H'.

Formula 15 represents a general process of restoring channel information included in the PMI to some D-dimensional vectors by using a function $q(x)$, converting these D-dimensional vectors into M×2 real matrices by using a function $f_{dec}(x)$, calculating complex matrix forms of the real matrices, obtaining M weighting complex coefficients, separately multiplying the weighting complex coefficients by M groups of space-frequency basis vectors, and finally performing summation to obtain a reconstructed downlink channel feature matrix H'. The foregoing value of M is used as an example instead of limitation. In other words, a specific value of M is different from that in the foregoing examples due to different preprocessing methods. Provided that the end-to-end reconstruction manner meets the sixth relationship described in Formula 15, this shall fall within the protection scope of at least one embodiment.

Particularly, generally, H is a two-dimensional matrix plane (space domain x frequency domain). Formula 15 further imposes the following limitation on the preprocessing procedure of step S505: A selected coefficient is to be arranged according to a one-dimensional vector. For example, H is converted into a one-dimensional vector (without compression); or a candidate coefficient matrix is converted into a one-dimensional vector, and then M coefficients with largest energy are selected (similar to the compression manner 1 or 2).

3. The output dimension of the decoder network is M×N×T×2.

Herein, the dimension of the second matrix is M×N×T×2. This case is generally only for the fifth manner, where $T=N_{rx}$.

In response to M×N×T in the dimension of the second matrix being the same as a dimension of a to-be-reconstructed downlink channel feature matrix H', the second matrix is directly converted into a complex matrix to obtain a corresponding complex matrix $\tilde{C}_{complex}$.

Alternatively, in response to M×N×T in the dimension of the second matrix being different from a dimension of a to-be-reconstructed downlink channel feature matrix H' (for example, further compression is performed in step S505 with reference to the manner 3 of step 4 in the second manner), optionally, the network device converts the second matrix into a complex matrix, and fills, based on M×N pieces of position information obtained from the CSI, elements of the complex matrix in an all-zero matrix with a same dimension as the downlink channel feature matrix H' one by one to obtain $\tilde{C}_{complex}$.

Alternatively, in response to M×N×T in the dimension of the second matrix being different from a dimension of a to-be-reconstructed downlink channel feature matrix H' (for example, further compression is performed in step S505 with reference to the manner 1 or 2 of step 4 in the second manner), optionally, the network device converts the second matrix into a complex matrix, and fills, based on M pieces of position information obtained from the CSI, elements of the complex sequence in an all-zero matrix with a same dimension as the downlink channel feature matrix H' one by one to obtain $\tilde{C}_{complex}$.

The network device performs inverse transform on the complex matrix $\tilde{C}_{complex}$ to obtain the eigen subspace matrix H', that is, the reconstructed downlink channel matrix. For differentiation from the foregoing eigen subspace matrix, the foregoing eigen subspace matrix (for example, the eigen subspace matrix H in step S505) is referred to as a first eigen subspace matrix, and the eigen subspace matrix H' herein is referred to as a second eigen subspace matrix. For example, for a process in which the network device performs inverse transform on the complex matrix $\tilde{C}_{complex}$, refer to Formula 10.

In response to the output dimension of the decoder network being M×N×T, step S509 is also expressed by using a uniform reconstruction formula. The network device obtains the information about the reconstructed downlink channel matrix in any manner, provided that the information about the reconstructed downlink channel matrix meets a seventh relationship. Steps (for example, steps S5091 and S5092) performed by the network device in step S509 are merely examples, and are not intended to limit behavior of the network device. The seventh relationship includes:

$$H'=\Sigma_{k=1}^M \Sigma_{l=1}^N (f_{dec}(q(ind_i)))|_{t=1\ldots T} \times U_{1,k} \times U^*_{2,l} \qquad \text{(Formula 16)}$$

In Formula 16, $q(ind_i)$ represents the S indexes of the S vectors included in the first vector quantization dictionary, that is, the S indexes of the S vectors corresponding to the PMI. A function $q(x)$ indicates to map, based on the first vector quantization dictionary, the indexes of the S vectors to the first matrix whose dimension is D×S. A function $f_{dec}(x)$ indicates to reconstruct the first matrix by using the decoder network to obtain the second matrix whose dimension is M×N×T×2. Herein, T=$N_{rx}$. The first matrix and the second matrix are both real matrices. $(x)|_{t=1 \ldots T}$ herein indicates to process (or reconstruct), based on the second matrix according to Formula 16, T matrices whose dimensions are M×N, to obtain a reconstructed downlink channel matrix. $U^*_{2,l}$ represents a conjugate transpose vector of $U_{2,l}$, and $\{U^*_{2,l}\}$ represents a conjugate transpose matrix of $\{U_{2,l}\}$.

$\{U_{1,k}\}_{k=1 \ldots M}$ represents a space domain basis vector set. The space domain basis vector set is, for example, the space domain basis used in response to the UE performing space-frequency joint projection described above. A length of a vector included in the space domain basis vector set is $N_{tx}$. $\{U_{2,l}\}_{l=1 \ldots N}$ represents a frequency domain basis vector set. The frequency domain basis vector set is, for example, a frequency domain basis that is used in response to the UE performing space-frequency joint projection and that is described above. For example, the network device uses a DFT formula to obtain the space domain basis vector set and the frequency domain basis vector set. A length of a vector included in the frequency domain basis vector set is $N_{sb}$. In response to a frequency domain granularity being one RB, $N_{sb}=N_{rb}$.

Values of M and N depend on the preprocessing manner of step S605. Optionally, $\{U_{1,k}\}_{k=1 \ldots M}$ and $\{U_{2,l}\}_{l=1 \ldots N}$ are orthogonal DFT basis vector sets, and $C_{complex}$ is not further compressed. In this case, values of M and N each are equal to a length of a vector included in a corresponding basis vector set. Herein, M=$N_{tx}$, and N=$N_{sb}$.

Optionally, $\{U_{1,k}\}_{k=1 \ldots M}$ and $\{U_{2,l}\}_{l=1 \ldots N}$ are orthogonal DFT basis vector sets, and $C_{complex}$ is compressed with reference to the manner 3 of step 4 (in the second manner). In this case, the values of M and N each are less than a length of a vector included in a corresponding basis vector set. Herein, M≤$N_{tx}$, and N≤$N_{sb}$.

Optionally, $\{U_{1,k}\}_{k=1 \ldots M}$ and $\{U_{2,(j,l)}\}_{l=1 \ldots N}$ are oversampled DFT basis vector sets, and $C_{complex}$ is not further compressed. In this case, the values of M and N each are equal to a product of a length of a vector included in a corresponding basis vector set and an oversampling coefficient. Herein, M=$N_{tx}$×x, and N=$N_{sb}$×y, where x and y are respectively space-frequency oversampling coefficients.

Optionally, $\{U_{1,k}\}_{k=1 \ldots M}$ and $\{U_{2,l}\}_{l=1 \ldots N}$ are oversampled DFT basis vector sets, and $C_{complex}$ is compressed with reference to the manner 3 of step 4 (in the second manner). In this case, the values of M and N each are less than a product of a length of a vector included in a corresponding basis vector set and an oversampling coefficient. Herein, M<$N_{tx}$×x, and N<$N_{sb}$×y. Particularly, to reach a purpose of information compression, in the case, generally, M<$N_{tx}$ and N<$N_{sb}$.

Reconstructed channels obtained by using Formula 10 and Formula 16 are equivalent. Formula 10 indicates inverse transform of space-frequency projection. Although S, F and the dimension of $\tilde{C}_{complex}$ varies with preprocessing manners, in Formula 10, F and the dimension of $\tilde{C}_{complex}$ meet a dimension of matrix multiplication. Formula 16 indicates an end-to-end reconstruction formula. To be specific, an index $ind_i$ fed back by using the PMI is obtained by using the CSI, a weighting coefficient plane is restored, and multiplication and summation are performed with corresponding space-frequency basis vectors one by one, to obtain the reconstructed H'.

Formula 16 represents a general process of restoring channel information included in the PMI to some D-dimensional vectors by using a function q(x), converting these D-dimensional vectors into M×N×T×2 real matrices by using a function $f_{dec}(x)$, calculating complex matrix forms of the real matrices, obtaining M×N×T weighting complex coefficients, taking M×N weighting complex coefficients element by element based on a dimension T, separately multiplying the weighting complex coefficients by M space domain basis vectors and N frequency domain basis vectors, and finally performing summation to obtain a reconstructed downlink channel feature matrix H'. The foregoing value of M×N is used as an example instead of limitation. In other words, a specific value of M×N is different from that in the foregoing examples due to different preprocessing methods. Provided that the end-to-end reconstruction manner meets the seventh relationship described in Formula 16, this shall fall within the protection scope of at least one embodiment.

Particularly, Formula 16 further imposes the following limitation on the preprocessing procedure of step S505: In response to $C_{complex}$ being compressed, a selected coefficient is necessarily a two-dimensional matrix that separately corresponds to a space domain dimension and a frequency domain dimension (similar to the manner 3).

4. The output dimension of the decoder network is M×T×2.

Herein, the dimension of the second matrix is M×T×2. This case is generally only for the fifth manner, where T=$N_{rx}$.

For example, in response to M×T×2 in the dimension of the second matrix being different from a dimension of a to-be-reconstructed downlink channel feature matrix H' (for example, further compression is performed in step S505 with reference to the manner 1 or the manner 2 of step 4 in the second manner), optionally, the network device converts the second matrix into a complex matrix whose dimension is T×M. The T×M complex matrix includes T complex vectors whose dimensions are M. For each complex vector whose dimension is M, the network device fills M complex coefficients in corresponding positions based on positions of the M complex coefficients at an original two-dimensional space-frequency plane that are reported by using the CSI. Other positions are set to 0. In this way, a complex matrix $\tilde{C}_{complex}$ is obtained. For a process in which the network device performs inverse transform on a complex matrix $\tilde{C}_{complex}$ to obtain an eigen subspace matrix H', refer to Formula 10.

In response to the output dimension of the decoder network being M×T×2, step S509 is also expressed by using a uniform reconstruction formula. The network device obtains the information about the reconstructed downlink channel matrix in any manner, provided that the information about the reconstructed downlink channel matrix meets an eighth relationship. Steps (for example, steps S5091 and S5092) performed by the network device in step S509 are merely examples, and are not intended to limit behavior of the network device. The eighth relationship includes:

$$H=\Sigma_{k=1}^{M}(f_{dec}(q(ind_i)))|_{t=1 \ldots T} \times U_{1,(j,k)} \times U^*_{2,(j,l)} \quad \text{(Formula 17)}$$

In Formula 17, $q(ind_i)$ represents the S indexes of the S vectors included in the first vector quantization dictionary, that is, the S indexes of the S vectors corresponding to the PMI. A function q(x) indicates to map, based on the first vector quantization dictionary, the indexes of the S vectors to the first matrix whose dimension is D×S. A function $f_{dec}(x)$ indicates to reconstruct the first matrix by using the decoder network to obtain the second matrix whose dimension is M×T×2. Herein, T=$N_{rx}$. The first matrix and the second matrix are both real matrices. A function C(x)

indicates to convert the second matrix into a complex matrix (for example, the complex matrix $\tilde{C}_{complex}$ described in step S509) whose dimension is M×T. $(x)|_{t=1\ldots T}$ herein indicates to process (or reconstruct), based on the second matrix according to Formula 17, T matrices whose dimensions are M, to obtain a reconstructed downlink channel matrix. $U^*_{2,(j,l)}$ represents a conjugate transpose vector of $U_{2,(j,l)}$, and $\{U^*_{2,(j,l)}\}$ represents a conjugate transpose matrix of $\{U_{2,(j,l)}\}$.

$\{U_{1,(j,k)}\}_{j=1\ldots M}$ represents a space domain basis vector set. The space domain basis vector set is, for example, the space domain basis used in response to the UE performing space-frequency joint projection described above. A length of a vector included in the space domain basis vector set is $N_{tx}$. $\{U^*_{2,(j,l)}\}_{j=1\ldots M}$ represents a frequency domain basis vector set. The frequency domain basis vector set is, for example, a frequency domain basis that is used in response to the UE performing space-frequency joint projection and that is described above. For example, the network device uses a DFT formula to obtain the space domain basis vector set and the frequency domain basis vector set. A length of a vector included in the frequency domain basis vector set is $N_{sb}$. In response to a frequency domain granularity being one RB, $N_{sb}=N_{rb}$. (j,k) and (j,l) are a position mapping relationship at a $C_{complex}$ two-dimensional plane. In other words, any value of j uniquely corresponds to one group of (k,l). (k,l) is a two-dimensional coordinate point at $C_{complex}$. Herein, M groups of two-dimensional coordinates (k,l) is fed back by the UE.

A value of M depends on the preprocessing manner of step S605. Optionally, $\{U_{1,(j,k)}\}_{j=1\ldots M}$ and $\{U^*_{2,(j,l)}\}_{j=1\ldots M}$ are orthogonal DFT basis sets, and $C_{complex}$ is not further compressed. In this case, the value of M is a dimension product of the $C_{complex}$ matrix, where $M=N_{tx}\times N_{sb}$.

Optionally, $\{U_{1,(j,k)}\}_{j=1\ldots M}$ and $\{U^*_{2,(j,l)}\}_{j=1\ldots M}$ are orthogonal DFT basis sets, and $C_{complex}$ is compressed with reference to the manner 1 or 2 of step 4 (in the second manner). In this case, the value of M is less than a dimension product of the $C_{complex}$ matrix, where $M<N_{tx}\times N_{sb}$.

Optionally, $\{U_{1,(j,k)}\}_{j=1\ldots M}$ and $\{U^*_{2,(j,l)}\}_{j=1\ldots M}$ are oversampled DFT basis sets, and $C_{complex}$ is not further compressed. In this case, the value of M is a dimension product of the oversampled $C_{complex}$ matrix, where $M=N_{tx}\times x\times N_{sb}\times y$.

Optionally, $\{U_{1,(j,k)}\}_{j=1\ldots M}$ and $\{U^*_{2,(j,l)}\}_{j=1\ldots M}$ are oversampled DFT basis sets, and $C_{complex}$ is compressed with reference to the manner 1 or 2 of step 4 (in the second manner). In this case, the value of M is less than a dimension product of the oversampled $C_{complex}$ matrix, where $M<N_{tx}\times x\times N_{sb}\times y$. Particularly, to reach a purpose of information compression, in the case, generally, $M<N_{tx}\times N_{sb}$.

The reconstructed channels obtained by using Formula 10 and Formula 17 are equivalent. Formula 10 indicates inverse transform of space-frequency projection. Although S, F and the dimension of $\tilde{C}_{complex}$ varies with preprocessing manners, in Formula 10, F and the dimension of $\tilde{C}_{complex}$ meet a dimension of matrix multiplication. Formula 17 indicates an end-to-end reconstruction formula. To be specific, an index $ind_i$ fed back by using the PMI is obtained by using the CSI, a weighting coefficient vector is restored, and multiplication and summation are performed with corresponding space-frequency basis vectors one by one, to obtain the reconstructed H'.

Formula 17 represents a general process of restoring channel information included in the PMI to some D-dimensional vectors by using a function q(x), converting these D-dimensional vectors into M×T×2 real matrices by using a function $f_{dec}(x)$, calculating complex matrix forms of the real matrices, obtaining M×T weighting complex coefficients, taking M weighting complex coefficients element by element based on a dimension T, separately multiplying the weighting complex coefficients by M groups of space-frequency basis vectors, and finally performing summation to obtain a reconstructed downlink channel feature matrix H'. The foregoing value of M is used as an example instead of limitation. In other words, a specific value of M is different from that in the foregoing examples due to different preprocessing methods. Provided that the end-to-end reconstruction manner meets the eighth relationship described in Formula 17, this shall fall within the protection scope of at least one embodiment.

Particularly, generally, H is a two-dimensional matrix plane (space domain × frequency domain). Formula 17 further imposes the following limitation on the preprocessing procedure of step S505: A selected coefficient is to be arranged according to a one-dimensional vector. For example, H is converted into a one-dimensional vector (without compression); or a candidate coefficient matrix is converted into a one-dimensional vector, and then M coefficients with largest energy are selected (similar to the compression manner 1 or 2).

In at least one embodiment, steps S601 to S606 are optional steps. In addition, steps S6091 and S6092 included in step S609 are also optional steps.

In addition, at least one embodiment is applied to a network architecture of UE and a network device, or is applied to a network architecture of UE, a network device, and an AI node. In response to at least one embodiment being applied to the network architecture of UE, a network device, and an AI node, for example, processes of offline training the decoder network, preparing an NN-CSI network by the network device in step S602, inputting the first matrix to the decoder network to obtain the second matrix in step S609, and the like is performed by the AI node.

In at least one embodiment, the CSI is determined based on the first vector quantization dictionary. For example, the PMI is represented by using an index of one or more vectors included in the first vector quantization dictionary. In this case, information obtained through measurement is quantized by using the index included in the first vector quantization dictionary. Because a dimension of a vector is usually relatively large, and is equivalent to dimension expansion on information, thereby improving quantization precision. In addition, the original channel matrix is compressed through cooperation between the encoder network and decoder network, thereby reducing a compression loss. In addition, a VQ-AE network is used in at least one embodiment. In the VQ-AE network, a quantization network and a compression network are jointly designed, so that joint optimization is implemented between compression and quantization, to reduce a performance loss and improve overall accuracy of the fed-back channel state information. In addition, in at least one embodiment, input and output dimensions of a neural network (for example, input and output dimensions of an encoder and/or input and output dimensions of a decoder) is restricted, to adjust CSI feedback complexity, thereby highlighting an advantage of compressing a downlink channel matrix by using the neural network. In addition, in at least one embodiment, conversion between a complex matrix and a real matrix is able to not be performed, so that a CSI feedback procedure is reduced, thereby improving feedback efficiency and simplifying implementation complexity. In addition, by using a complex number network, a physical meaning of a complex number signal is considered in aspects of a convolution manner, a loss function design, and the like. This is more suitable for processing of a communication signal, thereby helping keep original phase information of the communication complex number signal.

Figure 7:
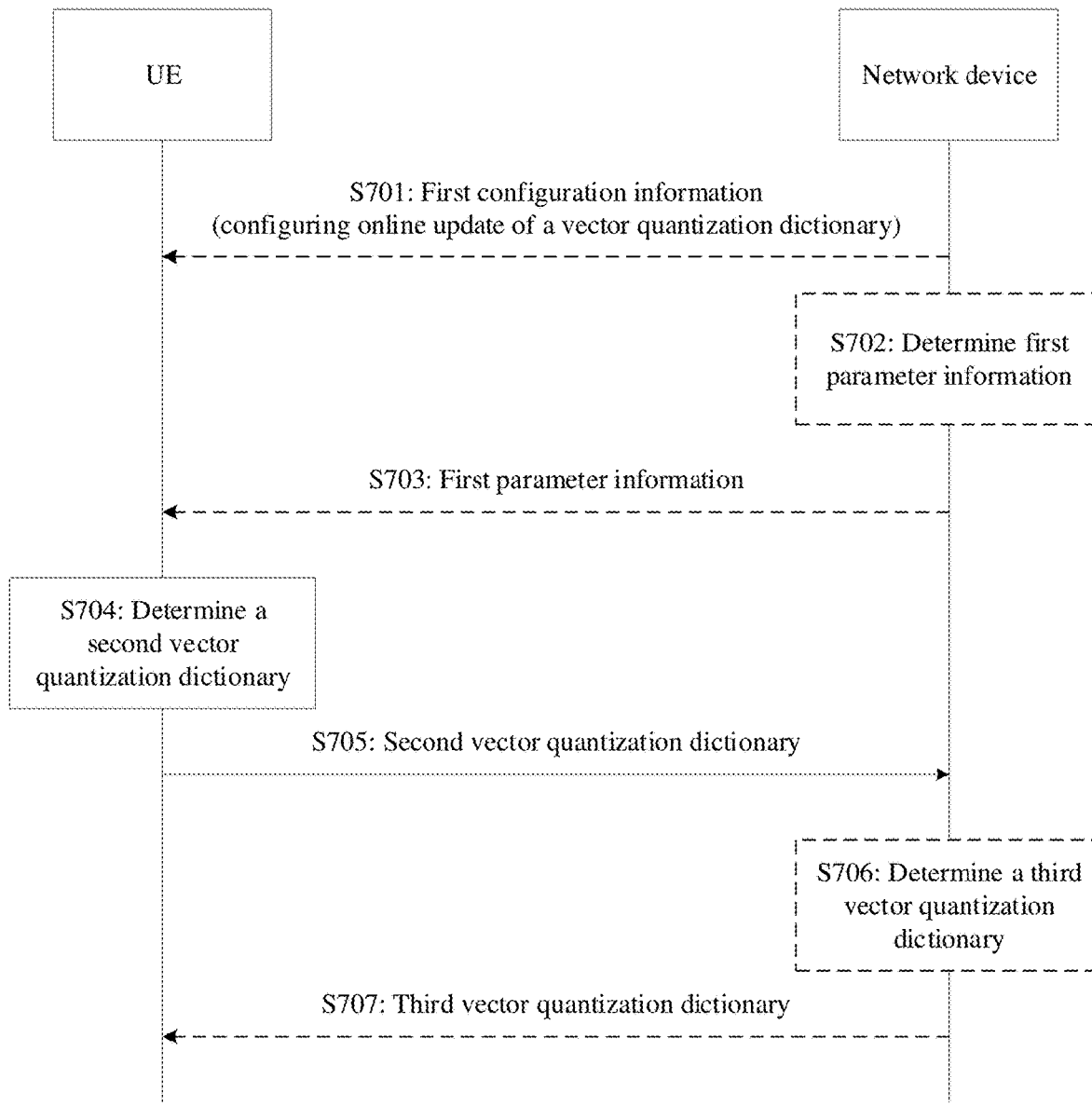

The embodiment shown in FIG. 5 and the embodiment shown in FIG. 6 are both related to a vector quantization dictionary. For a manner of determining the vector quantization dictionary by the UE, the embodiment shown in FIG. 5 or the embodiment shown in FIG. 6 is described, or the vector quantization dictionary is updated online, so that the vector quantization dictionary complies with an actual status of a network. Alternatively, the UE determines the vector quantization dictionary in the manner described in the embodiment shown in FIG. 5 or the embodiment shown in FIG. 6, and the vector quantization dictionary is also updated online (in other words, the vector quantization dictionary is also determined in the manner described in at least one embodiment). FIG. 7 is a flowchart of a third communication method according to at least one embodiment. Online update of a vector quantization dictionary is implemented by using the method.

S701: A network device sends first configuration information to UE, and correspondingly, the UE receives the first configuration information from the network device.

The first configuration information is used to configure online update of a vector quantization dictionary, or the first configuration information is used to configure a report parameter of a vector quantization dictionary. For example, the first configuration information includes one or more of the following: information about a first delay, format information of the vector quantization dictionary, or periodic configuration information of reporting the vector quantization dictionary.

In at least one embodiment, the UE updates the vector quantization dictionary, and the information about the first delay is used to indicate the UE to wait for the first delay before sending the vector quantization dictionary to the network device.

The format information of the vector quantization dictionary includes, for example, one or more of the following: dimension information of the vector quantization dictionary, type information of the vector quantization dictionary, or an index of the vector quantization dictionary. The dimension information of the vector quantization dictionary indicates a dimension of the vector quantization dictionary. For example, the dimension of the vector quantization dictionary is D×E. The index of the vector quantization dictionary indicates an index of a vector quantization dictionary configured for the UE from a plurality of vector quantization dictionaries. Each of the plurality of vector quantization dictionaries corresponds to one unique index.

The periodic configuration information of reporting the vector quantization dictionary is used to configure periodic (periodic) reporting of the vector quantization dictionary. For example, the periodic configuration information includes a period $R_1$. For example, the network device sends first parameter information according to the period $R_1$, to trigger the UE to send the vector quantization dictionary. The UE receives the first parameter information, and sends the vector quantization dictionary to the network device. This is considered as a process in which the UE sends the vector quantization dictionary to the network device according to the period $R_1$. Alternatively, the periodic configuration information includes a period $R_1$. For example, the network device sends first scheduling information according to the period $R_1$. The first scheduling information indicates an uplink resource. In this way, the UE is triggered to send the vector quantization dictionary. The UE receives the first scheduling information, and sends the vector quantization dictionary to the network device. This is considered as a process in which the UE sends the vector quantization dictionary to the network device according to the period $R_1$.

Alternatively, the periodic configuration information of reporting the vector quantization dictionary is used to configure semi-persistent (semi-persistent) reporting of the vector quantization dictionary. For example, the periodic configuration information is used to configure a resource used to send the vector quantization dictionary and a period $R_1$. In response to the semi-persistent reporting of the vector quantization dictionary being configured, the network device activates (activation) a mechanism of the semi-persistent reporting of the vector quantization dictionary by using signaling. The UE receives the signaling. Before receiving a deactivation command, the UE sends the vector quantization dictionary to the network device according to the period $R_1$, and the network device is able to not schedule the UE each time. Signaling used for activation and/or signaling used for deactivation is, for example, a MAC CE, or other signaling.

Alternatively, the periodic configuration information of reporting the vector quantization dictionary is used to configure aperiodic (aperiodic) reporting of the vector quantization dictionary. In response to the aperiodic reporting of the vector quantization dictionary being configured, a manner in which the UE sends the vector quantization dictionary to the network device is waiting for triggering performed by the network device. For example, the network device sends first indication information (for example, scheduling information, or trigger information specifically used to trigger the UE) to the UE, to trigger the UE to send the vector quantization dictionary. After receiving the first indication information, the UE sends the vector quantization dictionary to the network device. In other words, in response to the network device performing triggering, the UE sends the vector quantization dictionary; or in response to the network device not performing triggering, the UE does not send the vector quantization dictionary. In this manner, the network device triggers the UE to send the vector quantization dictionary in response to being used, thereby reducing a process of receiving redundant information.

In at least one embodiment, the periodic configuration information of reporting the vector quantization dictionary is used to configure one or more of: the periodic reporting of the vector quantization dictionary, the semi-persistent reporting of the vector quantization dictionary, or the aperiodic reporting of the vector quantization dictionary. In other words, the UE sends the vector quantization dictionary to the network device in one of the manners, or sends the vector quantization dictionary to the network device in any combination of the manners. For example, in response to the network device sending the first configuration information at a specific time, and the periodic configuration information that is of reporting the vector quantization dictionary and that is included in the first configuration information is used to configure the periodic reporting of the vector quantization dictionary. In this case, the UE periodically sends the vector quantization dictionary to the network device. Then, the network device newly sends first configuration information, and the periodic configuration information that is of reporting the vector quantization dictionary and that is included in the first configuration information is used to newly configure the aperiodic reporting of the vector quantization dictionary. In this case, the UE considers the newly sent first configuration information as an implicit indication, and use the implicit indication as indication information for terminating the periodic reporting; and then report the vector quantization dictionary according to an aperiodic reporting mechanism after receiving corresponding first indication information. Alternatively, in response to the network device newly sending first configuration information, and periodic configuration in the configuration information being changed to another manner, for example, semi-persistent, the UE waits for an activation instruction according to the new configuration before performing periodic reporting.

At least one embodiment is applied in combination with the embodiment shown in FIG. 5 or the embodiment shown in FIG. 6. In this case, the first configuration information and the third configuration information is same configuration information, or is different configuration information. In response to the first configuration information and the third configuration information being different configuration information, and the network device sending the first configuration information and the third configuration information to the UE, the first configuration information is sent after the third configuration information, or the first configuration information and the third configuration information is simultaneously sent.

Step S701 is an optional step. In other words, the network device does not send the first configuration information to the UE.

S702: The network device determines the first parameter information.

The first parameter information is, for example, parameter information of a decoder network maintained by the network device. The decoder network includes, for example, a decoder network currently used by the network device and the UE, or includes all decoder networks maintained by the network device.

For example, the network device reconstructs a downlink channel matrix based on CSI sent by the UE. For example, the UE performs measurement one or more times, and a downlink channel matrix obtained through measurement includes $\{H_1, H_2, \ldots, H_T\}$. Each time after the UE obtains the downlink channel matrix through measurement, the UE sends the CSI to the network device. For example, the downlink channel matrix reconstructed by the network device based on the CSI from the UE includes $\{\hat{H}_1, \hat{H}_2 \ldots \hat{H}_T\}$. In this case, the network device updates a parameter of the decoder network based on some or all reconstructed downlink channel matrices, or the network device updates a parameter of the decoder network based on some or all reconstructed downlink channel matrices and historical data (for example, a historical reconstructed downlink channel matrix). Optionally, the network device further updates a parameter and/or a vector quantization dictionary of the encoder network.

For a process in which the UE determines the CSI, a process in which the network device reconstructs the downlink channel matrix, and the like, the solution provided in the embodiment shown in FIG. 5 or the embodiment shown in FIG. 6 is used, or another solution is used.

S703: The network device sends first parameter information to the UE, and correspondingly, the UE receives the first parameter information from the network device.

For example, the first parameter information includes one or more items in Table 1.

TABLE 1

| Parameter list | Parameter description |
|---|---|
| $L_{Dec1}$, $L_{Dec2}$ | Quantity of layers of a decoder network: an upsampling layer $L_{Dec1}$, and a convolutional layer $L_{Dec2}$ |
| $W_{L_1}^{(3)}, \ldots,$ $w_{L_{Dec1}}^{(3)}$ | Weight set of the upsampling layer of the decoder network |
| $W_{L_1}^{(4)}, \ldots,$ $w_{L_{Dec2}}^{(4)}$ | Weight set of the convolutional layer of the decoder network |
| $LR_{decay}$ | Learning rate exponential decay parameter |
| G | Group normalization (group normalization, GN) grouping parameter, which determines a specific quantity of channels (channel) in a group in a feature map (feature map) |

In addition, the first parameter information further includes one or more other parameters of the decoder network.

Both steps S702 and S703 are optional steps. In other words, the network device does not determine the first parameter information, and correspondingly does not send the first parameter information. Alternatively, even in response to the network device determining the first parameter information, the network device does not necessarily send the first parameter information.

S704: The UE determines a second vector quantization dictionary. The second vector quantization dictionary is, for example, a first vector quantization dictionary, or the second vector quantization dictionary is, for example, a vector quantization dictionary obtained by updating the first vector quantization dictionary.

For example, the UE updates the first vector quantization dictionary to obtain the second vector quantization dictionary. The UE updates the first vector quantization dictionary based on one or more of the following items: the first parameter information, the downlink channel matrix obtained through measurement $\{H_1, H_2, \ldots, H_T\}$, and historical data (for example, a historical downlink channel matrix obtained through measurement).

Alternatively, the UE does not update the vector quantization dictionary used by the UE, but determine the first vector quantization dictionary currently used or to be used by the UE.

Figure 8:
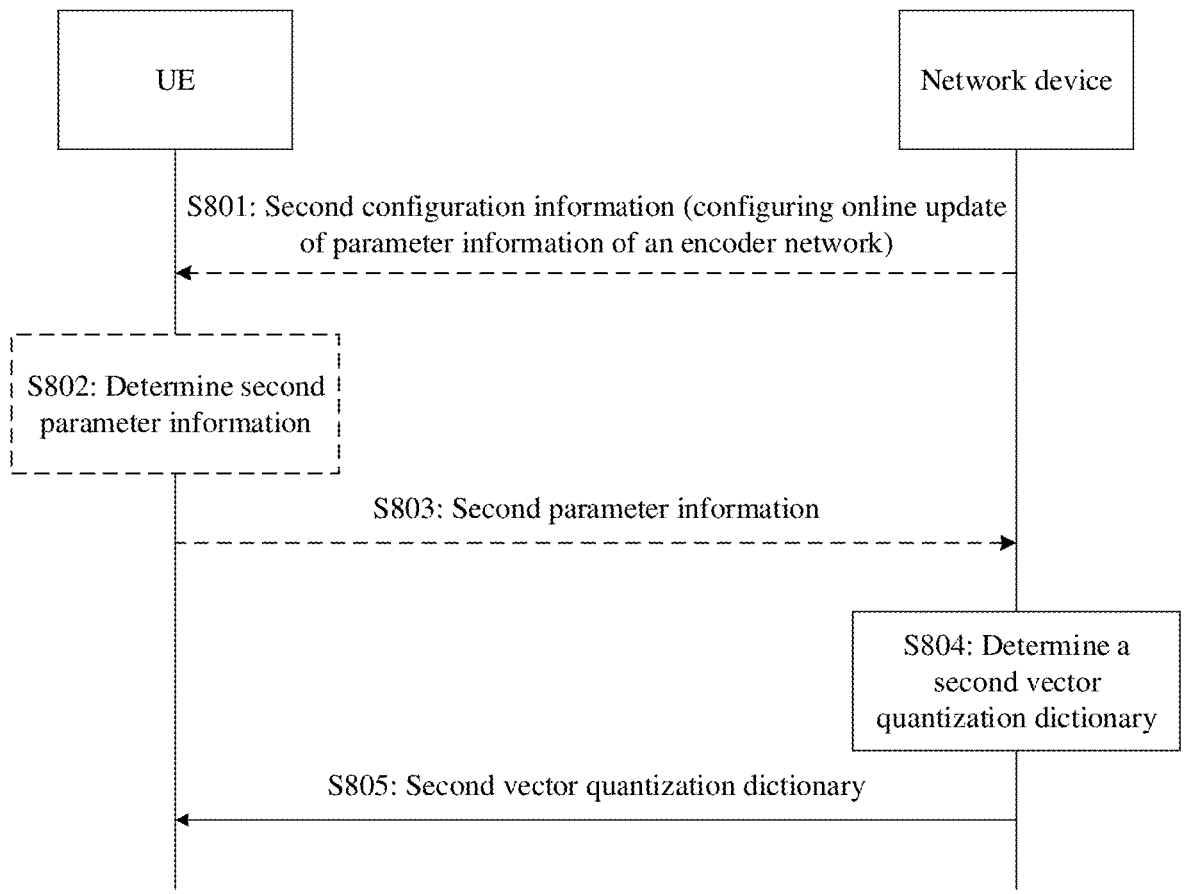

S705: The UE sends the second vector quantization dictionary to the network device, and correspondingly, the network device receives the second vector quantization dictionary from the UE. The UE sends a parameter of the second vector quantization dictionary to the network device, and the network device receives the parameter of the second vector quantization dictionary from the UE. In response to the second vector quantization dictionary being an updated first vector quantization dictionary, and the embodiment shown in FIG. 8 being combined with the embodiment shown in FIG. 5, step S705 is performed after execution of the embodiment shown in FIG. 5 is completed. In response to the embodiment shown in FIG. 8 being combined with the embodiment shown in FIG. 5, step S705 is performed after execution of the embodiment shown in FIG. 6 is completed. Alternatively, in response to the second vector quantization dictionary being the first vector quantization dictionary, and the embodiment shown in FIG. 8 is combined with the embodiment shown in FIG. 5, step S705 is performed before step S509 in the embodiment shown in FIG. 5. In response to the embodiment shown in FIG. 8 being combined with the embodiment shown in FIG. 5, step S705 is performed before step S609 in the embodiment shown in FIG. 6.

The UE sends the second vector quantization dictionary to the network device in a plurality of implementations. The following uses examples for description.

In a first optional implementation, the UE periodically sends the second vector quantization dictionary to the network device. The period is, for example, configured by using the first configuration information, and is, for example, a period $R_1$. In this case, after receiving the first configuration information, the UE sends the second vector quantization dictionary to the network device according to the period $R_1$. For example, in response to the first configuration information including the periodic configuration information of reporting the vector quantization dictionary, and the periodic configuration information being used to configure the periodic reporting of the vector quantization dictionary, this solution is applied. Alternatively, the period for sending the second vector quantization dictionary by the UE is, for example, specified in a protocol. For example, the network device is able to not send the first configuration information. In this case, the UE sends the second vector quantization dictionary to the network device according to the period. The UE periodically sends the second vector quantization dictionary to the network device in at least one embodiment indicates that the UE sends the second vector quantization dictionary to the network device in each period; or the UE does not necessarily send the second vector quantization dictionary to the network device in each period, but sends the second vector quantization dictionary to the network device in one or more periods, where the one or more periods is continuous or discontinuous in time domain.

In a second optional implementation, in response to the UE receiving the first configuration information from the network device, or the UE receiving the first configuration information and the first parameter information from the network device, or the UE receiving the first configuration information, the first parameter information, and the first indication information from the network device, the UE sends the second vector quantization dictionary to the network device after receiving the first configuration information. For example, in response to the first configuration information including the periodic configuration information of reporting the vector quantization dictionary, and the periodic configuration information being used to configure the aperiodic reporting of the vector quantization dictionary, this solution is applied.

In a third optional implementation, in response to the UE receiving the first configuration information from the network device, or the UE receiving the first configuration information and the first parameter information from the network device, or the UE receiving the first configuration information, the first parameter information, and the first indication information from the network device, and the first configuration information includes the information about the first delay, the UE sends the second vector quantization dictionary to the network device in an arrival time unit of the first delay after the first configuration information is received. For example, in response to a time unit in which the UE receives the first configuration information is $T_0$, and the first delay being represented by using $T_{delay1}$, the UE sends the second vector quantization dictionary to the network device in a time unit of $T_0+T_{delay1}$. In this case, the network device also receives the second vector quantization dictionary from the UE in an arrival time unit of the first delay after the first configuration information is sent. For example, the network device reserves an uplink resource for the UE in the time unit of $T_0+T_{delay1}$, the UE sends the second vector quantization dictionary on the uplink resource, and the network device also detects and receive the second vector quantization dictionary on the uplink resource. However, in response to the first configuration information not including the information about the first delay, after receiving the first configuration information, the UE sends the second vector quantization dictionary to the network device without waiting. For example, in response to the first configuration information including the periodic configuration information of reporting the vector quantization dictionary, and the periodic configuration information being used to configure the aperiodic reporting of the vector quantization dictionary, this solution is applied.

In a fourth optional implementation, in response to the UE receiving the first configuration information and the first parameter information from the network device, or the UE receiving the first configuration information, the first parameter information, and the first indication information from the network device, the UE sends the second vector quantization dictionary to the network device after the first parameter information is received. For example, in response to the first configuration information including the periodic configuration information of reporting the vector quantization dictionary, and the periodic configuration information being used to configure the aperiodic reporting of the vector quantization dictionary, this solution is applied.

In a fifth optional implementation, in response to the UE receiving the first configuration information and the first parameter information from the network device, or the UE receiving the first configuration information, the first parameter information, and the first indication information from the network device, and the first configuration information includes the information about the first delay, the UE sends the second vector quantization dictionary to the network device in an arrival time unit of the first delay after the first parameter information is received. For example, in response to a time unit in which the UE receives the first parameter information being $T_1$, and the first delay being represented by using $T_{delay1}$, the UE sends the second vector quantization dictionary to the network device in a time unit of $T_1+T_{delay1}$. In this case, the network device also receives the second vector quantization dictionary from the UE in an arrival time unit of the first delay after the first parameter information is sent. For example, the network device reserves an uplink resource for the UE in the time unit of $T_1+T_{delay1}$, the UE sends the second vector quantization dictionary on the uplink resource, and the network device also detects and receive the second vector quantization dictionary on the uplink resource. In response to the first configuration information not including the information about the first delay, after receiving the first parameter information, the UE sends the second vector quantization dictionary to the network device without waiting. For example, in response to the first configuration information including the periodic configuration information of reporting the vector quantization dictionary, and the periodic configuration information is used to configure the aperiodic reporting of the vector quantization dictionary, the semi-persistent reporting of the vector quantization dictionary, or the aperiodic reporting of the vector quantization dictionary, this solution is applied.

In a sixth optional implementation, in response to the UE receiving the first configuration information, the first parameter information, and the first indication information from the network device, the UE sends the second vector quantization dictionary to the network device after receiving the first indication information. For example, in response to the first configuration information including the periodic configuration information of reporting the vector quantization dictionary, and the periodic configuration information being used to configure the aperiodic reporting of the vector quantization dictionary, this solution is applied.

In a seventh optional implementation, in response to the UE receiving the first configuration information, the first parameter information, and the first indication information from the network device, and the first configuration information including the information about the first delay, the UE sends the second vector quantization dictionary to the network device in an arrival moment of the first delay after the first indication information is received. For example, in response to a time unit in which the UE receives the first indication information being $T_2$, and the first delay being represented by using $T_{delay1}$, the UE sends the second vector quantization dictionary to the network device in a time unit of $T_2+T_{delay1}$. In this case, the network device also receives the second vector quantization dictionary from the UE in an arrival time unit of the first delay after the first indication information is sent. For example, the network device reserves an uplink resource for the UE in the time unit of $T_2+T_{delay1}$, the UE sends the second vector quantization dictionary on the uplink resource, and the network device also detects and receive the second vector quantization dictionary on the uplink resource. In response to the first configuration information not including the information about the first delay, after receiving the first indication information, the UE sends the second vector quantization dictionary to the network device without waiting. For example, in response to the first configuration information including the periodic configuration information of reporting the vector quantization dictionary, and the periodic configuration information being used to configure the aperiodic reporting of the vector quantization dictionary, this solution is applied.

A preparation time is reserved for the UE through indicating the first delay, so that the UE has a corresponding time to determine the second vector quantization dictionary.

Optionally, the first delay is specified in a protocol. For example, the first delay is applied to all UEs, or the first delay is separately set for different network devices or different cells. Alternatively, the first delay is determined by the network device. For example, the network device determines a same first delay for all UEs covered by the network device, or the network device separately determines the first delay for different cells provided by the network device, or the network device separately determines the first delay for different UEs. For example, the UE sends capability information to the network device. The capability information indicates information about a third delay. The third delay is determined based on a processing capability of the UE. For example, the third delay is a shortest processing time used by the UE for sending the vector quantization dictionary. The UE sends the capability information in a random access process, or the UE sends the capability information after successful random access. The network device determines the first delay based on the third delay. In this manner, the first delay better meets an actual capability of the UE. A unit of the first delay is, for example, a slot (slot), a transmission time interval (transmission time interval, TTI), a millisecond (ms), or a microsecond (μs). A unit of the third delay is, for example, a slot, a TTI, ms, or μs. In addition, a unit of the time unit is, for example, a slot, a TTI, ms, or μs.

In at least one embodiment, the UE sends the second vector quantization dictionary to the network device in a plurality of manners. The manners are relatively flexible. A specific sending manner is specified in a protocol, or is configured by the network device, or is determined through negotiation between the UE and the network device.

For example, the second vector quantization dictionary sent by the UE (or a parameter of the second vector quantization dictionary sent by the UE) includes one or more items in Table 2:

TABLE 2

| Parameter list | Parameter description |
| --- | --- |
| S, D | VQ layer hyperparameter, which determines a size of a VQ basis vector dictionary |
| $e_1, e_2, \ldots, e_s$ ($e_i \in \mathbb{R}^D$) | VQ basis vector dictionary set, including S items in total, where each item is a D-dimensional weight |
| G | GN grouping parameter, which determines a specific quantity of channels in a feature map |
| $LR_{decay}$ | Learning rate exponential decay parameter |

In addition, the parameter of the second vector quantization dictionary sent by the UE further includes one or more other parameters of the second vector quantization dictionary.

S706: The network device determines a third vector quantization dictionary.

For example, in response to the network device also updating the vector quantization dictionary in step S702, the network device compares the second vector quantization dictionary with the vector quantization dictionary updated by the network device, to determine, based on the second vector quantization dictionary and the vector quantization dictionary updated by the network device, a finally used vector quantization dictionary, for example, referred to as the third vector quantization dictionary. The third vector quantization dictionary is the same as the second vector quantization dictionary (or the third vector quantization dictionary is the second vector quantization dictionary), or the third vector quantization dictionary is the same as the vector quantization dictionary updated by the network device (or the third vector quantization dictionary is the vector quantization dictionary updated by the network device), or the third vector quantization dictionary is different from the second vector quantization dictionary and the vector quantization dictionary updated by the network device. However, the third vector quantization dictionary is determined based on the second vector quantization dictionary and the vector quantization dictionary updated by the network device.

S707: The network device sends the third vector quantization dictionary to the UE, and correspondingly, the UE receives the third vector quantization dictionary from the network device.

In response to the network device determining the third vector quantization dictionary, and the third vector quantization dictionary being different from the second vector quantization dictionary, the network device sends the third vector quantization dictionary to the UE, so that the UE and the network device use consistent vector quantization dictionaries.

Both steps S706 and S707 are optional steps.

At least one embodiment is applied to a network architecture of UE and a network device, or is applied to a network architecture of UE, a network device, and an AI node. In response to at least one embodiment being applied to the network architecture of UE, a network device, and an AI node, for example, step S702 is performed by the AI node.

In at least one embodiment, the vector quantization dictionary is updated, so that the vector quantization dictionary better meets a current network status, thereby improving CSI feedback precision.

In the embodiment shown in FIG. 7, online update of the vector quantization dictionary is implemented. Next, FIG. 8 is a flowchart of a fourth communication method according to at least one embodiment. Online update of the vector quantization dictionary is also implemented by using the method. Different from the embodiment shown in FIG. 7, in the embodiment shown in FIG. 7, the UE updates the vector quantization dictionary. In the method, the network device updates the vector quantization dictionary.

S801: A network device sends second configuration information to UE, and correspondingly, the UE receives the second configuration information from the network device.

The second configuration information is used to configure online update of parameter information of an encoder network, or the second configuration information is used to configure a report parameter of an encoder network. For example, the second configuration information includes one or more of the following: information about a second delay, format information of the encoder network, or periodic configuration information of reporting the parameter information of the encoder network.

In at least one embodiment, the network device updates a vector quantization dictionary, and the UE sends second parameter information to the network device. The information about the second delay is used by the UE to send the second parameter information to the network device after waiting for the second delay. The second parameter information is, for example, the parameter information of the encoder network maintained by the UE. The encoder network includes, for example, the encoder network currently used by the network device and the UE, or includes all encoder networks maintained by the UE.

The format information of the encoder includes, for example, one or more of the following items: dimension information of the encoder network, type information of the encoder network, or an index of the encoder network. The dimension information of the encoder network indicates a dimension of the encoder network. The dimension of the encoder network includes an input dimension and/or an output dimension of the encoder network. In a case of a plurality of encoder networks, an index is added for each encoder network.

The periodic configuration information of reporting the parameter information of the encoder network is used to configure the periodic reporting of the parameter information of the encoder network. For example, the periodic configuration information includes a period $R_2$. For example, the network device sends second scheduling information according to the period $R_2$, and the second scheduling information is used to schedule an uplink resource, to trigger the UE to send the second parameter information. After receiving the second scheduling information, the UE sends the second parameter information to the network device. This is considered as a process in which the UE sends the second parameter information to the network device according to the period $R_2$.

Alternatively, the periodic configuration information of reporting the parameter information of the encoder network is used to configure semi-persistent (semi-persistent) reporting of the parameter information of the encoder network. For example, the periodic configuration information is used to configure a resource for sending the second parameter information, and a period $R_2$. After receiving the periodic configuration information, the UE sends the second parameter information to the network device according to the period $R_2$ by using the resource, and the network device is able to not schedule the UE each time.

Alternatively, the periodic configuration information of reporting the parameter information of the encoder network is used to configure aperiodic (aperiodic) reporting of the second parameter information. In response to the aperiodic reporting of the parameter information of the encoder network being configured, a manner in which the UE sends the second parameter information to the network device is waiting for triggering performed by the network device. For example, the network device sends third indication information (for example, scheduling information, or trigger information specifically used to trigger the UE) to the UE, to trigger the UE to send the second parameter information. After receiving the third indication information, the UE sends the second parameter information to the network device. To be specific, in response to the network device performing triggering, the UE sends the second parameter information; or in response to the network device not performing triggering, the UE does not send the second parameter information. In this manner, the network device triggers the UE to send the second parameter information in response to being used, thereby reducing a process of receiving redundant information.

In at least one embodiment, the periodic configuration information of reporting the parameter information of the encoder network is used to configure periodic reporting of the parameter information of the encoder network, semi-persistent reporting of the parameter information of the encoder network, or aperiodic reporting of the parameter information of the encoder network. In other words, the UE sends the second parameter information to the network device in one of the manners, or sends the second parameter information to the network device in any combination form of the manners. For example, in response to the periodic configuration information of reporting the parameter information of the encoder network being used to configure both semi-persistent reporting of the parameter information of the encoder network and aperiodic reporting of the parameter information of the encoder network, the UE sends the second parameter information to the network device in a semi-persistent manner, or sends the second parameter information to the network device in an aperiodic reporting manner after receiving the third indication information of the network device.

At least one embodiment is applied in combination with the embodiment shown in FIG. 5 or the embodiment shown in FIG. 6. In this case, the second configuration information and the third configuration information is same configuration information, or is different configuration information. In response to the second configuration information and the third configuration information being different configuration information, and the network device sends the second configuration information and the third configuration information to the UE, the second configuration information is sent after the third configuration information, or the second configuration information and the third configuration information is simultaneously sent.

Step S801 is an optional step. In other words, the network device does not send the second configuration information to the UE.

S802: The UE determines second parameter information.

For example, there are J UEs, and each UE obtains a downlink channel matrix through measurement based on the third configuration information sent by the network device.

For example, the downlink channel matrices obtained by the J UEs through measurement include $\{H_1, H_2, \ldots, H_J\}$. For some or all of the J UEs, a parameter of the encoder network is updated, or the second parameter information is determined. For example, for one UE, the parameter of the encoder network is updated based on a downlink channel matrix obtained by the UE through measurement, or the parameter of the encoder network is updated based on a downlink channel matrix obtained by the UE through measurement and historical data (for example, a historical downlink channel matrix obtained through measurement). Optionally, the UE further updates a parameter and/or a vector quantization dictionary of a decoder network. For example, the parameter information (or the second parameter information) of the encoder network and parameter information of the decoder network that are determined by the J UEs include $\{\langle E_1 | D_1 \rangle, \langle E_2 | D_2 \rangle, \ldots, \langle E_J | D_J \rangle\}$, where $E_i$ represents parameter information that is of the encoder network and that is determined by an $i^{th}$ UE, and $D_i$ represents parameter information that is of the decoder network and that is determined by the $i^{th}$ UE.

S803: The UE sends the second parameter information to the network device, and correspondingly, the network device receives the second parameter information from the UE.

For example, the UE converts the second parameter information into a binary bit stream and send the binary bit stream to the network device. The second parameter information includes one or more items in Table 3.

TABLE 3

| Parameter list | Parameter description |
| --- | --- |
| G | GN grouping parameter, which determines a specific quantity of channels in a feature map |
| $W_{L_1}^{(1)}, \ldots, w_{L_{Enc_1}}^{(1)}$ | Weight set of a downsampling layer of the encoder network |
| $W_{L_1}^{(2)}, \ldots, w_{L_{Enc_2}}^{(2)}$ | Weight set of a convolutional layer of the encoder network |
| $LR_{decay}$ | Learning rate exponential decay parameter |

In addition, the second parameter information further includes information about one or more other parameters of the encoder network. The UE sends the second parameter information to the network device in a plurality of implementations. The following uses examples for description.

In a first optional implementation, the UE periodically sends the second parameter information to the network device. The period is, for example, configured by using the second configuration information, and is, for example, a period $R_2$. In this case, after receiving the second configuration information, the UE sends the second parameter information to the network device according to the period $R_2$. For example, in response to the second configuration information including the periodic configuration information of reporting the parameter information of the encoder network, and the periodic configuration information being used to configure the periodic reporting of the parameter information of the encoder network, this solution is applied. Alternatively, the period for sending the second parameter information by the UE is, for example, specified in a protocol. For example, the network device is able to not send the second configuration information. In this case, the UE sends the second parameter information to the network device according to the period. The UE periodically sends the second parameter information to the network device in at least one embodiment indicates that the UE sends the second parameter information to the network device in each period; or the UE does not necessarily send the second parameter information to the network device in each period, but sends the second parameter information to the network device in one or more periods, where the one or more periods is continuous or discontinuous in time domain.

In a second optional implementation, in response to the UE receiving the second configuration information from the network device, or the UE receiving the second configuration information and the third indication information from the network device, the UE sends the second parameter information to the network device after receiving the second configuration information. For example, in response to the second configuration information including the periodic configuration information of reporting the parameter information of the encoder network, and the periodic configuration information being used to configure the aperiodic reporting of the parameter information of the encoder network, this solution is applied.

In a third optional implementation, in response to the UE receiving the second configuration information from the network device, or the UE receiving the second configuration information and the third indication information from the network device, and the second configuration information including the information about the second delay, the UE sends the second parameter information to the network device in an arrival time unit of the second delay after the second configuration information is received. For example, in response to a time unit in which the UE receives the second configuration information being $T_3$, and the second delay being represented by using $T_{delay2}$, the UE sends the second parameter information to the network device in a time unit of $T_2 + T_{delay2}$. In this case, the network device also receives the second parameter information from the UE in an arrival time unit of the second delay after the second configuration information is sent. For example, the network device reserves an uplink resource for the UE in the time unit of $T_2 + T_{delay2}$, the UE sends the second parameter information on the uplink resource, and the network device also detects and receive the second parameter information on the uplink resource. In response to the second configuration information not including the information about the second delay, after receiving the second configuration information, the UE sends the second parameter information to the network device without waiting. For example, in response to the second configuration information including the periodic configuration information of reporting the parameter information of the encoder network, and the periodic configuration information being used to configure the aperiodic reporting of the parameter information of the encoder network, this solution is applied.

In a fourth optional implementation, in response to the UE receiving the second configuration information and the third indication information from the network device, the UE sends the second parameter information to the network device after receiving the third indication information. For example, in response to the second configuration information including the periodic configuration information of reporting the parameter information of the encoder network, and the periodic configuration information is used to configure the aperiodic reporting of the parameter information of the encoder network, this solution is applied.

In a fifth optional implementation, in response to the UE receiving the second configuration information and the third indication information from the network device, and the second configuration information including the information about the second delay, the UE sends the second parameter information to the network device in an arrival time unit of the second delay after the third indication information is received. For example, in response to a time unit in which the UE receives the third indication information being $T_4$, and the second delay being represented by using $T_{delay2}$, the UE sends the second parameter information to the network device in a time unit of $T_4+T_{delay2}$. In this case, the network device also receives the second parameter information from the UE in an arrival time unit of the second delay after the third indication information is sent. For example, the network device reserves an uplink resource for the UE in the time unit of $T_4+T_{delay2}$, the UE sends the second parameter information on the uplink resource, and the network device also detects and receive the second parameter information on the uplink resource. In response to the second configuration information not including the information about the second delay, after receiving the third indication information, the UE sends the second parameter information to the network device without waiting. For example, in response to the second configuration information including the periodic configuration information of reporting the parameter information of the encoder network, and the periodic configuration information being used to configure the aperiodic reporting of the parameter information of the encoder network, this solution is applied.

A preparation time is reserved for the UE through indicating the second delay, so that the UE has a corresponding time to determine the second parameter information.

Optionally, the second delay is specified in a protocol. For example, the second delay is applied to all UEs, or the second delay is separately set for different network devices or different cells. Alternatively, the second delay is determined by the network device. For example, the network device determines a same second delay for all UEs covered by the network device, or the network device separately determines the second delay for different cells provided by the network device, or the network device separately determines the second delay for different UEs. For example, the UE sends capability information to the network device. The capability information indicates information about a fourth delay. The fourth delay is determined based on a processing capability of the UE. For example, the fourth delay is a shortest processing time used by the UE for sending the second parameter information. The fourth delay is equal to or not equal to the third delay in the embodiment shown in FIG. 7. The UE sends the capability information in a random access process, or the UE sends the capability information after successful random access. The network device determines the second delay based on the fourth delay. In this manner, the second delay better meets an actual capability of the UE. The second delay is equal to or not equal to the first delay in the embodiment shown in FIG. 7. A unit of the second delay is, for example, a slot, a TTI, ms, or μs. A unit of the fourth delay is, for example, a slot, a TTI, ms, or μs. In addition, a unit of the time unit is, for example, a slot, a TTI, ms, or μs.

S804: The network device determines a second vector quantization dictionary. The second vector quantization dictionary is, for example, a first vector quantization dictionary, or the second vector quantization dictionary is, for example, a vector quantization dictionary obtained by updating the first vector quantization dictionary.

For example, the network device updates the first vector quantization dictionary to obtain the second vector quantization dictionary. For example, the network device establishes J encoding-decoding models based on the quantity J of UEs, uses network parameters $\{\langle E_1|D_1\rangle, \langle E_2|D_2\rangle, \ldots, \langle E_J|D_J\rangle\}$ received from the J UEs respectively as weight initialization conditions of corresponding encoding-decoding models (for example, uses a network parameter $\langle E_i|D_i\rangle$ received from the $i^{th}$ UE as a weight initialization condition of an $i^{th}$ encoding-decoding model), performs training by using offline data (for example, a historical reconstructed downlink channel matrix) stored in the network device, calculates gradients of the J encoding-decoding models, and performs gradient fusion on the J gradients (for example, calculation of an average value, where the average value is, for example, an arithmetic mean or a weighted mean), to update one or more of the following items based on a fusion result: a parameter of the encoder network, a parameter of the decoder network, or the first vector quantization dictionary. For example, for the encoder network, a gradient E determined by the network device is represented as follows:

$$\nabla E = \frac{1}{J}(\nabla E_1 + \nabla E_2 + \ldots + \nabla E_J) \quad \text{(Formula 18)}$$

In Formula 18, ∇E represents a fusion gradient. In Formula 18, an example in which a fusion manner is calculating an arithmetic mean is used.

For example, for the decoder network, a gradient D determined by the network device is represented as follows:

$$\nabla D = \frac{1}{J}(\nabla D_1 + \nabla D_2 + \ldots + \nabla D_J) \quad \text{(Formula 19)}$$

In Formula 19, VD represents a fusion gradient. In Formula 19, an example in which a fusion manner is calculating an arithmetic mean is used.

Alternatively, the network device does not update the vector quantization dictionary, but determine the currently used or to-be-used first vector quantization dictionary.

S805: The network device sends the second vector quantization dictionary, and correspondingly, the UE receives the second vector quantization dictionary from the network device. The network device sends parameter information of the second vector quantization dictionary, and the UE receives the parameter information of the second vector quantization dictionary. For example, the network device converts the second vector quantization dictionary (or the parameter information of the second vector quantization dictionary) into a binary bit stream and send the binary bit stream. For example, the network device sends the second vector quantization dictionary in a broadcast or unicast manner. In response to the network device sending the vector quantization dictionary in the broadcast manner, a plurality of UEs receives the second vector quantization dictionary. In FIG. 8, an example in which one UE receives the second vector quantization dictionary is used.

The parameter information of the second vector quantization dictionary includes one or more items in Table 4.

TABLE 4

| Parameter list | Parameter description |
|---|---|
| S, D | VQ layer hyperparameter, which determines a size of a VQ basis vector dictionary |
| $e_1, e_2, \ldots, e_s$ ($e_i \in \mathbb{R}^D$) | VQ basis vector dictionary set, including S items in total, where each item is a D-dimensional weight |

TABLE 4-continued

| Parameter list | Parameter description |
|---|---|
| G | GN grouping parameter, which determines a specific quantity of channels in a feature map |
| $LR_{decay}$ | Learning rate exponential decay parameter |

In addition, the parameter information of the second vector quantization dictionary sent by the network device further includes information about one or more other parameters of the second vector quantization dictionary.

In response to the second vector quantization dictionary being an updated first vector quantization dictionary, and the embodiment shown in FIG. 8 being combined with the embodiment shown in FIG. 5, step S805 is performed after execution of the embodiment shown in FIG. 5 is completed. In response to the embodiment shown in FIG. 8 being combined with the embodiment shown in FIG. 5, step S805 is performed after execution of the embodiment shown in FIG. 6 is completed. Alternatively, in response to the second vector quantization dictionary being the first vector quantization dictionary, and the embodiment shown in FIG. 8 being combined with the embodiment shown in FIG. 5, step S805 is performed before step S506 in the embodiment shown in FIG. 5. In response to the embodiment shown in FIG. 8 being combined with the embodiment shown in FIG. 5, step S805 is performed before step S606 in the embodiment shown in FIG. 6.

Both steps S802 and S803 are optional steps. In other words, the UE does not determine the second parameter information, and correspondingly does not send the first parameter information. Alternatively, even in response to the UE determining the second parameter information, the UE does not necessarily send the second parameter information.

At least one embodiment is applied to a network architecture of UE and a network device, or is applied to a network architecture of UE, a network device, and an AI node. In response to at least one embodiment being applied to the network architecture of UE, a network device, and an AI node, for example, step S804 is performed by the AI node.

In at least one embodiment, the vector quantization dictionary is updated, so that the vector quantization dictionary better meets a current network status, thereby improving CSI feedback precision. In addition, in at least one embodiment, the network device updates the vector quantization dictionary, so that the network device has a control right over the vector quantization dictionary.

At least one embodiment relates to a reference network. The following describes, by using examples, several structures of reference networks to which embodiments described herein are applicable. The structures of the reference networks described below are applicable to at least one embodiment, for example, applicable to the embodiment shown in any one of FIG. 5 to FIG. 8.

1. An implementation of the decoder network: in this implementation, the decoder network is, for example, a CNN network.

The decoder network meets one or more of a first feature, a second feature, or a third feature.

First feature: All network layers included in the decoder network are convolutional (convolution) layers, and the convolutional layer includes convolution and/or transposed convolution. Compared with a fully connected network, a fully convolutional network has fewer parameters, which facilitates optimization and training. Therefore, the fully convolutional network is used in the decoder network.

Second feature: An output of a mapping network included in the decoder network is normalized through batch normalization (batch normalization, BN), and all remaining normalization (norm) layers included in the decoder network uses group normalization. Herein, group normalization is also referred to as layer normalization (layer normalization) in response to a group being 1. Effect of batch normalization is keeping a relative relationship between samples unchanged, where samples changes. Through group normalization, a relationship between features of samples is kept unchanged. In this case, group normalization better meets a quantization usage. Therefore, group normalization is used for all the norm layers in the decoder network.

Third feature: All activation (activation) functions included in the decoder network use a tan h function, where tan h is a hyperbolic tangent function. Because a value range of a real part and an imaginary part of a channel is [−1, 1], and is equivalent to an output range of tan h, using the tan h function as the activation function is appropriate.

Figure 9:
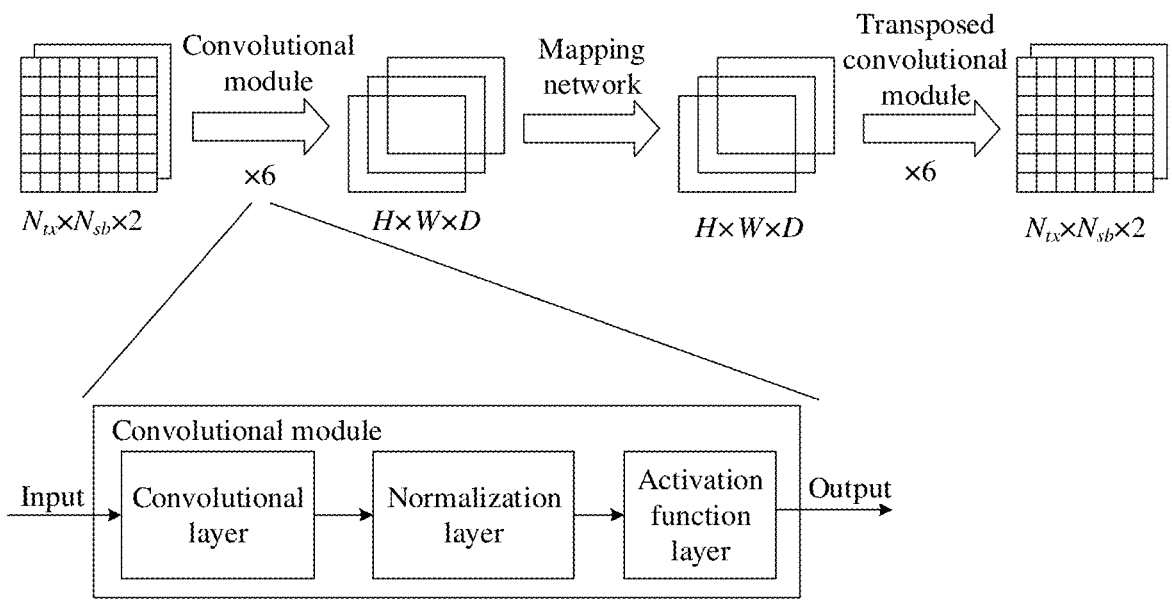
FIG. 9 shows an example of a first decoder network.

FIG. 9 shows an example of this decoder network.

The decoder network in FIG. 9 includes 12 modules in total that include six convolutional modules and six transposed convolutional modules. Each of the 12 modules includes a convolutional layer (or a deconvolutional layer), a norm layer, and an activation function layer. In FIG. 9, grids in a first part from left to right represent an input dimension of the encoder network, for example, $N_{tx} \times N_{sb} \times 2$, and grids in a second part from left to right represent an output dimension of the encoder network, for example, H×W×D. The encoder network includes, for example, six modules (a convolutional module and/or a transposed convolutional module). Grids in a third part from left to right represent an input dimension of the decoder network, for example, H×W×D, and grids in a fourth part from left to right represent an output dimension of the decoder network, for example, $N_{tx} \times N_{sb} \times 2$. The decoder network includes, for example, six modules (a convolutional module and/or a transposed convolutional module).

In an example, for parameters of the decoder network, refer to Table 5.

TABLE 5

| Layer (layer) | Kernel size (Kernel size) | Filter (Filters) | Padding (Padding) | Stride (Strides) |
|---|---|---|---|---|
| Conv1 | 5 × 5 | 16 | Same (Same) | (2, 1) |
| Conv2 | 5 × 5 | 32 | Same | (2, 1) |
| Conv3 | 1 × 3 | 64 | Valid (Valid) | (1, 2) |
| Conv4 | 5 × 5 | 128 | Same | (2, 2) |
| Conv5 | 1 × 2 | 256 | Valid | (1, 1) |
| Conv6 | 3 × 3 | 512 | Same | (1, 1) |
| DeConv1 | 1 × 2 | 512 | Valid | (1, 1) |
| DeConv2 | 5 × 5 | 256 | Same | (2, 2) |
| DeConv3 | 1 × 3 | 128 | Valid | (1, 2) |
| DeConv4 | 5 × 5 | 64 | Same | (2, 1) |
| DeConv5 | 3 × 3 | 16 | Same | (2, 1) |
| DeConv6 | 3 × 3 | 2 | Same | (1, 1) |

Herein, Cony in Table 5 represents a step of a sliding window of convolution on an original image. In response to Cony being 2, an interval between central point positions of two convolutions is 2. Herein, DeConv represents a step of a sliding window of deconvolution on an original image. The filter represents a quantity of convolution kernels. For example, in response to the filter being 16, sixteen 5×5 convolution kernels are used for convolution; or in response to the filter being 32, thirty-two 5×5 convolution kernels are used for convolution. The kernel size represents a size of a convolution kernel. For example, 5×5 indicates that a convolution kernel is a 5×5 window. In response to the padding being the same, zeros are added around the original image to ensure that an image size after convolution remains unchanged. In response to the padding being valid, zeros are not added around the original image. In this case, a size of the original image is reduced after convolution.

2. Another implementation of the decoder network: in this implementation, the decoder network is, for example, a vision transformer (vision transformer, ViT) network.

The decoder network meets one or more of a fourth feature, a fifth feature, a sixth feature, or a seventh feature.

Fourth feature: The decoder network includes an embedding (embedding) layer, a fully connected layer, and an attention (attention) layer. The ViT network considers an original channel as a sequence, and captures a relationship between elements in the sequence. Therefore, the ViT network is more suitable for learning non-stationary data with a large quantity of zeros, and has a stronger feature extraction capability.

Fifth feature: In position embedding (position embedding), the decoder network first sorts energy of each patch (patch), and then performs embedding according to an order after the sorting. Because channel energy distribution is stable in a period of time, this facilitates learning after the sorting performed based on energy.

Sixth feature: An output of a mapping network included in the decoder network is normalized through batch normalization, and all remaining norm layers included in the decoder network use group normalization. Effect of batch normalization is keeping a relative relationship between samples unchanged, where samples changes. Through group normalization, a relationship between features of samples is kept unchanged. In this case, group normalization better meets a quantization usage. Therefore, group normalization is used for all the norm layers in the decoder network.

Seventh feature: All activation functions included in the decoder network use a tan h function. Because a value range of a real part and an imaginary part of a channel is $[-1, 1]$, and is equivalent to an output range of tan h, using the tan h function as the activation function is appropriate.

Figure 10A:
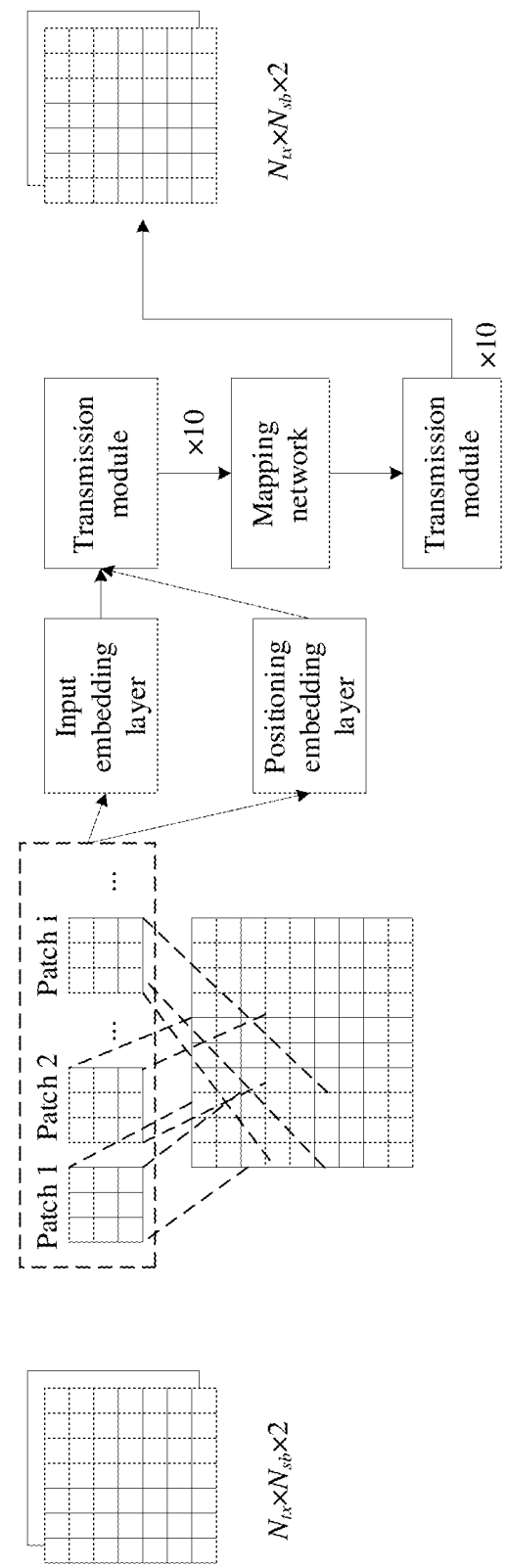
FIG. 10A shows an example of a second decoder network.

FIG. 10A shows an example of this decoder network.

Figure 10B:
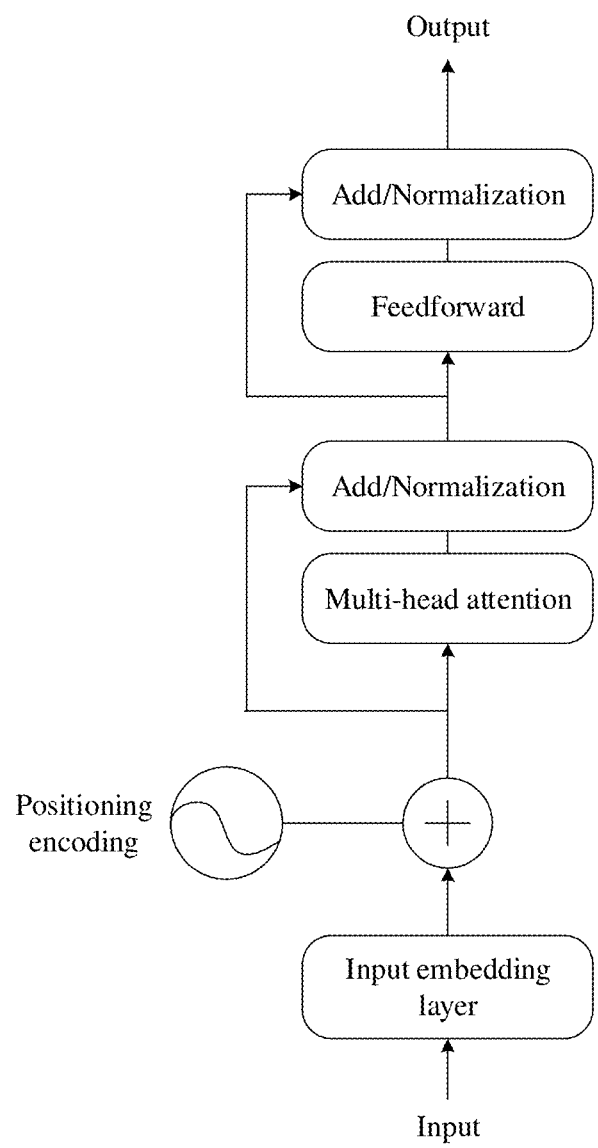
FIG. 10B is a schematic diagram of a structure of a transmit module corresponding to a second decoder network.

Grids in a first part from left to right represent an input dimension of the encoder network, for example, $N_{tx} \times N_{sb} \times 2$. The network first serializes an original input channel (that is, a matrix whose dimension is $N_{tx} \times N_{sb} \times 2$) to obtain patch (patch) sequences shown in FIG. 10A, and numbers all the patch sequences, for example, numbers 1, 2, and 3. Then, the network inputs the patch sequences to an input embedding layer, inputs numbers corresponding to the patch sequences into a position embedding layer, and uses an output of the input embedding layer and an output of the position embedding layer as an input of a transmission module. Herein, ×10 in FIG. 10A indicates that transmission modules with a same structure are connected in series for 10 times. After the transmission module, an output of the transmission module is sent to a mapping network for feature quantization, and finally an original channel is reconstructed by the transmission module. For example, a dimension of the reconstructed original channel is $N_{tx} \times N_{sb} \times 2$. A total of 4×2 patches are obtained after the original input channel is serialized. A feature sequence whose dimension is 8×512 is obtained through embedding. A structure of the transmission module is shown in FIG. 10B. A normalization layer uses batch normalization. A quantity of nodes at a feedforward (feedforward) layer is 512. A quantity of heads at a multi-head attention (multi-head attention) layer is 64. In FIG. 10B, a plus sign represents addition, and a symbol on a left side of the plus sign represents position embedding. Content output after the addition is copied. One is sent to the multi-head attention layer, and the other is sent to an add/normalization (add/norm) layer. "Add" in add/normalization indicates addition of the copy and content obtained through processing of the multi-head attention layer. Content output by the add/normalization layer is also copied. One is sent to the feedforward layer, and the other is sent to the add/normalization layer.

3. Still another implementation of the decoder network: in this implementation, the decoder network is, for example, a high-resolution convolutional network based on residual connections. the network is, for example, a refine network (RefineNet).

The decoder network meets one or more of an eighth feature, a ninth feature, or a tenth feature.

Eighth feature: The entire decoder network includes several convolutional layers (followed by a tan h activation function), a group normalization layer, and a residual connection layer. The RefineNet is a generative multi-path enhanced convolutional neural network. Different from a conventional neural network, the RefineNet uses a large quantity of residual connection (residual connection) operations. Short-range connections between internal layers form a long-range connection (long range connection), so that a gradient is effectively transmitted to the entire network, thereby facilitating training of the entire network. In addition, cascaded chain residual connection operations is also integrated into richer context information.

Ninth feature: In a decoding process, in response to deconvolution (deconvolution) being used in a conventional network as an upsampling operation, restoring a low-layer feature through deconvolution is not easy. However, in response to a high-resolution feature map being generated through atrous convolution (atrous convolution), huge computing and storage resources is to be consumed. However, in the decoder network provided in at least one embodiment, by using a long-range residual connection and an identity mapping (identity mapping) idea, the RefineNet used as the decoder network fuses rich information generated in a sampling process into a network and efficiently transmit the information. In this way, high-level information extracted by a deeper network is enhanced and compensated based on a fine-grained feature obtained through a previous convolution operation, thereby generating a high-quality and high-precision output.

Tenth feature: All activation functions included in the decoder network use a tan h function. Because a value range of a real part and an imaginary part of a channel is $[-1, 1]$, and is equivalent to an output range of tan h, using the tan h function as the activation function is appropriate.

Figure 11:
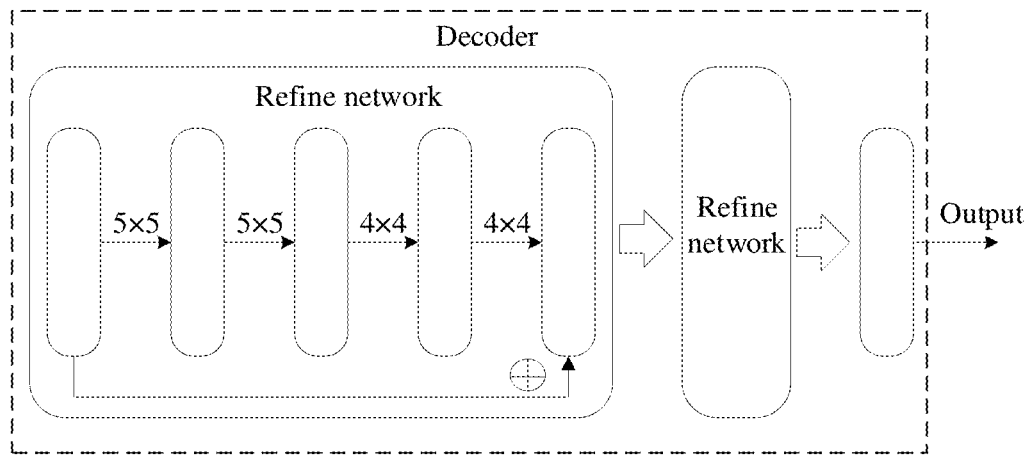
FIG. 11 shows an example of a third decoder network.

For example, for an example of the refine network, refer to FIG. 11. In FIG. 11, the refine network includes the following modules: (1) a convolutional module and a normalization module, where information input to the refine network is first processed by five layers of convolutional modules (followed by the tan h activation function) and the normalization module (for example, through group normalization); and (2) a residual (residual) module, where a ReLU on a direct connection path improves performance of a subsequent network without significantly affecting a gradient flow, network training is not excessively sensitive to a learning rate, and an output of the refine network is obtained through the residual module. A rightmost block in FIG. 11 represents a layer of a convolution operation and a reshape operation, where reshape is an operation manner of transforming a specified matrix into a matrix with a specific dimension. In addition, 5×5, 4×4, and the like in FIG. 11 represent convolution kernel sizes (kernel size) of different convolutional layers.

The foregoing describes several decoder networks to which embodiments described herein are applicable. The following further considers evaluation manners to which embodiments described herein are applicable. In at least one embodiment, a difference between a reconstructed downlink channel matrix and an original downlink channel matrix is evaluated in a corresponding manner. The following describes several performance evaluation indicators. Performance evaluation is performed by using one or more of the following indicators. During a network architecture design, one or more of the following performance evaluation indicators is also considered as a part of a loss function in a network for optimization.

1. First Performance Evaluation Indicator: Mean Square Error (Mean Square Error, MSE)

The mean square error is also referred to as a quadratic loss (quadratic loss) or an L2 loss (L2 Loss). The mean square error is a sum of squares of distances between a target variable and a predicted value, which is a commonly used regression loss function. A formula for calculating the mean square error used in at least one embodiment is as follows:

$$MSE = \frac{1}{N_s N_h} \sum_{i=1}^{N_s} \sum_{j=1}^{N_h} (y_{i,j} - \hat{y}_{i,j})^2 \qquad \text{(Formula 20)}$$

$N_s$ represents a quantity of channel samples, and $N_h$ represents a quantity of elements in a single channel matrix sample. $y_{i,j}$ represents an actual value of a $j^{th}$ channel element of an $i^{th}$ sample (a channel element value is similar to an image pixel value), and $\hat{y}_{i,j}$ represents a predicted value of the $j^{th}$ channel element of the $i^{th}$ sample.

2. Second Performance Evaluation Indicator: Kendall Tau Loss (Kendall Tau Loss)

The Kendall tau loss, also known as a Kendall correlation or a Kendall rank correlation loss, is mainly used to measure closeness of a relative relationship between two groups of variables. A formula for calculating a Kendall correlation coefficient used in at least one embodiment is as follows:

$$\tau = \frac{2}{n(n-1)} \sum_{i<j} \text{sgn}(x_i - x_j) \text{sgn}(y_i - y_j) \qquad \text{(Formula 21)}$$

$\tau$ represents a symbol, and indicates the Kendall correlation coefficient. n represents a quantity of elements. $x_i$ represents an $i^{th}$ actual value of a sample, and $x_j$ represents a $j^{th}$ actual value of a sample. $y_i$ represents an $i^{th}$ predicted value of the sample, and $x_j$ represents a $j^{th}$ predicted value of the sample.

However, derivation cannot be performed through directly obtaining first K (TopK) in the neural network. Therefore, a relaxed 0-1 loss is designed in at least one embodiment.

$$\mathbb{P}_{(f(\theta;X)>f(\theta;X')|Y>Y')} \to \mathbb{I}\{f(\theta;x_i)>f(\theta;x_j)\}$$
$$\mathbb{I}\{y_i>y_j\} = \mathbb{I}\{(f(\theta;x_i)-f(\theta;x_j))(y_i-y_j)>0\} \mathbb{I}\{(f(\theta;x_i)-f(\theta;x_j))(y_i-y_j)>0\} \to ((f(\theta;x_i)-f(\theta;x_j))(y_i-y_j)-1)^2 \qquad \text{(Formula 22)}$$

Formula 22 is considered as a lower bound of Formula 21. Herein, 0-1 loss indicates a binary loss function in which 1 is taken in response to a predicted value not being equal to a target value, and 0 being taken in response to a predicted value is equal to a target value. θ represents a parameter of a reference network in at least one embodiment. X represents a specific element of input sample data, that is, an actual value. X' represents another specific element of input sample data, that is, another actual value. Y represents a specific element of output data, that is, a predicted value. Y' represents another specific element of output data, that is, another predicted value. $\mathbb{P}$ represents a probability operator, and R represents another probability operator. $\mathbb{P}$ 3. Third Performance Evaluation Indicator: Cross Entropy Loss (Cross Entropy Loss)

Generally, the cross entropy loss is a loss function used to quantize a difference between two probability distributions (mostly used for classification). Top K main paths are selected based on an order of channel energy in this solution. In this case, the cross entropy loss is represented by using K classification.

$$CE = -\sum_{i}^{K} y_i \log \frac{\exp(o_i)}{\sum_{j} \exp(o_j)} \qquad \text{(Formula 23)}$$

The main path represents a channel matrix element with relatively high energy. The K classification means that there are K main paths, and the K main paths are K categories that do not overlap. For example, a largest main path is a first category, a second largest main path is a second category, and a $K^{th}$ largest main path is a $K^{th}$ category. Herein, CE represents a cross entropy loss, i represents an $i^{th}$ category of the K categories, $y_i$ represents a probability that a channel element in an actual sample after the K main paths are extracted is an $i^{th}$ category, $o_i$ represents a probability that a predicted sample channel element in the extracted K main paths is the $i^{th}$ category, and $o_j$ represents a probability that a predicted sample channel element in the extracted K main paths is a $j^{th}$ category.

The foregoing described several performance evaluation indicators are applicable to at least one embodiment, for example, to the embodiment shown in any one of FIG. 5 to FIG. 8. For example, a protocol specifies one or more performance evaluation indicators for each reference network, or a performance evaluation indicator applied to a reference network currently used by a network device and UE is determined by the network device. Performance of the reference network is evaluated based on the corresponding performance evaluation indicator, to better optimize the reference network.

Based on the foregoing method embodiments, a communication apparatus provided in at least one embodiment is described.

At least one embodiment provides a communication apparatus. The communication apparatus includes, for example, a processing unit and a transceiver unit (or referred to as a communication unit). The processing unit is configured to implement a processing function of the UE in any one of the embodiments shown in FIG. 5 to FIG. 8. The transceiver unit is configured to implement all or a part of receiving and sending functions of the UE in any one of the embodiments shown in FIG. 5 to FIG. 8. Alternatively, the processing unit is configured to implement a processing function implemented by the network device in any one of the embodiments shown in FIG. 5 to FIG. 8, and the transceiver unit is configured to implement all or a part of receiving and sending functions of the network device in any one of the embodiments shown in FIG. 5 to FIG. 8.

Optionally, the processing unit and/or the transceiver unit is implemented by using a virtual module. For example, the processing unit is implemented by using a software functional unit or a virtual apparatus, and the transceiver unit is implemented by using a software functional unit or a virtual apparatus. Alternatively, the processing unit and/or the transceiver unit is implemented by using a physical apparatus (for example, a circuit system and/or a processor). A case in which the processing unit and the transceiver unit are implemented by using a physical apparatus is described below.

Figure 12:
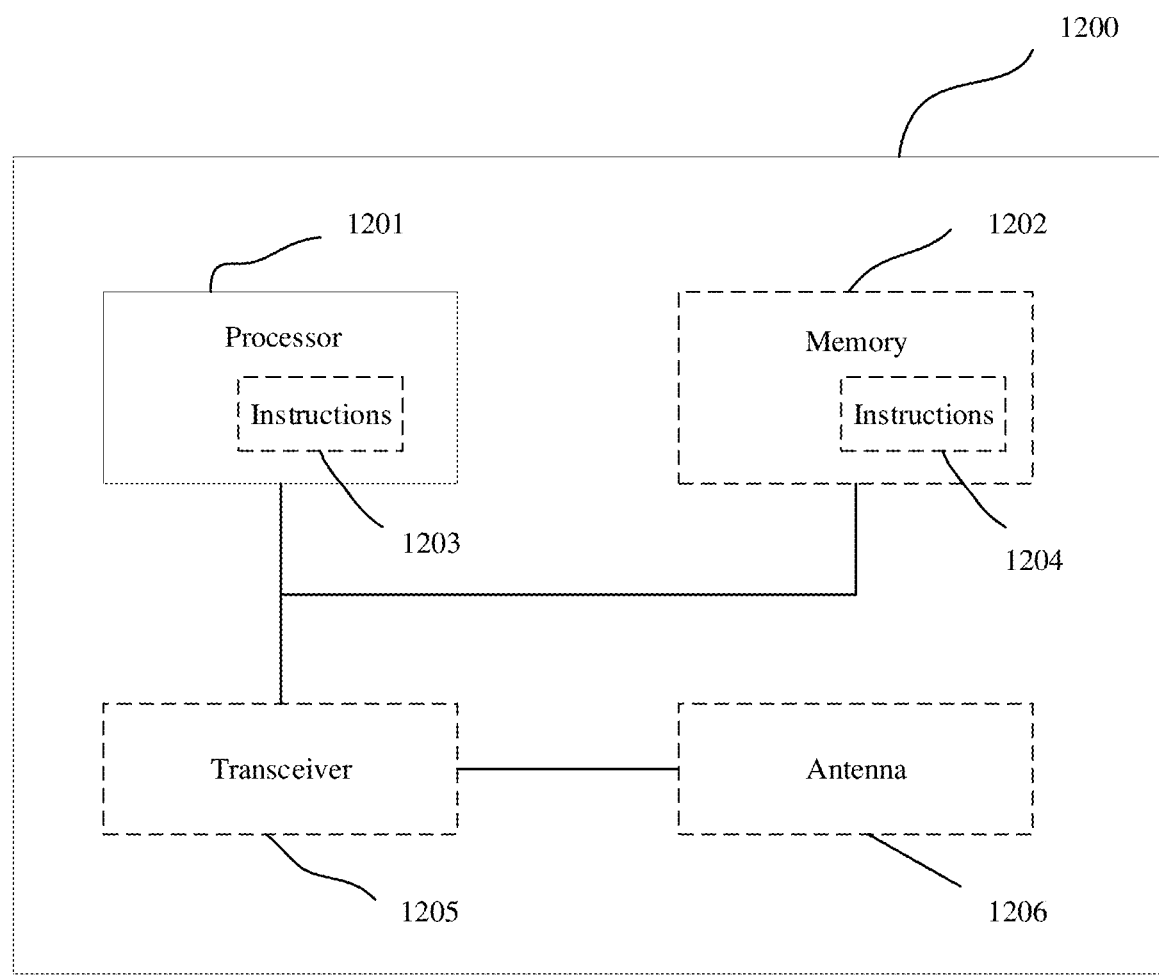
FIG. 12 is a schematic block diagram of a communication apparatus.

FIG. 12 is a schematic diagram of a structure of a communication apparatus according to at least one embodiment. The communication apparatus 1200 is the UE or the circuit system of the UE in any one of the embodiments shown in FIG. 5 to FIG. 8, and is configured to implement the method corresponding to the UE in the foregoing method embodiments. Alternatively, the communication apparatus 1200 is the network device or the circuit system of the network device in any one of the embodiments shown in FIG. 5 to FIG. 8, and is configured to implement the method corresponding to the network device in the foregoing method embodiments. For a specific function, refer to the description in the foregoing method embodiments. For example, a circuit system is a chip system.

The communication apparatus 1200 includes one or more processors 1201. The processor 1201 implements a specific control function. The processor 1201 is a general-purpose processor, a dedicated processor, or the like. For example, the processor 1201 includes a baseband processor and a central processing unit. The baseband processor is configured to process a communication protocol and communication data. The central processing unit is configured to: control the communication apparatus 1200, execute a software program, and/or process data. Different processors is independent components, or is disposed in one or more processing circuits, for example, integrated into one or more application-specific integrated circuits.

Optionally, the communication apparatus 1200 includes one or more memories 1202 for storing instructions 1204. The instructions 1204 is run on the processor, so that the communication apparatus 1200 performs the method described in the foregoing method embodiment. Optionally, the memory 1202 further stores data. The processor and the memory is separately disposed, or is integrated together.

Optionally, the communication apparatus 1200 includes instructions 1203 (which is alternatively referred to as code or a program in some cases). The instructions 1203 is run on the processor, so that the communication apparatus 1200 performs the method described in the foregoing embodiments. The processor 1201 stores data.

For example, the processing unit is implemented by using the one or more processors 1201, or the processing unit is implemented by using the one or more processors 1201 and the one or more memories 1202, or the processing unit is implemented by using the one or more processors 1201, the one or more memories 1202, and the instructions 1203.

Optionally, the communication apparatus 1200 further includes a transceiver 1205 and/or an antenna 1206. The transceiver 1205 is referred to as a transceiver unit, a transceiver machine, a transceiver circuit, a transceiver, an input/output interface, or the like; and is configured to implement sending and receiving functions of the communication apparatus 1200 by using the antenna 1206. For example, the transceiver unit is implemented by using the transceiver 1205, or the transceiver unit is implemented by using the transceiver 1205 and the antenna 1206.

Optionally, the communication apparatus 1200 further includes one or more of the following components: a wireless communication module, an audio module, an external memory interface, an internal memory, a universal serial bus (universal serial bus, USB) port, a power management module, an antenna, a speaker, a microphone, an input/output module, a sensor module, a motor, a camera, a display, or the like. In at least one embodiment, the communication apparatus 1200 includes more or fewer components, or some components are integrated, or some components are split. These components is hardware, software, or a combination implementation of software and hardware.

The processor 1201 and the transceiver 1205 that are described in at least one embodiment is implemented on an integrated circuit (integrated circuit, IC), an analog IC, a radio frequency integrated circuit (radio frequency identification, RFID), a mixed-signal IC, an application-specific integrated circuit (application-specific integrated circuit, ASIC), a printed circuit board (printed circuit board, PCB), an electronic device, or the like. The communication apparatus described in at least one embodiment is an independent device (for example, an independent integrated circuit or a mobile phone), or is a part of a larger device (for example, a module that is embedded in another device). For details, refer to the foregoing description of the UE and the network device in the foregoing embodiments. Details are not described herein again.

At least one embodiment provides a terminal device. The terminal device is used in the foregoing embodiments. The terminal device includes a corresponding means (means), unit, and/or circuit for implementing functions of UE in any one of the embodiments shown in FIG. 5 to FIG. 8. For example, the terminal device includes: a transceiver module (or referred to as a transceiver unit), configured to support the terminal device in implementing sending and receiving functions; and a processing module (or referred to as a processing unit), configured to support the terminal device in processing a signal.

Figure 13:
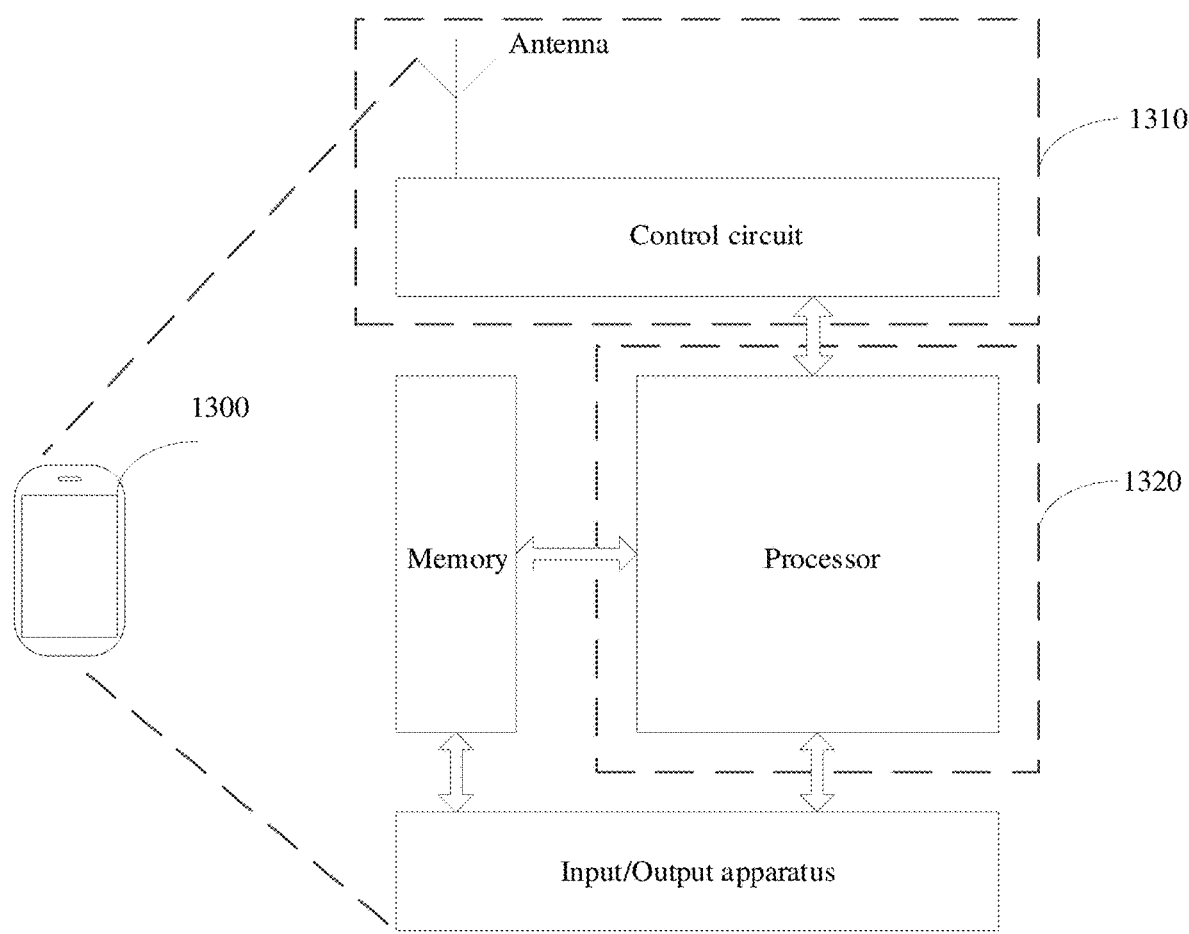
FIG. 13 is a schematic block diagram of a terminal device.

FIG. 13 is a schematic diagram of a structure of a terminal device according to at least one embodiment.

The terminal device 1300 is applied to the architecture shown in any one of FIG. 1 and FIG. 4A to FIG. 4E. For ease of description, FIG. 13 shows only main components of the terminal device 1300. As shown in FIG. 13, the terminal device 1300 includes a processor, a memory, a control circuit, an antenna, and an input/output apparatus. The processor is mainly configured to: process a communication protocol and communication data, control the entire terminal device 1300, execute a software program, and process data of the software program. The memory is mainly configured to store the software program and the data. The control circuit is mainly configured to: perform conversion on a baseband signal and a radio frequency signal, and process the radio frequency signal. The antenna is mainly configured to receive and send a radio frequency signal in a form of an electromagnetic wave. The input/output apparatus, such as a touchscreen, a display, a microphone, or a keyboard, is mainly configured to: receive data input by a user and output data to the user.

A person skilled in the art understands that, for ease of description, FIG. 13 shows only one memory and one processor. In some embodiments, the terminal device 1300 includes a plurality of processors and memories. The memory is also referred to as a storage medium, a storage device, or the like. This is not limited in at least one embodiment.

In an example, the antenna and the control circuit that have sending and receiving functions is considered as a transceiver unit 1310 of the terminal device 1300, and the processor having a processing function is considered as a processing unit 1320 of the terminal device 1300. As shown in FIG. 13, the terminal device 1300 includes the transceiver unit 1310 and the processing unit 1320. The transceiver unit is alternatively referred to as a transceiver, a transceiver machine, a transceiver apparatus, or the like. Optionally, a component that is in the transceiver unit 1310 and that is configured to implement a receiving function is considered as a receiving unit, and a component that is in the transceiver unit 1310 and that is configured to implement a sending function is considered as a sending unit. In other words, the transceiver unit 1310 includes the receiving unit and the sending unit. For example, the receiving unit is alternatively referred to as a receiver machine, a receiver, or a receiving circuit; and the sending unit is alternatively referred to as a transmitter machine, a transmitter, or a transmitter circuit.

At least one embodiment further provides a network device. The network device is used in the foregoing embodiments. The network device includes a means (means), a unit, and/or a circuit for implementing functions of the network device in any one of the embodiments shown in FIG. 5 to FIG. 8. For example, the network device includes: a transceiver module, configured to support the network device in implementing sending and receiving functions; and a processing module, configured to support the network device in processing a signal.

Figure 14:
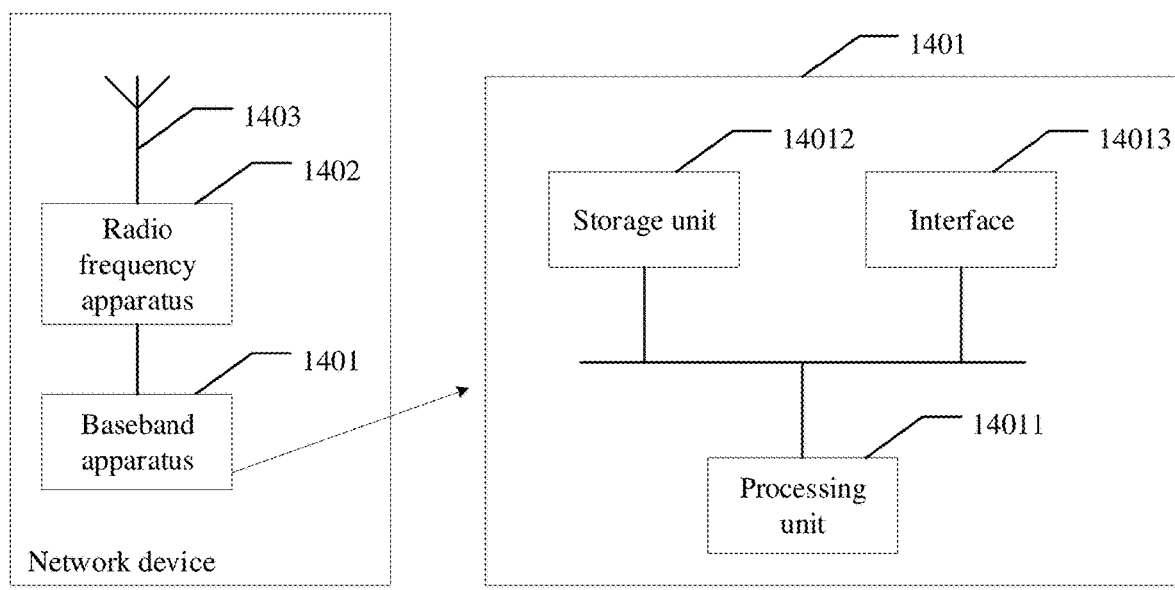
FIG. 14 is a schematic block diagram of a network device.

FIG. 14 is a schematic diagram of a structure of a network device according to at least one embodiment. As shown in FIG. 14, the network device is applicable to the architecture shown in any one of FIG. 1 and FIG. 4A to FIG. 4E. The network device includes a baseband apparatus 1401, a radio frequency apparatus 1402, and an antenna 1403. In an uplink direction, the radio frequency apparatus 1402 receives, through the antenna 1403, information sent by a terminal device, and sends, to the baseband apparatus 1401 for processing, the information sent by the terminal device. In a downlink direction, the baseband apparatus 1401 processes information of the terminal device, and sends the information to the radio frequency apparatus 1402; and the radio frequency apparatus 1402 processes the information of the terminal device, and then sends processed information to the terminal device through the antenna 1403.

The baseband apparatus 1401 includes one or more processing units 14011, a storage unit 14012, and an interface 14013. The processing unit 14011 is configured to support the network device in performing functions of the network device in the foregoing method embodiments. The storage unit 14012 is configured to store a software program and/or data. The interface 14013 is configured to exchange information with the radio frequency apparatus 1402. The interface includes an interface circuit, configured to input and output information. In an implementation, the processing unit is an integrated circuit, for example, one or more ASICs, one or more digital signal processors (digital signal processor, DSP), one or more field programmable gate arrays (field programmable gate array, FPGA), or a combination of these integrated circuits. The storage unit 14012 and the processing unit 14011 is located in a same circuit, that is, an on-chip storage element. Alternatively, the storage unit 14012 and the processing unit 14011 is located in different circuits, that is, an off-chip storage element. The storage unit 14012 is one memory, or is a collective name of a plurality of memories or storage elements.

The network device implements some or all of the steps in the foregoing method embodiments in a form of scheduling programs by one or more processing units 14011. For example, corresponding functions of the network device in any one of the embodiments shown in FIG. 5 to FIG. 8 are implemented. The one or more processing units 14011 support radio access technologies of a same standard, or support radio access technologies of different standards.

In an example, the radio frequency apparatus 1402 and the antenna 1403 that have receiving and sending functions is considered as a transceiver unit of the network device, and the baseband apparatus 1401 that has a processing function is considered as a processing unit of the network device (for example, the processing unit 14011 included in the baseband apparatus is considered as a processing subunit 14011). The transceiver unit is alternatively referred to as a transceiver, a transceiver machine, a transceiver apparatus, or the like. Optionally, a component that is in the transceiver unit and that is configured to implement a receiving function is considered as a receiving unit, and a component that is in the transceiver unit and that is configured to implement a sending function is considered as a sending unit. In other words, the transceiver unit includes the receiving unit and the sending unit. For example, the receiving unit is alternatively referred to as a receiver machine, a receiver, or a receiving circuit; and the sending unit is alternatively referred to as a transmitter machine, a transmitter, or a transmit circuit.

In response to embodiments described herein being implemented in a form of software functional units and sold or used as independent products, embodiments is stored in a computer-readable storage medium. The computer software product is stored in a storage medium, and includes several instructions for instructing a computer device (which is a personal computer, a server, a network device, or the like) to perform all or some of the steps of the method described in at least one embodiment. The foregoing computer-readable storage medium is any usable medium that is accessed by a computer. The following provides an example but does not impose limitation: The computer-readable medium includes a random access memory (random access memory, RAM), a read-only memory (read-only memory, ROM), or any other medium that is used to carry or store expected program code in a form of instructions or a data structure and that is accessed by a computer.

The foregoing description is merely specific implementations of at least one embodiment, but is not intended to limit the protection scope of embodiments described herein. Any variation or replacement readily figured out by a person skilled in the art within the technical scope disclosed in at least one embodiment shall fall within the protection scope of embodiments described herein. Therefore, the protection scope of embodiments described herein shall be subject to the protection scope of the claims.

What is claimed is:

1. An apparatus, comprising:
a first circuit; and
a second circuit;
wherein the first circuit is configured to determine channel state information, wherein the channel state information is determined based on S indexes of S vectors, each of the S vectors includes in a first vector quantization dictionary, the first vector quantization dictionary includes $N_1$ vectors, and $N_1$ and S are both positive integers greater than 1; and send, through the second circuit, the channel state information to a network device;

wherein the S vectors are determined based on S pieces of first channel information and the first vector quantization dictionary, and the S pieces of first channel information are information output by an encoder network for an input being one channel matrix.

2. The apparatus according to claim 1, wherein the $N_1$ vectors have a same length, and the length is equal to at least one dimension in an output dimension of the encoder network.

3. The apparatus according to claim 1, wherein an input dimension of the encoder network is determined based on an input dimension of a first reference encoder network, and the output dimension of the encoder network is determined based on an output dimension of the first reference encoder network.

4. The apparatus according to claim 3, wherein the first reference encoder network corresponds to a first reference decoder network.

5. The apparatus according to claim 4, wherein a first reference network includes the first reference encoder network and the first reference decoder network, and the first reference network further includes a reference vector quantization dictionary.

6. The apparatus according to claim 1, wherein the input dimension of the encoder network is M or M×2, the output dimension of the encoder network is D×S, and M and D are both positive integers; and $M \leq N_{tx} \times N_{sb} \times z$, $S \leq M$, z is a positive integer greater than or equal to 1, $N_{tx}$ represents a quantity of transmit antenna ports of the network device, and $N_{sb}$ represents a quantity of frequency domain sub-bands.

7. The apparatus according to claim 1, wherein the input dimension of the encoder network is M×N×2 or M×N, the output dimension of the encoder network is D×P×Q, S=P×Q, and M, N, D, P, and Q are all positive integers; and $M \leq N_{tx}$, $N \leq N_{sb}$, and $S \leq M \times N$; or
$M = N_{tx} \times x$, $N = N_{sb} \times y$, and $S \leq (N_{tx} \times x) \times (N_{sb} \times y)$; or
$M = N_{tx} \times N_{rx}$, $N = N_{sb}$, and $S \leq (N_{tx} \times N_{rx}) \times N_{sb}$, wherein
$N_{tx}$ represents a quantity of transmit antenna ports of the network device, $N_{sb}$ represents a quantity of frequency domain sub-bands, $N_{rx}$ represents a quantity of receive antenna ports of a terminal device, and x and y are both greater than 1.

8. The apparatus according to claim 1, wherein the input dimension of the encoder network is M×N×T×2 or M×N×T, the output dimension of the encoder network is D×P×Q×R, S=P×Q×R, and M, N, D, P, Q, R, and T are all positive integers; and $M = N_{tx}$, $N = N_{sb}$, $T = N_{rx}$, and $S \leq N_{rx} \times N_{tx} \times N_{sb}$, wherein
$N_{tx}$ represents a quantity of transmit antenna ports of the network device, $N_{sb}$ represents a quantity of frequency domain sub-bands, and Nyx represents a quantity of receive antenna ports of a terminal device.

9. The apparatus according to claim 1, wherein the first circuit is further configured to send, through the second circuit, information about the first vector quantization dictionary to the network device.

10. The apparatus according to claim 9, wherein the first circuit is further configured to send, through the second circuit, the information about the first vector quantization dictionary to the network device by performing at least one of the following through the second circuit:

periodically sending the information about the first vector quantization dictionary to the network device;

periodically sending the information about the first vector quantization dictionary to the network device after first configuration information is received from the network device;

sending the information about the first vector quantization dictionary to the network device after first configuration information is received from the network device;

sending the information about the first vector quantization dictionary to the network device in an arrival time unit of a first delay after first configuration information is received from the network device, wherein the first configuration information includes information about the first delay;

sending the information about the first vector quantization dictionary to the network device after first parameter information is received from the network device, wherein the first parameter information indicates parameter information of a decoder network;

sending the information about the first vector quantization dictionary to the network device in an arrival time unit of a first delay after first parameter information is received from the network device, wherein the first parameter information indicates parameter information of the decoder network;

sending the information about the first vector quantization dictionary to the network device after first indication information is received from the network device, wherein the first indication information is used to trigger sending of the first vector quantization dictionary; or sending the information about the first vector quantization dictionary to the network device in an arrival time unit of a first delay after first indication information is received from the network device, wherein the first indication information is used to trigger sending of the first vector quantization dictionary.

11. The apparatus according to claim 1, wherein a current networking manner is a first networking manner, and the first vector quantization dictionary is a vector quantization dictionary corresponding to the first networking manner;

a moving speed of the terminal device belongs to a first interval, and the first vector quantization dictionary is a vector quantization dictionary corresponding to the first interval;

the terminal device is handed over from a second cell to a first cell, and the first vector quantization dictionary is a vector quantization dictionary corresponding to the first cell;

the used reference encoder network is switched from a second reference encoder network to the first reference encoder network, and the first vector quantization dictionary is a vector quantization dictionary corresponding to the first reference encoder network; or the first vector quantization dictionary is a vector quantization dictionary indicated by second indication information, and the second indication information comes from the network device.

12. The apparatus according to claim 1, wherein the first circuit is further configured to perform the following:

sending, through the second circuit, second parameter information to the network device, wherein the second parameter information indicates a parameter of the encoder network.

13. The apparatus according to claim 12, wherein the first circuit is further configured to send, through the second circuit, the second parameter information to the network device by performing at least one of the following:
   periodically sending the second parameter information to the network device;
   periodically sending the second parameter information to the network device after second configuration information is received from the network device;
   sending the second parameter information to the network device after second configuration information is received from the network device;
   sending the second parameter information to the network device in an arrival time unit of a second delay after second configuration information is received from the network device, wherein the second configuration information includes information about the second delay;
   sending the second parameter information to the network device after third indication information is received from the network device, wherein the third indication information is used to trigger sending of parameter information of the encoder network; or
   sending the second parameter information to the network device in an arrival time unit of a second delay after third indication information is received from the network device, wherein the third indication information is used to trigger sending of parameter information of the encoder network.

14. An apparatus, comprising:
   a first circuit; and
   a second circuit,
   wherein the first circuit is configured to receive, through the second circuit, channel state information, wherein the channel state information includes S indexes of S vectors; and
   obtain information about one reconstructed downlink channel matrix based on the S indexes and a first vector quantization dictionary, wherein each of the S vectors includes in the first vector quantization dictionary, the first vector quantization dictionary includes $N_1$ vectors, and $N_1$ and S are both positive integers greater than 1.

15. The apparatus according to claim 14, wherein the first circuit is configured to obtain the information about the reconstructed downlink channel matrix based on the S indexes and the first vector quantization dictionary by performing inverse mapping on the S indexes based on the first vector quantization dictionary to obtain a first matrix, and obtaining the information about the reconstructed downlink channel matrix based on the first matrix and a decoder network.

16. The apparatus according to claim 15, wherein the first circuit is configured to obtain the information about the reconstructed downlink channel matrix based on the first matrix and the decoder network by:
   inputting the first matrix into the decoder network to obtain a second matrix; and
   obtaining the information about the reconstructed downlink channel matrix based on the second matrix.

17. The apparatus according to claim 14, wherein the reconstructed downlink channel matrix meets the following relationship:

$$H=\Sigma_{k=1}^{M}\Sigma_{l=1}^{N}C(f_{dec}(q(ind_i)))\times U_{1,k}\times U^*_{2,l}, \text{ where}$$

$\{ind_i\}_{i=1\ldots S}$ represents the S indexes of the S vectors in the first vector quantization dictionary, a function $q(x)$ indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×N×2, the first matrix and the second matrix are both real matrices, a function $C(x)$ indicates to convert the second matrix into a complex matrix whose dimension is M×N, $\{U_{1,k}\}_{k=1\ldots M}$ represents a space domain basis vector set, $U_{1,k}$ represents a $k^{th}$ vector in the space domain basis vector set, a length of a vector in the space domain basis vector set is $N_{tx}$, $\{U_{2,l}\}_{l=1\ldots N}$ represents a frequency domain basis vector set, $U_{2,l}$ represents an $l^{th}$ vector in the frequency domain basis vector set, a length of a vector in the frequency domain basis vector set is $N_{sb}$, $N_{tx}$ represents a quantity of transmit antenna ports of a network device, $N_{sb}$ represents a quantity of frequency domain sub-bands, $U^*_{2,l}$ represents a conjugate transpose matrix of $U_{2,l}$, and D, S, M, and N are all positive integers.

18. The apparatus according to claim 17, wherein
   $M=N_{tx}$, and $N=N_{sb}$;
   $M \leq N_{tx}$, and $N \leq N_{sb}$; or
   $M=N_{tx} \times x$, and $N=N_{sb} \times y$, wherein x and y are both greater than 1.

19. The apparatus according to claim 14, wherein the reconstructed downlink channel matrix meets the following relationship:

$$H=\Sigma_{j=1}^{M}C(f_{dec}(q(ind_i)))\times U_{1,(j,k)}\times U^*_{2,(j,l)}, \text{ wherein}$$

$\{ind_i\}_{i=1\ldots S}$ represents the S indexes of the S vectors in the first vector quantization dictionary, a function $q(x)$ indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×2, the first matrix and the second matrix are both real matrices, a function $C(x)$ indicates to convert the second matrix into a complex matrix whose dimension is M, $M \leq N_{tx} \times N_{sb}$, $\{U_{1,(j,k)}\}_{j=1\ldots M}$ represents a space domain basis vector set, $U_{1,(j,k)}$ represents a $j^{th}$ vector in the space domain basis vector set, a length of a vector in the space domain basis vector set is $N_{tx}$, $\{U_{2,(j,l)}\}_{j=1\ldots M}$ represents a frequency domain basis vector set, $U_{2,(j,l)}$ represents a $j^{th}$ vector in the frequency domain basis vector set, a length of a vector in the frequency domain basis vector set is $N_{sb}$, $N_{tx}$ represents a quantity of transmit antenna ports of a network device, $N_{sb}$ represents a quantity of frequency domain sub-bands, $U^*_{2,(j,l)}$ represents a conjugate transpose matrix of $U_{2,(j,l)}$, and D, S, and M are all positive integers.

20. The apparatus according to claim 14, wherein the reconstructed downlink channel matrix meets the following relationship:

$$H=\Sigma_{k=1}^{M}(C(f_{dec}(q(ind_i))))|_{t=1\ldots T}\times U_{1,(j,k)}\times U^*_{2,(j,l)},$$
wherein $q(ind_i)$ represents the S indexes of the S vectors in the first vector quantization dictionary, a function $q(x)$ indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×N×T×2, $T=N_{rx}$, $N_{rx}$ represents a quantity of receive antenna ports of a terminal device, the first matrix and the second matrix are both real matrices, a function $C(x)$ indicates to convert the second matrix into a complex matrix whose dimension is M×N×T, $(x)|_{t=1\ldots T}$ indicates to separately process, based on the second matrix, T matrices whose dimensions are M×N to obtain the reconstructed downlink channel matrix, $\{U_{1,k}\}_{k=1\ldots M}$ represents a space domain basis vector set, $U_{1,k}$ represents a $k^{th}$ vector in the space domain basis vector set, a length of a vector in the space domain basis vector set is $N_{tx}$, $\{U_{2,l}\}_{l=1\ldots N}$ represents a frequency domain basis vector set, $U_{2,l}$ represents an $l^{th}$ vector in the frequency domain basis vector set, a length of a vector in the frequency domain basis vector set is $N_{sb}$, $N_{tx}$ represents a quantity of transmit antenna ports of a network device, $N_{sb}$ represents a quantity of frequency domain sub-bands, $U^*_{2,l}$ represents a conjugate transpose vector of $U_{2,l}$, and D, S, M, N, and T are all positive integers.

21. The apparatus according to claim 14, wherein the reconstructed downlink channel matrix meets the following relationship:

$$H = \Sigma_{k=1}^{M}(C(f_{dec}(q(ind_i))))|_{l=1\ldots T} \times U_{1,(j,k)} \times U^*_{2,(j,l)},$$

wherein q(ind$_i$) represents the S indexes of the S vectors in the first vector quantization dictionary, a function q(x) indicates to map, based on the first vector quantization dictionary, the S indexes to a first matrix whose dimension is D×S, a function $f_{dec}(x)$ indicates to reconstruct the first matrix by using the decoder network to obtain a second matrix whose dimension is M×T×2, T=$N_{rx}$, the first matrix and the second matrix are both real matrices, a function C(x) indicates to convert the second matrix into a complex matrix whose dimension is M×T, $(x)|_{l=1\ldots T}$ indicates to separately process, based on the second matrix, T matrices whose dimensions are M to obtain the reconstructed downlink channel matrix, $\{U_{1,(j,k)}\}_{j=1\ldots M}$ represents a space domain basis vector set, $U_{1,(j,k)}$ represents a $j^{th}$ vector in the space domain basis vector set, a length of a vector in the space domain basis vector set is $N_{tx}$, $\{U^*_{2,(j,l)}\}_{j=1\ldots M}$ represents a frequency domain basis vector set, $U_{2,(j,l)}$ represents a $j^{th}$ vector in the frequency domain basis vector set, a length of a vector in the frequency domain basis vector set is $N_{sb}$, $N_{tx}$ represents a quantity of transmit antenna ports of a network device, $N_{sb}$ represents a quantity of frequency domain sub-bands, $U^*_{2,(j,l)}$ represents a conjugate transpose vector of $U_{2,(j,l)}$, and D, S, M, and T are all positive integers.

22. The apparatus according to claim 14, wherein the first circuit is further configured to receive, through the second circuit, information about the first vector quantization dictionary.

23. The apparatus according to claim 22, wherein the first circuit is further configured to receive, through the second circuit, the information about the first vector quantization dictionary by performing at least one of the following through the second circuit:
   periodically receiving the information about the first vector quantization dictionary;
   periodically receiving the information about the first vector quantization dictionary after first configuration information is sent;
   receiving the information about the first vector quantization dictionary after the first configuration information is sent;
   receiving the information about the first vector quantization dictionary in an arrival time unit of a first delay after first configuration information is sent, wherein the first configuration information includes information about the first delay;
   receiving the information about the first vector quantization dictionary after first parameter information is sent, wherein the first parameter information indicates parameter information of the decoder network;
   receiving the information about the first vector quantization dictionary in an arrival time unit of a first delay after first parameter information is sent, wherein the first parameter information indicates parameter information of the decoder network;
   receiving the information about the first vector quantization dictionary after first indication information is sent, wherein the first indication information is used to trigger sending of the first vector quantization dictionary; or
   receiving the information about the first vector quantization dictionary in an arrival time unit of a first delay after first indication information is sent, wherein the first indication information is used to trigger sending of the first vector quantization dictionary.

24. The apparatus according to claim 14, wherein a current networking manner is a first networking manner, and the first vector quantization dictionary is a vector quantization dictionary corresponding to the first networking manner;
   a moving speed of the terminal device belongs to a first interval, and the first vector quantization dictionary is a vector quantization dictionary corresponding to the first interval;
   the terminal device is handed over from a second cell to a first cell, and the first vector quantization dictionary is a vector quantization dictionary corresponding to the first cell;
   a reference encoder network used by the terminal device is switched from a second reference encoder network to a first reference encoder network, and the first vector quantization dictionary is a vector quantization dictionary corresponding to the first reference encoder network; or
   the first circuit is further configured to send, through the second circuit, second indication information, wherein the second indication information indicates information about the first vector quantization dictionary.

25. The apparatus according to claim 14, wherein the first circuit is further configured to receive, through the second circuit, second parameter information, wherein the second parameter information indicates a parameter of the encoder network.

26. The apparatus according to claim 25, wherein the first circuit is further configured to receive, through the second circuit, the second parameter information by performing at least one of the following through the second circuit:
   periodically receiving the second parameter information;
   periodically receiving the second parameter information after second configuration information is sent;
   receiving the second parameter information after second configuration information is sent;
   receiving the second parameter information in an arrival time unit of a second delay after second configuration information is sent, wherein the second configuration information includes information about the second delay;
   receiving the second parameter information after third indication information is sent, wherein the third indication information indicates to send parameter information of the encoder network; or receiving the second parameter information in an arrival time unit of a second delay after third indication information is sent, wherein the third indication information indicates to send parameter information of the encoder network.

\* \* \* \* \*